(12) United States Patent
Tsuda et al.

(10) Patent No.: US 12,137,067 B2
(45) Date of Patent: Nov. 5, 2024

(54) INFORMATION PROCESSING DEVICE, INFORMATION PROCESSING METHOD, AND COMMUNICATION DEVICE

(71) Applicant: SONY GROUP CORPORATION, Tokyo (JP)

(72) Inventors: Shinichiro Tsuda, Tokyo (JP); Ryo Sawai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 442 days.

(21) Appl. No.: 17/435,596

(22) PCT Filed: Jan. 27, 2020

(86) PCT No.: PCT/JP2020/002747
§ 371 (c)(1),
(2) Date: Sep. 1, 2021

(87) PCT Pub. No.: WO2020/189022
PCT Pub. Date: Sep. 24, 2020

(65) Prior Publication Data
US 2022/0158810 A1 May 19, 2022

(30) Foreign Application Priority Data
Mar. 15, 2019 (JP) ................. 2019-049174

(51) Int. Cl.
*H04L 5/00* (2006.01)
*H04W 16/06* (2009.01)
*H04W 16/14* (2009.01)

(52) U.S. Cl.
CPC .......... *H04L 5/0094* (2013.01); *H04L 5/0005* (2013.01); *H04L 5/0073* (2013.01); *H04W 16/06* (2013.01); *H04W 16/14* (2013.01)

(58) Field of Classification Search
CPC .... H04W 16/14; H04W 16/06; H04L 5/0094; H04L 5/0005; H04L 5/0073
See application file for complete search history.

(56) References Cited

U.S. PATENT DOCUMENTS

2010/0330919 A1 12/2010 Gurney et al.
2016/0128000 A1 5/2016 Furuichi et al.
(Continued)

FOREIGN PATENT DOCUMENTS

CN 105453628 A 3/2016
EP 2449831 A2 5/2012
(Continued)

OTHER PUBLICATIONS

Extended European Search Report of EP Application No. 20774737.9, issued on Mar. 23, 2022, 8 pages.
(Continued)

*Primary Examiner* — Saad A. Waqas
(74) *Attorney, Agent, or Firm* — CHIP LAW GROUP

(57) ABSTRACT

An information processing device includes: a first reception unit that receives first information regarding a first communication device that primarily uses a predetermined frequency band; a setting unit that sets information regarding protection of the first communication device on the basis of the first information; and a calculation unit that calculates a communication parameter related to radio wave transmission of a second communication device that secondarily uses the predetermined frequency band on the basis of the information regarding the protection of the first communication device set by the setting unit.

18 Claims, 25 Drawing Sheets

(56) References Cited

U.S. PATENT DOCUMENTS

| | | |
|---|---|---|
| 2018/0270764 A1 | 9/2018 | Furuichi et al. |
| 2020/0022092 A1 | 1/2020 | Furuichi et al. |
| 2021/0120502 A1 | 4/2021 | Furuichi et al. |

FOREIGN PATENT DOCUMENTS

| | | | |
|---|---|---|---|
| EP | 3038400 A1 | 6/2016 | |
| ES | 2879901 T3 | 11/2021 | |
| JP | 2009-232041 A | 10/2009 | |
| JP | 2013-251853 A | 12/2013 | |
| JP | 2018-011156 A | 1/2018 | |
| JP | 6361661 B2 | 7/2018 | |
| JP | 6506217 B2 | 4/2019 | |
| MX | 357526 B | 7/2018 | |
| RU | 2016104835 A | 8/2017 | |
| TW | 201509202 A | 3/2015 | |
| TW | 201218812 A * | 5/2021 | ............ H04W 28/26 |
| WO | 2011/008424 A2 | 1/2011 | |
| WO | WO-2015025605 A1 * | 2/2015 | ........... H04B 17/373 |
| ZA | 201508811 B | 7/2016 | |

OTHER PUBLICATIONS

International Search Report and Written Opinion of PCT Application No. PCT/JP2020/002747, issued on Apr. 14, 2020, 10 pages of ISRWO.

"CBRS Certified Professional Installer Accreditation Technical Specification", Document WINNF-TS-0247 Version V1.0.0, Oct. 16, 2017, 18 pages.

"Signaling Protocols and Procedures for Citizens Broadband Radio Service (CBRS): Spectrum Access System (SAS)—Citizens Broadband Radio Service Device (CBSD) Interface Technical Specification" Document WINNF-TS-0016 Version V1.2.1, Jan. 3, 2018, 60 pages.

"Technical and operational requirements for the operation of white space devices under geo-location approach", ECC Report 186, CEPT ECC, Jan. 2013, 181 pages.

"White Space Database Provider (WSDB) Contract", The Office of Communications and Operator, 2015, 125 pages.

"Signaling Protocols and Procedures for Citizens Broadband Radio Service (CBRS): Spectrum Access System (SAS)—SAS Interface Technical Specification", Document WINNF-TS-0096 Version 1.2.0, Oct. 20, 2017, 42 pages.

"Requirements for Commercial Operation in the U.S. 3550-3700 MHz Citizens Broadband Radio Service Band", Document WINNF-TS-0112, Version V1.4.1, Jan. 16, 2018, 77 pages.

"Citizens Broadband Radio Service", 47 C.F.R Part 96.

"Operations for Citizens Broadband Radio Service (CBRS): Priority Access License (PAL) Database Technical Specification", Document WINNF-TS-0245, Version V1.0.0, Jul. 26, 2017, 10 pages.

"Coexistence Methods for Geo-location Capable Devices Operating under General Authorization", IEEE Std 802.19.1a TM-2017.

\* cited by examiner

FIG.24

EXAMPLE OF FIRST IDENTIFIER

| FIRST IDENTIFIER | INSTALLATION MODE |
|---|---|
| 1 | FIXED INSTALLATION |
| 2 | MOVABLE INSTALLATION |

FIG.25

ANOTHER EXAMPLE OF FIRST IDENTIFIER

| FIRST IDENTIFIER | DEGREE OF IMPORTANCE OF COMMUNICATION |
|---|---|
| 1 | HIGH |
| 2 | MODERATE |
| 3 | LOW |

FIG.26

EXAMPLE OF SECOND IDENTIFIER

| SECOND IDENTIFIER | CREDIBILITY |
|---|---|
| 1 | LICENSED BUSINESS OPERATOR |
| 2 | UNLICENSED USER |

FIG.27

ANOTHER EXAMPLE OF SECOND IDENTIFIER

| SECOND IDENTIFIER | COMMUNICATION MODE |
|---|---|
| 1 | mMTC |
| 2 | eMBB |
| 3 | URLLC |

INFORMATION PROCESSING DEVICE, INFORMATION PROCESSING METHOD, AND COMMUNICATION DEVICE

CROSS REFERENCE TO RELATED APPLICATIONS

This application is a U.S. National Phase of International Patent Application No. PCT/JP2020/002747 filed on Jan. 27, 2020, which claims priority benefit of Japanese Patent Application No. JP 2019-049174 filed in the Japan Patent Office on Mar. 15, 2019. Each of the above-referenced applications is hereby incorporated herein by reference in its entirety.

FIELD

The present disclosure relates to an information processing device, an information processing method, and a communication device.

BACKGROUND

The problem of depletion of radio resources (wireless resources) that can be allocated to a wireless system (wireless device) has surfaced. Since all radio bands are already used by incumbent wireless systems (wireless devices), it is difficult to newly allocate radio resources to a wireless system. Therefore, in recent years, more effective use of radio resources utilizing cognitive radio technology has begun to attract attention. In the cognitive radio technology, radio resources are secured by using temporal and spatial unused radio waves (white space) of incumbent wireless systems.

CITATION LIST

Non Patent Literature

Non Patent Literature 1: WINNF-TS-0247-V1.0.0 CBRS Qualified Professional installer Accreditation Technical Specification
Non Patent Literature 2: WINNF-TS-0016-V1.2.1 Signaling Protocols and Procedures for Mizens Broadband Radio Service (CBRS): Spectrum Access System (SAS)-Mizens Broadband Radio Service Device (CBSD) Interface Technical Specification
Non Patent Literature 3: ECC Report 186, Technical and operational requirements for the operation of white space devices under geo-location approach, CEPT ECC, 2013 January
Non Patent Literature 4: White Space Database Provider (WSDB) Contract, available at https://www.ofcom.org.uk/_data/assets/pdf_file/0026/84077/white_space_database_contract_for_operational_use_of_wsds.pdf
Non Patent Literature 5: WINNF-TS-0096-V 1.2.0 Signaling Protocols and Procedures for Mizens Broadband Radio Service (CBRS): Spectrum Access System (SAS)-SAS Interface Technical Specification
Non Patent Literature 6: WINNF-TS-0112-V1.4.1 Requirements for Commercial Operation in the U.S. 3550-3700 MHz Citizens Broadband Radio Service Band
Non Patent Literature 7: IEEE Std 802.19.1a TM-2017 "Coexistence Methods for Geo-location Capable Devices Operating under General Authorization"
Non Patent Literature 8: 47 C.F.R Part 96 Citizens Broadband Radio Service, https://www.ecfr.gov/cgi-bin/text-idx?node=pt47.5.96#se47.5.96
Non Patent Literature 9: WINNF-TS-0245-V1.0.0 Operations for Citizens Broadband Radio Service (CBRS): Priority Access License (PAL) Database Technical Specification
Non Patent Literature 10: "Current Situation and Problems Regarding Radio Wave Use", Ministry of Internal Affairs and Communications, November 2017
Non Patent Literature 11: "Study of Frequency Sharing Conditions", Ministry of Internal Affairs and Communications, October 2018

SUMMARY

Technical Problem

However, it is not always possible to effectively use radio resources simply by using unused radio waves. For example, in order to realize effective use of radio resources, it is necessary to efficiently allocate unused radio waves to a wireless system (wireless communication device), but it is not easy to efficiently distribute unused radio waves among various use modes of radio waves.

In this regard, the present disclosure proposes an information processing device, an information processing method, and a communication device that enable realization of efficient use of radio resources.

Solution to Problem

To solve the above problem, an information processing device includes: a first reception unit that receives first information regarding a first communication device that primarily uses a predetermined frequency band; a setting unit that sets information regarding protection of the first communication device on a basis of the first information; and a calculation unit that calculates a communication parameter related to radio wave transmission of a second communication device that secondarily uses the predetermined frequency band on a basis of the information regarding the protection of the first communication device set by the setting unit.

BRIEF DESCRIPTION OF DRAWINGS

FIG. 24 is a diagram illustrating an example of a first identifier.

FIG. 25 is a diagram illustrating another example of the first identifier.

FIG. 26 is a diagram illustrating an example of a second identifier.

FIG. 27 is a diagram illustrating another example of the second identifier.

DESCRIPTION OF EMBODIMENTS

Figure 1:
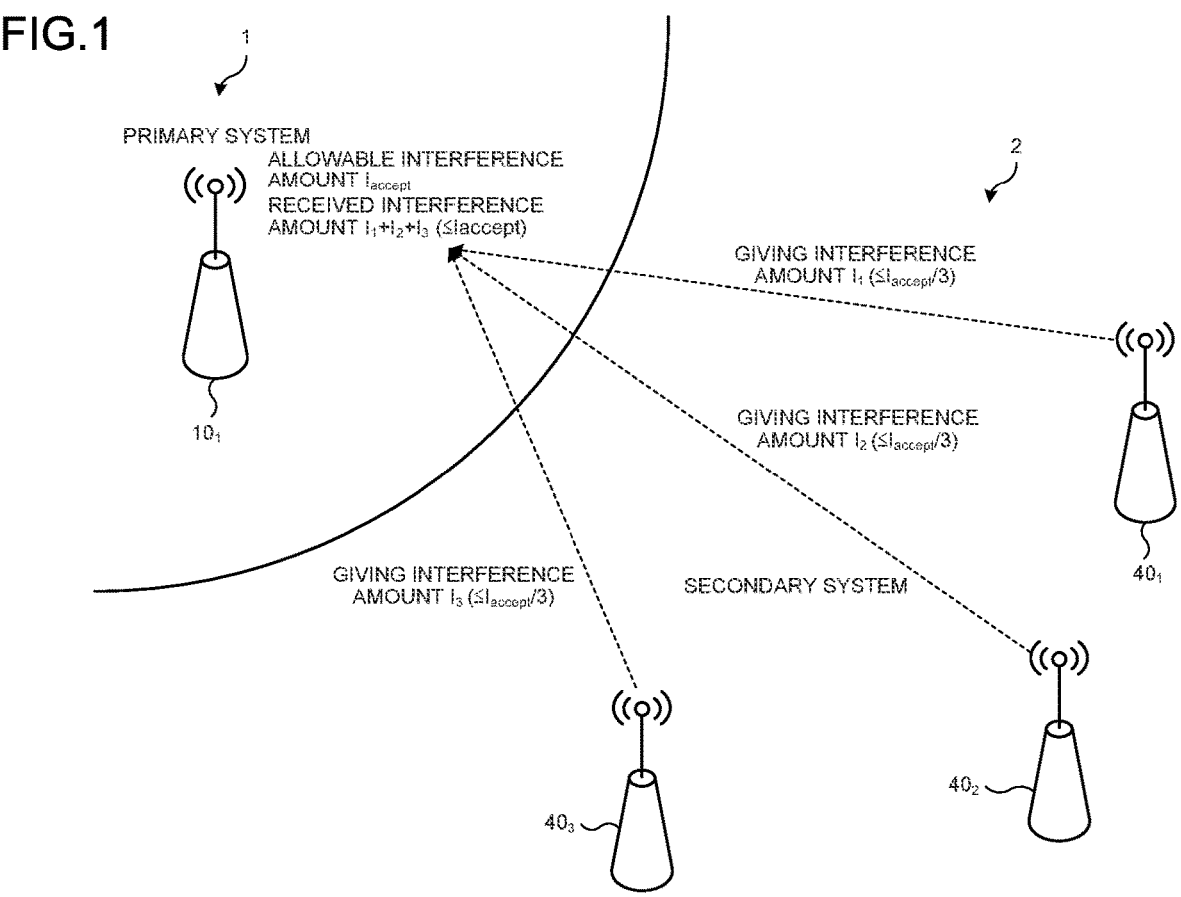
FIG. 1 is an explanatory diagram illustrating an example of distributing an interference margin to each communication device included in a secondary system.

Hereinafter, embodiments of the present disclosure will be described in detail with reference to the drawings. Note that, in each of the following embodiments, the same reference signs denote the same portions, and an overlapping description will be omitted.

Further, in the present specification and the drawings, a plurality of components having substantially the same functional configuration may be distinguished by adding different numbers or alphabets after the same reference signs. For example, a plurality of components having substantially the same functional configuration are distinguished as necessary, such as communication control devices $60_1$ and $60_2$. Further, a plurality of components having substantially the same functional configuration are distinguished as necessary, such as communication systems 2A and 2B. However, in a case where it is not necessary to particularly distinguish between the plurality of components having substantially the same functional configuration, only the same reference sign is given. For example, in a case where it is not necessary to particularly distinguish between the communication control devices $60_1$ and $60_2$, they are simply referred to as the communication control device 60. Further, in a case where it is not necessary to particularly distinguish between the communication systems 2A and 2B, they are simply referred to as the communication system 2.

Further, the present disclosure will be described in the following order.

1. Introduction
1-1. Control of Wireless System for Implementing Frequency Sharing
1-2. Outline of Present Embodiment
1-3. Terms Related to Frequency and Sharing
2. Configuration of Communication System
2-1. Overall Configuration of Communication System
2-2. Configuration of Radio Wave Use Device
2-3. Configuration of Management Device
2-4. Configuration of Terminal Device
2-5. Configuration of Base Station Device
2-6. Configuration of Proxy Device
2-7. Configuration of Communication Control Device
3. Interference Model
4. Primary System Protection Method
4-1. Simultaneous Interference Margin Distribution Type
4-2. Sequential Interference Margin Distribution Type
5. Description of Various Procedures
5-1. Registration Procedure
5-2. Available Frequency Information Inquiry Procedure
5-3. Frequency Use Permission Procedure
5-4. Frequency Use Notification
5-5. Supplementary Description of Various Procedures
5-6. Various Procedures Related to Terminal Device
5-7. Procedure Performed Between Communication Control Devices
6. Dynamic Determination of Information Regarding Protection of Primary Use Device (First Embodiment)
6-1. System Configuration Used for Description
6-2. First Identifier
6-3. Second Identifier
6-4. Primary Use Device Information Range Determination Processing
6-5. Provision of Primary Use Device Information
6-6. Secondary Use Parameter Calculation Processing
6-7. Acquisition of Secondary Use Permission
7. Dynamic Determination of Information Regarding Protection of Primary Use Device (Second Embodiment)
7-1. Setting Processing
7-2. Secondary Use Parameter Calculation Processing 8. Modified Example
8-1. Modified Example Related to First Information
8-2. Modified Example Related to Second Information
8-3. Modified Example Related to Setting of Protection Information
8-4. Modified Example Related to System Configuration
8-5. Other Modified Examples
9. Conclusion 1. Introduction In recent years, the problem of depletion of radio resources (for example, frequency) that can be allocated to a wireless system has surfaced. However, since all radio bands are already used by incumbent wireless systems, it is difficult to newly allocate radio resources. Therefore, in recent years, more effective use of radio resources utilizing cognitive radio technology has begun to attract attention.

In cognitive radio technology, radio resources are secured by using and utilizing (for example, dynamic spectrum access (DSA)) temporal/spatial unused radio waves (white space) of incumbent wireless systems. For example, in the United States, legislation/standardization of citizens broadband radio service (CBRS), which utilizes frequency sharing technology to aim to open, to the general public, a federal use band (3.55 to 3.70 GHz) overlapping frequency bands corresponding to global 3GPP bands 42 and 43, have been accelerated.

Note that the cognitive radio technology contributes not only to dynamic frequency sharing but also to improvement of frequency utilization efficiency of a wireless system. For example, ETSI EN 303 387 and IEEE 802.19.1-2014 stipulate technology for coexistence between wireless systems that use unused radio waves.

<1-1. Control of Wireless System for Implementing Frequency Sharing>

In general, in the frequency sharing, the national regulatory authority (NRA) of each country/region is required to protect a wireless system (primary system) of a primary user who is licensed or authorized for the use of a frequency band. Typically, an allowable interference reference value of the primary system is provided by the NRA, and a wireless system (secondary system) of a secondary user is required to cause interference occurring due to sharing to fall below the allowable interference reference value.

In order to implement the frequency sharing, for example, a communication control device (for example, a frequency management database) controls communication of the secondary system so as not to give fatal interference to the primary system. The communication control device is a device that manages communication of a communication device or the like. For example, the communication control device is a device (system) for managing radio resources (for example, frequency), such as a geo-location database (GLDB) or a spectrum access system (SAS). In the present embodiment, the communication control device corresponds to a communication control device 60 as described later. The communication control device 60 will be described in detail later.

Here, the primary system is, for example, a system (for example, an incumbent system) that has a higher priority in using a predetermined frequency band than other systems such as the secondary system. Further, the secondary system is, for example, a system that secondarily uses (for example, dynamic frequency sharing) a frequency band used by the primary system. The primary system and the secondary system may each include a plurality of communication devices, or may include one communication device. The communication control device distributes an interference allowance to one or more communication devices included in the secondary system so that interference aggregation of the one or more communication devices with respect to the primary system does not exceed the interference allowance (also referred to as an interference margin) of the primary system. At this time, the interference allowance may be an interference amount predetermined by an operator of the primary system, a public organization that manages radio waves, or the like. In the following description, the term "interference margin" refers to the interference allowance. Further, the aggregated interference may be referred to as aggregated interfering power.

FIG. 1 is an explanatory diagram illustrating an example of distributing the interference margin to each communication device included in the secondary system. In the example of FIG. 1, a communication system 1 is the primary system, and a communication system 2 is the secondary system. The communication system 1 includes a radio wave use device $10_1$ and the like. Further, the communication system 2 includes base station devices $40_1$, $40_2$, and $40_3$, and the like. Note that, in the example of FIG. 1, the communication system 1 includes only one radio wave use device 10, but the communication system 1 may include a plurality of radio wave use devices 10. Further, in the example of FIG. 1, the communication system 2 includes three base station devices 40, but the number of base station devices 40 included in the communication system 2 may be less than or more than three. In addition, a wireless communication device included in the communication system 2 does not necessarily have to be a base station device. Note that, in the example of FIG. 1, only one primary system (the communication system 1 in the example of FIG. 1) and one secondary system (the communication system 2 in the example of FIG. 1) are illustrated, but the number of primary systems and the number of secondary systems may each be plural.

The radio wave use device $10_1$ and the base station devices $40_1$, $40_2$, and $40_3$ can each transmit and receive radio waves. An interference amount allowed by the radio wave use device $10_1$ is $I_{accept}$. Further, the amounts of interference given by the base station devices $40_1$, $40_2$, and $40_3$ to a predetermined protection point of the communication system 1 (primary system) are giving interference amounts $I_1$, $I_2$, and $I_3$, respectively. Here, the protection point is a reference interference calculation point for protection of the communication system 1.

The communication control device distributes the interference margin $I_{accept}$ to a plurality of base station devices 40 so that aggregated interference (received interference amount $I_1+I_2+I_3$ illustrated in FIG. 1) with respect to the predetermined protection point of the communication system 1 does not exceed the interference margin $I_{accept}$. For example, the communication control device distributes the interference margin $I_{accept}$ to each base station device 40 so that the giving interference amounts $I_1$, $I_2$, and $I_3$ each become $I_{accept}/3$. Alternatively, the communication control device distributes the interference margin $I_{accept}$ to each base station device 40 so that the giving interference amounts $I_1$, $I_2$, and $I_3$ each become equal to or smaller than $I_{accept}/3$. It is a matter of course that a method of distributing the interference margin is not limited to this example.

The communication control device calculates maximum transmission power (hereinafter, referred to as allowable maximum transmission power) allowed for each base station device 40 on the basis of the interference amount that is distributed (hereinafter, referred to as the distributed interference amount). For example, the communication control device calculates the allowable maximum transmission power of each base station device 40 by back-calculating from the distributed interference amount on the basis of a propagation loss, an antenna gain, and the like. Then, the communication control device notifies each base station device 40 of information on the calculated allowable maximum transmission power.

<1-2. Overview of Present Embodiment>

In June 2018, the Release 15 specification, which is the first version of the standard specification candidate for the 5th generation mobile communication system (5G), was formulated by the third generation partnership project (3GPP). On the basis of this specification, the 5G service is expected to be started from the latter half of 2019.

While market expectations for the 5G are increasing, a problem of frequency band allocation can be cited as a problem. In the 5G that implements an ultra-wide band service, utilization of millimeter waves capable of securing a wide frequency band has been discussed. However, the utilization of the millimeter wave band has some problems. Since the millimeter wave band has a large propagation loss and low communication stability, hot spot utilization is assumed, and it is necessary to install many base stations in order to realize wide coverage. That is, there is a concern about an increase in installation cost and operation cost. For the above reasons, it is desired to secure a frequency band of 6 GHz or less called sub-6 GHz having relatively excellent propagation characteristics at the initial stage of introduction.

In addition, the frequency for 5G is desirably an international common frequency band from the viewpoint of infrastructure device and terminal procurement, but in reality, many frequency bands included in the sub-6 GHz are already used for other wireless systems and public purposes. In order to solve this problem, for example, as described in Non Patent Literature 10 (Ministry of Internal Affairs and Communications: "Current Situation and Problems Regarding Radio Wave Use", November 2017), discussion on the reorganization of public frequencies and private sharing has been started also in Japan.

From such a situation, currently, it is strongly desired to implement frequency sharing (secondary use) technology for enhancing the use efficiency of the frequency band that is being depleted without replacing communication equipment (primary system) that primarily uses radio waves. However, it is not easy to increase the utilization efficiency of the frequency band in various radio wave utilization modes. Hereinafter, an example of this problem will be specifically described.

So far, for example, regarding the 2.3 GHz band, a plan to share a field pickup unit (FPU), which is a wireless relay transmission device for television broadcasting, for public service (fixed/mobile) that is primarily used has been studied, and the FPU has been introduced to 2330 MHz to 2370 MHz. According to Non Patent Literature 11 (Ministry of Internal Affairs and Communications: "Study of Frequency Sharing Conditions", October 2018), "a study on interference with incumbent wireless systems (including the current FPU) using the same or adjacent frequencies or the like is studied, and frequency sharing conditions are studied", and a study to widen a shared frequency band has been conducted. A partial frequency band of the 2.3 GHz band is considered to be used by a mobile non-line-of-sight multiplex communication device intended by the air force for the purpose of replacing an air-raid warning blackout multiplex communication network and securing a non-line-of-sight section in an emergency.

When a predetermined frequency band is shared, it is considered that there is a possibility that the frequency and the use situation of the primary use of the predetermined frequency band are grasped to some extent on the secondary use side. However, in a case of some primary use entities, there may be a situation where it is not desired to make the use situation public from the viewpoint of defense, safety, and the like. For example, in a case where the predetermined frequency band is the 2.3 GHz band, the system of the air force is considered to be a primary use device, and it is assumed that an operator of the primary use device (for example, the Ministry of Defense) does not want to make the use situation public from the viewpoint of the defense and safety. In this case, the frequency band may not be secondarily used even though the frequency band can be secondarily used.

In addition, in a case where the primary system includes a mobile wireless communication device, it is not known where the wireless communication device performs communication, and thus, there is a possibility that a frequency band used for wireless communication by the wireless communication device is not secondarily used at all times and at any place.

Therefore, in the present embodiment, the communication system sets information regarding protection of the primary use device on the basis of information (for example, information on an installation mode of the primary use device) regarding the primary use device (primary system) that primarily uses a predetermined frequency band. The information regarding protection is, for example, information on a range of a protection area related to the primary use device or information on an interference margin related to the primary use device. The information regarding protection may be position information of the primary use device. Then, the communication system calculates a communication parameter related to radio wave transmission of a secondary use device (secondary system) that secondarily uses a predetermined frequency band on the basis of the set information.

As a result, the communication system can flexibly determine the communication parameter according to the situation (for example, a use mode of a predetermined frequency band) of the primary use device, and thus, efficient use of the radio resource can be realized.

Note that the information on the secondary use device may be taken into consideration when setting the information regarding the protection of the primary use device. This will be specifically described below.

For example, it is conceivable that the degree of confidentiality of the installation position of a base station varies depending on the primary use situation (for example, whether the base station device serving as the primary system is fixedly installed or movably installed). For example, in a case where the installation position of the base station that is fixedly installed is known by a malicious person, the base station may be easily attacked. On the other hand, in a case of the base station that is movably installed, since the position thereof can be changed, it is assumed that the risk of attack is reduced.

Therefore, in a case where an operating entity of the secondary use device is, for example, a business operator that has obtained a license from a government agency by guaranteeing its credibility and higher security, such as a communication company, the communication system sets, for example, specific position information (alternatively, information in which detailed position information can be specified) of the primary use device including the position of a pinpoint of the fixedly installed base station, as the information regarding the protection of the primary use device. On the other hand, in a case where the operating entity of the secondary use device is a business operator who does not have a license or has acquired only a license corresponding to only relatively low security, the communication system sets, for example, only the position of the movably installed base station, as a pinpoint position. At this time, in the communication system, the position of the fixed installed base station may be information on the protection area instead of the pinpoint position in order to reduce the risk of attack.

As a result, it is possible to protect, as the primary system, a communication system that is conventionally not suitable for frequency sharing due to a high degree of confidentiality or the like. That is, the base of the system that can be the primary system can be expanded. As a result, efficient use of radio resources can be realized.

<1-3. Terms Related to Frequency and Sharing>

Note that, in the present embodiment, it is assumed that the primary system (for example, the communication system 1) and the secondary system (for example, the communication system 2) are in a dynamic frequency sharing environment. Hereinafter, the present embodiment will be described by taking the CBRS, for which the U.S. Federal Communications Commission (FCC) established rules, as an example. Note that the communication system 1 and the communication system 2 of the present embodiment are not limited to the CBRS.

Figure 2:
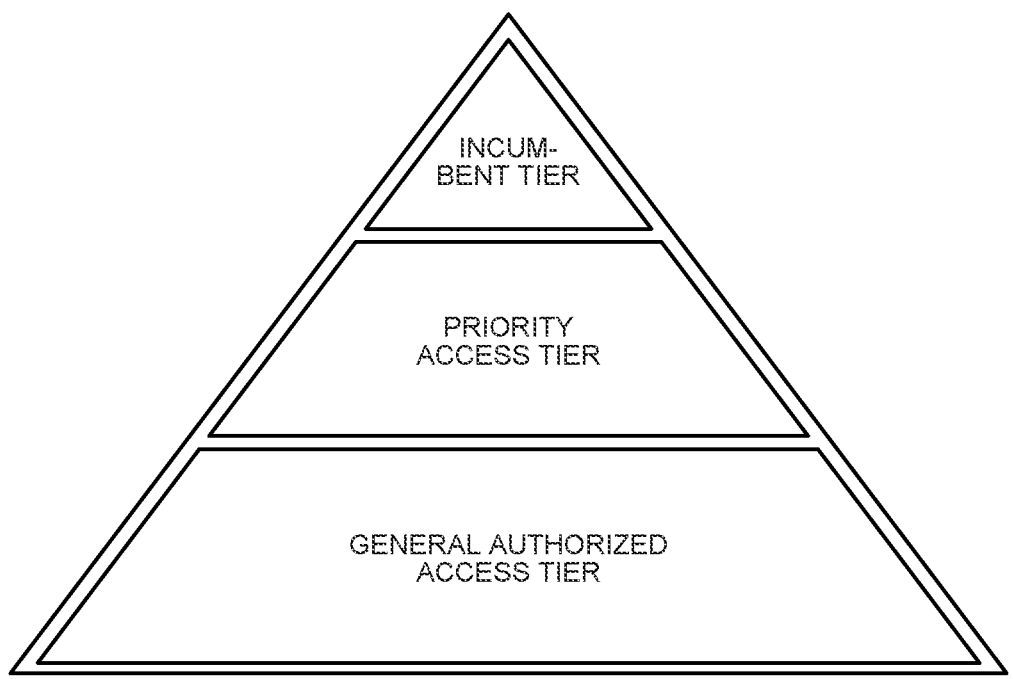
FIG. 2 is an explanatory diagram illustrating a tiered structure in CBRS.

FIG. 2 is an explanatory diagram illustrating a tiered structure in the CBRS. As illustrated in FIG. 2, each of users of a frequency band is classified into one of three groups. These groups are called "tiers". For each of the three groups, a tiered structure including an incumbent tier, a priority access tier, and a general authorized access tier is defined. In this tiered structure, the priority access tier is positioned above the general authorized access tier, and the incumbent tier is positioned above the priority access tier. Taking the CBRS as an example, a system positioned in the incumbent tier (incumbent system) is the primary system, and a system positioned in the general authorized access tier and the priority access tier is the secondary system.

The incumbent tier is a group of incumbent users of a shared frequency band. In the CBRS, the Department of Defense (DOD), a fixed satellite business operator, and a grandfathered wireless broadband licensee (GWBL) are defined as the incumbent users. The "incumbent tier" is not required to avoid or suppress interference with the "priority access tier" and the "general authorized access (GAA) tier" with lower priority. Further, the "incumbent tier" is protected from interference by the "priority access tier" and the "GAA tier". That is, the user of the "incumbent tier" can use the frequency band without considering the existence of other groups.

The priority access tier is a group of users having a license called priority access license (PAL). It is required to avoid or suppress interference with the "incumbent tier" with higher priority than the "priority access tier", but it is not required to avoid or suppress interference with the "GAA tier" with lower priority. Further, the "priority access tier" is not protected from interference by the "incumbent tier" with higher priority, but is protected from interference by the "GAA tier" with lower priority.

The general authorization access tire (GAA tier) is a group of all other users that do not belong to the "incumbent tier" and the "priority access tier" described above. It is required to avoid or suppress interference with the "incumbent tier" and the "priority access tier" with higher priority. Further, the "GAA tier" is not protected from interference by the "incumbent tier" and the "priority access tier" with higher priority. That is, the "GAA tier" is a "tier" that is required to opportunistically use a frequency in legislation.

Note that the tiered structure is not limited to these definitions. The CBRS is generally called a three-tier structure, but may be a two-tier structure. A typical example is a two-tier structure such as licensed shared access (LSA) and TV band white space (TVWS). In the LSA, a structure equivalent to a combination of the "incumbent tier" and the "priority access tier" is adopted. In addition, in the TVWS, a structure equivalent to a combination of the "incumbent tier" and the "GAA tier" is adopted. In addition, there may be four or more tiers. Specifically, for example, an intermediate tier corresponding to "priority access tier" may be further prioritized or the like. In addition, for example, the "GAA tier" may be similarly prioritized or the like.

Figure 3:
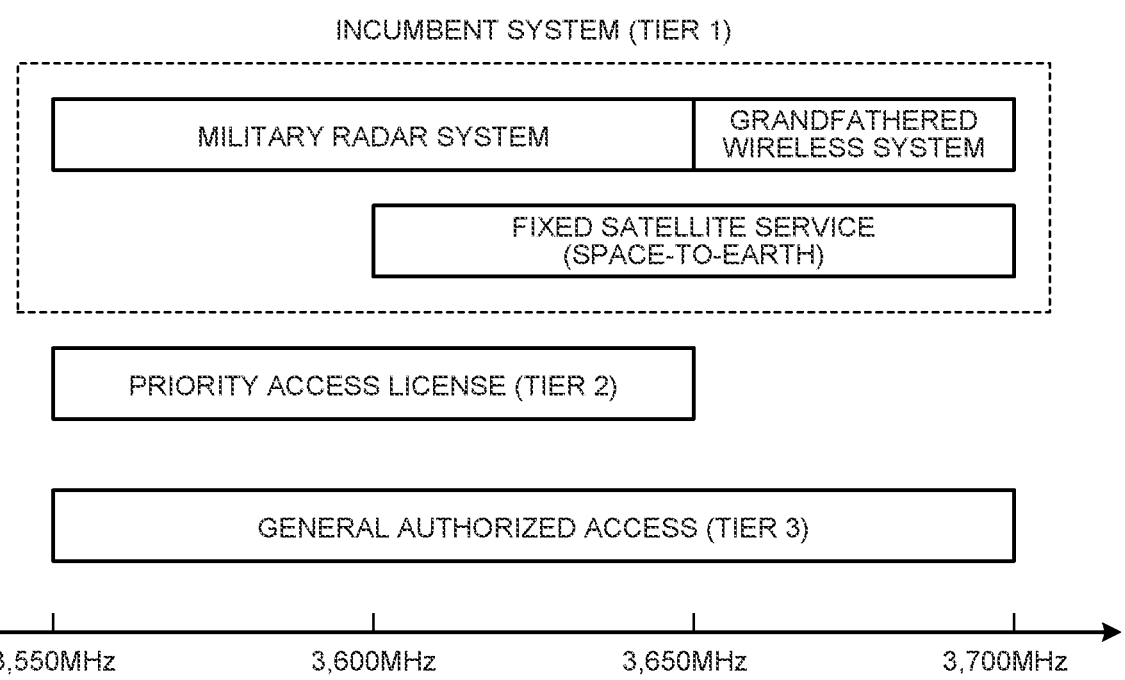
FIG. 3 is an explanatory diagram illustrating a band of the CBRS.

FIG. 3 is an explanatory diagram illustrating a band of the CBRS. Taking the above-described CBRS as an example, the primary system is a military radar system, a grandfathered wireless system, or a fixed satellite service (space-to-earth). Here, the military radar system is typically a carrier-based radar. Further, the secondary system is a wireless network system including a citizens broadband radio service device (CBSD), a base station that is called an end user device (EUD), and a terminal. Additional prioritization is made in the secondary system, and the priority access license (PAL) that enables the use of a shared bandwidth and general authorized access (GAA) that is equivalent to no license are defined. A tier 1 illustrated in FIG. 3 corresponds to the incumbent tier illustrated in FIG. 2. A tier 2 illustrated in FIG. 3 corresponds to the priority access tier illustrated in FIG. 2. A tier 3 illustrated in FIG. 3 corresponds to the general authorized access tier illustrated in FIG. 2.

Note that the primary system (communication system 1) of the present embodiment is not limited to the example illustrated in FIG. 3. The primary system (communication system 1) may be another type of wireless system. For example, another wireless system may be used as the primary system depending on a country/region/frequency band to which it is to be applied. For example, the primary system may be a television broadcasting system such as a digital video broadcasting-terrestrial (DVB-T) system. Further, the primary system may be a wireless system that is called a fixed system (FS). Further, frequency sharing in other frequency bands may be possible. For example, the licensed shared access (LSA) and TV band white space (TVWS) are typical examples. Further, the primary system may be a cellular communication system such as long term evolution (LTE), new radio (NR) or the like. Further, the primary system may be an aeronautical radio system such as an aeronautical radio navigation service (ARNS) or the like. It is a matter of course that the primary system is not limited to the above-described wireless systems, and may be another type of wireless system.

Further, unused radio waves (white space) used by the communication system 2 are not limited to radio waves of the federal use band (3.55 to 3.70 GHz). The communication system 2 may use radio waves in a frequency band different from the federal use band (3.55 to 3.70 GHz) as the unused radio waves. For example, in a case where the primary system (communication system 1) is a television broadcasting system, the communication system 2 may be a system that uses the TV white space as the unused radio waves. Here, the TV white space refers to a frequency band that is not currently used by the television broadcasting system among frequency channels allocated to the television broadcasting system (primary system). At this time, the TV white space may be a channel that is not used depending on the region.

Further, a relationship between the communication system 1 and the communication system 2 is not limited to a frequency sharing relationship in which the communication system 1 is the primary system and the communication system 2 is the secondary system. The relationship between the communication system 1 and the communication system 2 may be a network coexistence relationship between the same or different wireless systems using the same frequency.

In frequency sharing, an incumbent system that uses a target band is generally called the primary system, and a system of a secondary user is called the secondary system. However, in a case where the present embodiment is applied to an environment other than the frequency sharing environment, these (the primary system and the secondary system) may be replaced with a system of another term. A macrocell in a HetNET may be the primary system, and a small cell or relay station may be the secondary system. Further, a base station may be the primary system, and a relay UE or vehicle UE that realizes D2D or vehicle-to-everything (V2X) in a coverage of the base station may be the secondary system. The base station is not limited to a fixed type, but may be a portable type/mobile type. In such a case, for example, the communication control device provided by the present invention may be included in a base station, a relay station, a relay UE, or the like.

Note that the term "frequency" that appears in the following description may be replaced with another term. For example, the term "frequency" may be replaced with a term "resource", "resource block", "resource element", "channel", "component carrier", "carrier", "subcarrier", or "beam", or a term having a similar meaning thereto.

2. Configuration of Communication System

Hereinafter, a communication system 1000 according to an embodiment of the present disclosure will be described. The communication system 1000 includes the communication system 1 and the communication system 2. The communication system 1 (first wireless system) is a wireless communication system that (primarily) uses a predetermined frequency band for wireless communication. The communication system 2 (second wireless system) is a wireless communication system that secondarily uses the frequency band used by the communication system 1 for wireless communication. For example, the communication system 2 is a wireless communication system that performs dynamic frequency sharing for unused radio waves of the communication system 1. The communication system 2 provides a wireless service to a user or a device owned by the user by using predetermined radio access technology.

Here, the communication systems 1 and 2 may each be a cellular communication system such as wideband code division multiple access (W-CDMA), code division multiple access 2000 (cdma2000), LTE, or NR. In the following description, "LTE" includes LTE-Advanced (LTE-A), LTE-Advanced Pro (LTE-A Pro), and evolved universal terrestrial radio access (EUTRA). In addition, "NR" includes new radio access technology (NRAT) and Further EUTRA (FEUTRA).

NR is next generation (fifth generation) radio access technology (RAT) of LTE. The NR is a radio access technology that can support various use cases including enhanced mobile broadband (eMBB), massive machine type communications (mMTC), and ultra-reliable and low latency communications (URLLC).

Note that the communication systems 1 and 2 are not limited to the cellular communication system. For example, the communication system 2 may be another wireless communication system such as a wireless local area network (LAN) system, a television broadcasting system, an aeronautical radio system, or a space wireless communication system.

In the present embodiment, it is assumed that the communication system 1 is the primary system, and the communication system 2 is the secondary system. As described above, the number of communication systems 1 and the number of communication systems 2 may each be plural. Note that, although the communication system 1 includes one radio wave use device 10 (the radio wave use device $10_1$ illustrated in FIG. 1) in the example of FIG. 1, as described above, the communication system 1 may include a plurality of radio wave use devices 10. The configuration of the radio wave use device 10 may be the same as or different from the configuration of the base station device 40 or terminal device 30 as described later.

<2-1. Overall Configuration of Communication System>

The communication system 1000 typically includes the following entities.

Communication device (for example, the base station device or proxy device)

Terminal device

Management device (for example, the communication control device)

Note that, in the following description, an entity serving as the communication device is assumed to be the radio wave use device 10, the base station device 40, or the proxy device 50, but the entity serving as the communication device is not limited to these devices, and may be another communication device (for example, a management device 20, the terminal device 30, or the communication control device 60).

Figure 4:
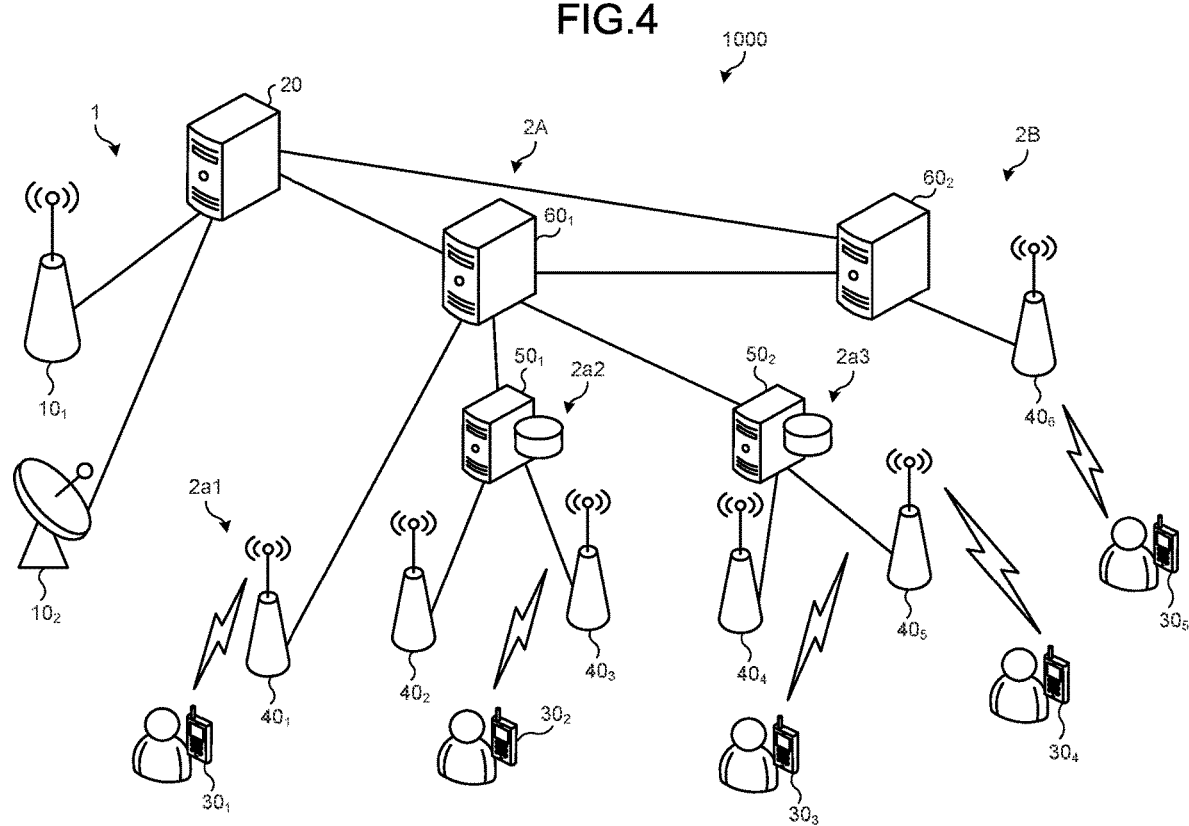
FIG. 4 is a diagram illustrating an example of a configuration of a communication system according to an embodiment of the present disclosure.

FIG. 4 is a diagram illustrating an example of a configuration of the communication system 1000 according to an embodiment of the present disclosure. As described above, the communication system 1000 includes the communication system 1 and the communication system 2. Note that the device in the figure can also be considered as a device in a logical sense. That is, a part of the device in the drawing may be implemented by a virtual machine (VM), a container, a docker, or the like, and they may be implemented on the physically same hardware.

The communication system 1 includes the radio wave use device 10 and the management device 20. In the example of FIG. 4, the communication system 1 includes radio wave use devices $10_1$ and $10_2$ and the management device 20 that manages the radio wave use devices $10_1$ and $10_2$. Note that the communication system 1 does not necessarily have to include the management device 20. Furthermore, the communication system 1 may include a plurality of radio wave use devices 10 or may include only one radio wave use device 10. In the example of FIG. 4, each of the radio wave use devices $10_1$ and $10_2$ can be regarded as one communication system 1.

The communication system 2 includes the terminal device 30, the base station device 40, the proxy device 50, and the communication control device 60. In the example of FIG. 4, a communication system 2A and a communication system 2B are described as the communication system 2. The communication system 2A includes a communication system 2a1, a communication system 2a2, and a communication system 2a3. The communication system 2a1 includes a terminal device $30_1$ and a base station device $40_1$, the communication system 2a2 includes a terminal device $30_2$, base station devices $40_2$ and $40_3$, and a proxy device $50_1$, and the communication system 2a3 includes terminal devices $30_2$ and $30_4$, base station devices $40_4$ and $40_5$, and a proxy device $50_2$. Furthermore, the communication system 2B includes a terminal device $30_5$ and a base station device $40_6$.

Note that the communication system 2 does not necessarily have to include the communication control device 60. Describing with reference to the example of FIG. 4, each of the communication system 2a2 and the communication system 2a3 having the communication control device 60 outside may be regarded as one communication system 2. Furthermore, the communication system 2 does not necessarily have to include the proxy device 50. In the example of FIG. 4, the communication system 2a1 that does not include the proxy device 50 may be regarded as one communication system 2.

The communication systems 1 and 2 each provide a wireless service to a user or a device owned by the user by operating respective devices (for example, the communication device of the wireless communication device or the like) included in the communication systems 1 and 2 in cooperation with each other. The wireless communication device is a device having a wireless communication function. In the example of FIG. 4, the radio wave use device 10, the base station device 40, and the terminal device 30 correspond to the wireless communication devices.

Note that the proxy device 50 and the communication control device 60 may have a wireless communication function. In this case, the proxy device 50 and the communication control device 60 can also be regarded as the wireless communication devices. In the following description, the wireless communication device may be simply referred to as a communication device. Note that the communication device is not limited to the wireless communication device, and for example, a device that does not have a wireless communication function and can perform only wired communication can also be regarded as the communication device.

Note that, in the present embodiment, the concept of the "communication device" includes not only a portable mobile device (for example, the terminal device) such as a mobile terminal but also a device installed in a structure or mobile body. The structure or mobile body itself may be regarded as the communication device. In addition, the concept of the communication device includes not only a terminal device but also a base station device and a relay device. The communication device is a type of processing device and information processing device. The term "communication device" appearing in the following description can be appropriately rephrased as a "transmission device" or a "reception device". Note that, in the present embodiment, the concept of "communication" includes "broadcasting". In this case, the term "communication device" can be appropriately rephrased as a "broadcasting device". It is a matter of course that the term "communication device" may be appropriately rephrased as a "transmission device" or a "reception device".

The communication system 2 may include a plurality of terminal devices 30, a plurality of base station devices 40, a plurality of communication control devices 60, and a plurality of proxy devices 50. In the example of FIG. 4, the communication system 2 includes the terminal devices $30_1$, $30_2$, $30_3$, $30_4$, and $30_5$, and the like as the terminal device 30. Furthermore, the communication system 2 includes the base station devices $40_1$, $40_2$, $40_3$, $40_4$, $40_5$, and $40_6$, and the like as the base station device 40. Furthermore, the communication system 2 includes the communication control devices $60_1$ and $60_2$ as the communication control device 60.

Note that, in the following description, the wireless communication device may be referred to as a wireless system. Further, each of the terminal devices $30_1$ to $30_5$ is one wireless system. In addition, each of the radio wave use device 10 and the base station devices $40_1$ to $40_6$ is one wireless system. In the following description, the communication system 1 is referred to as the first wireless system, but each of one or more radio wave use devices 10 included in the communication system 1 may be regarded as the first wireless system. In the following description, each of one or more base station devices 40 included in the communication system 2 is referred to as the second wireless system, but the communication system 2 itself may be regarded as the second wireless system, or each of one or more terminal devices 30 included in the communication system 2 may be regarded as the second wireless system. In a case where the proxy device 50 and the communication control device 60 have the wireless communication function, each proxy device 50 or each communication control device 60 may be regarded as the second wireless system.

Note that the wireless system may be one system including a plurality of communication devices including at least one wireless communication device. For example, a system including one or more base station devices 40 and one or more terminal devices 30 subordinate to the base station device 40 may be regarded as one wireless system. Further, it is also possible to regard each of the communication system 1 and the communication system 2 as one wireless system. In the following description, a communication system including a plurality of communication devices including at least one wireless communication device may be referred to as a wireless communication system or simply referred to as a communication system. Note that one system including a plurality of communication devices including one wireless communication device may be regarded as the first wireless system or the second wireless system.

Note that, in the present embodiment, the system means a set of a plurality of components (devices, modules (parts), and the like). At this time, all the components included in the system may be in the same housing or may not be in the same housing. For example, a plurality of devices housed in separate housings and connected in a wire and/or wireless manner correspond to one system. One device in which a plurality of modules are housed in one housing also corresponds to one system.

[Radio Wave Use Device]

The radio wave use device 10 is a wireless communication device included in the communication system 1 (primary system). The radio wave use device 10 may be a radio wave emission device such as a radar or a reflected wave reception device. As described above, the primary system is, for example, a military radar system, a grandfathered system (for example, a television broadcasting system or a grandfathered cellular communication system), or a system for a fixed satellite service.

In a case where the communication system 1 is the military radar system, the radio wave use device 10 is, for example, a carrier-based radar. For example, in a case where the communication system 1 is the television broadcasting system, the radio wave use device 10 is a broadcasting station (a broadcasting station as equipment) such as a broadcasting relay station. In a case where the communication system 1 is the system for the fixed satellite service, the radio wave use device 10 is, for example, a parabolic antenna that receives radio waves from an artificial satellite. It is a matter of course that the radio wave use device 10 is not limited thereto. In a case where the communication system 1 is the grandfathered cellular communication system, the radio wave use device 10 may be a base station device.

[Management Device]

The management device 20 is a device that manages the radio wave use device 10. For example, the management device 20 is a server or database owned by an operator or manager of the communication system 1.

Note that the management device 20 may be a server or database owned by a public organization. For example, the management device 20 may be a database (for example, a regulatory database) managed and operated by a national or regional radio wave administration agency. Examples of the regulatory database include a universal licensing system (ULS) operated by the Federal Communications Commissions (FCC).

In addition, in a case where the communication system 1 is the grandfathered cellular communication system, the management device 20 may be a device that manages a wireless network. For example, the management device 20 may be a device that functions as a mobility management entity (MME) or an access and mobility management function (AMF).

In a case where the communication system 2 configures a network including the radio wave use device 10 as one of nodes, the management device 20 may be, for example, a network manager that integrally controls the radio wave use device 10 in the network.

It is a matter of course that the radio wave use device 10 is not limited to these examples. Note that the radio wave use device 10 may have the function of the management device 20. In this case, the radio wave use device 10 can be regarded as the management device 20.

[Terminal Device]

The terminal device 30 is communication equipment having a communication function. The terminal device 30 is typically communication equipment such as a smartphone. The terminal device 30 may be a user terminal such as a mobile phone, a smart device (smartphone or tablet PC), a wearable terminal, an Internet of Things (IoT) device, a personal digital assistant (PDA), or a personal computer. The terminal device may be referred to as a user equipment, a user terminal, a user station, a mobile terminal, a mobile station, or the like.

Furthermore, the terminal device 30 may be able to perform sidelink communication with another terminal device 30. When performing the sidelink communication, the terminal device 30 may be able to use automatic retransmission technology such as hybrid automatic repeat request (HARQ). Note that the wireless communication (including the sidelink communication) used by the terminal device 30 may be wireless communication using radio waves or may be (optical) wireless communication using infrared rays or visible light.

Furthermore, the terminal device 30 may be a mobile device. Here, the mobile device is a movable wireless communication device. Here, the terminal device 30 may be a wireless communication device installed on a mobile body, or may be the mobile body itself. For example, the terminal device 30 may be a vehicle that moves on a road, such as an automobile, a bus, a truck, or a motorcycle, or a wireless communication device mounted on the vehicle. Note that the mobile body may be a mobile terminal, or may be a mobile body that moves on land (on the ground in a narrow sense), in the ground, on water, or under water. Furthermore, the mobile body may be a mobile body that moves inside the atmosphere, such as a drone or a helicopter, or may be a mobile body that moves outside the atmosphere, such as an artificial satellite.

The terminal device 30 may be simultaneously connected to a plurality of base station devices or a plurality of cells to perform communication. For example, in a case where one base station device supports a communication area via a plurality of cells (for example, pCell or sCell), it is possible to bundle the plurality of cells and enable communication between the base station device 40 and the terminal device 30 by using carrier aggregation (CA) technology, dual connectivity (DC) technology, or multi-connectivity (MC) technology. Alternatively, the terminal device 30 and the plurality of base station devices 40 can perform communication with each other by using coordinated multi-point transmission and reception (CoMP) technology via cells of different base station devices 40.

Note that the terminal device 30 is not necessarily used by a person. The terminal device 30 may be a sensor installed in a machine or a building of a factory like so-called machine type communication (MTC). For example, the terminal device 30 may be a machine-to-machine (M2M) device or an Internet of Things (IoT) device. Furthermore, the terminal device 30 may be a device having a relay communication function as represented by device-to-device (D2D) and vehicle-to-everything (V2X). Further, the terminal device 30 may be a device that is called client premises equipment (CPE) used in a wireless backhaul or the like. Further, the terminal device 30 may be a wireless communication device installed on a mobile body, or may be the mobile body itself.

[Base Station Device]

The base station device 40 (second wireless system) is a wireless communication device that performs wireless communication with the terminal device 30 or another communication device (another base station device 40 or another proxy device 50). The base station device 40 is a type of communication device. The base station device 40 is, for example, a device corresponding to a wireless base station (Node B, eNB, gNB, or the like) or a radio access point. The base station device 40 may be a wireless relay station. The base station device 40 may be a road side base station device such as a road side unit (RSU). Furthermore, the base station device 40 may be an optical feeder device which is called a remote radio head (RRH). The base station device 40 may be an integrated access and backhaul (IAB) donor node or IAB relay node that provides a radio access line and a radio backhaul line by time division multiplexing, frequency division multiplexing, or space division multiplexing.

In the present embodiment, the base station of the wireless communication system may be referred to as the base station device. Note that the radio access technology used by the base station device 40 may be cellular communication technology or wireless LAN technology. It is a matter of course that the radio access technology used by the base station device 40 is not limited thereto, and may be another radio access technology. Further, the wireless communication used by the base station device 40 may be wireless communication using radio waves or (optical) wireless communication using infrared rays or visible light.

The base station device 40 is not necessarily fixed, and may be installed in a moving object such as an automobile. Furthermore, the base station device 40 does not necessarily need to exist on the ground, and a communication device function may be provided in an object existing in the air or space, such as an aircraft, a drone, a helicopter, or a satellite, or an object existing on the sea or under the sea, such as a ship or a submarine. In such a case, the base station device 40 can perform wireless communication with another fixedly installed communication device.

Note that the concept of the base station device (also referred to as the base station) includes not only a donor base station but also a relay base station (also referred to as a relay station or a relay station device). The concept of the base station also includes an access point. Further, the concept of the base station includes not only a structure having the function of the base station, but also a device installed in the structure.

The structure is, for example, a building such as an office building, a house, a steel tower, a station facility, an airport facility, a port facility, or a stadium. Note that the concept of the structure includes not only a building, but also a non-building structure such as a tunnel, a bridge, a dam, a fence, or a steel column, or a facility such as a crane, a gate, or a windmill. In addition, the concept of the structure includes not only a structure on land (on the ground in a narrow sense) or in the ground, but also a structure on the water, such as a landing stage or Mega-Float, or a structure underwater such as an oceanographical observation facility.

The base station device 40 may be a donor station or a relay station. Furthermore, the base station device 40 may be a fixed station or a mobile station. The mobile station is a wireless communication device (for example, the base station device) configured to be movable. Here, the base station device 40 may be a device installed on a mobile body, or may be the mobile body itself. For example, a relay station device having mobility can be regarded as the base station device 40 as the mobile station. In addition, a device that originally has mobility, such as a vehicle, a drone, or a smartphone, and has the function of the base station device (at least a part of the function of the base station device) also corresponds to the base station device 40 as the mobile station.

Here, the mobile body may be a mobile terminal such as a smartphone or a mobile phone. The mobile body may be a mobile body (for example, a vehicle such as an automobile, a bicycle, a bus, a truck, a motorcycle, a train, or a linear motor car) that moves on land (on the ground in a narrow sense), or may be a mobile body (for example, subway) that moves in the ground (for example, in a tunnel).

Further, the mobile body may be a mobile body (for example, a vessel such as a passenger ship, a cargo ship, or a hovercraft) that moves on the water, or may be a mobile body (for example, a submersible boat such as a submersible, a submarine, or an unmanned underwater vehicle) that moves underwater.

Further, the mobile body may be a mobile body (for example, an aircraft such as an airplane, an airship, or a drone) that moves in the atmosphere, or may be a mobile body (for example, an artificial celestial body such as a satellite, a spaceship, a space station, a space probe) that moves outside the atmosphere. The mobile body that moves outside the atmosphere can be rephrased as a space mobile body.

Furthermore, the base station device 40 may be a ground base station device (ground station device) installed on the ground. For example, the base station device 40 may be a base station device arranged in a structure on the ground, or may be a base station device installed in a mobile body moving on the ground. More specifically, the base station device 40 may be an antenna installed in a structure such as a building and a signal processing device connected to the antenna. It is a matter of course that the base station device 40 may be a structure or a mobile body itself. The phrase "on the ground" not only means on land (on the ground in a narrow sense), but also means in the ground, on the water, and underwater in a broad sense.

Note that the base station device 40 is not limited to the ground base station device. The base station device 40 may be a non-ground base station device (non-ground station device) capable of floating in the air or space. For example, the base station device 40 may be an aircraft station device or a satellite station device.

The aircraft station device is a wireless communication device capable of floating in the atmosphere, such as an aircraft. The aircraft station device may be a device mounted on an aircraft or the like, or may be the aircraft itself. Note that the concept of the aircraft includes not only a heavy aircraft such as an airplane or a glider, but also a light aircraft such as a balloon or an airship. Further, the concept of the aircraft includes not only the heavy aircraft and the light aircraft, but also a rotary-wing aircraft such as a helicopter or an autogyro. Note that the aircraft station device (or the aircraft on which the aircraft station device is mounted) may be an unmanned aircraft such as a drone.

Note that the concept of the unmanned aircraft also includes unmanned aircraft systems (UAS) and a tethered UAS. The concept of the unmanned aircraft also includes a Lighter than Air UAS (LTA) and a Heavier than Air UAS (HTA). In addition, the concept of the unmanned aircraft also includes high altitude UAS platforms (HAPs).

The satellite station device is a wireless communication device capable of floating outside the atmosphere. The satellite station device may be a device mounted on a space mobile body such as an artificial satellite, or may be the space mobile body itself. A satellite that serves as the satellite station device may be any one of a low earth orbiting (LEO) satellite, a medium earth orbiting (MEO) satellite, a geostationary earth orbiting (GEO) satellite, or a highly elliptical orbiting (HEO) satellite. It is a matter of course that the satellite station device may be a device mounted on the LEO satellite, the MEO satellite, the GEO satellite, or the HEO satellite.

As described above, the base station device 40 may also be the relay station device. The relay station device is, for example, an aviation station or an earth station. The relay station device can be regarded as a kind of the above-described relay device. The aviation station is a radio station installed on the ground or on a mobile body moving on the ground to perform communication with the aircraft station device. Further, the earth station is a radio station located on the earth (including in the air) to perform communication with the satellite station device. The earth station may be a large earth station or a small earth station such as a very small aperture terminal (VSAT).

Note that the earth station may be a VSAT control earth station (also referred to as a master station or a HUB station) or a VSAT earth station (also referred to as a slave station). Further, the earth station may be a radio station installed in a mobile body that moves on the ground. Examples of an earth station mounted on a vessel can include earth stations on board vessels (ESV). Further, the earth station may also include an aircraft earth station installed on an aircraft (including a helicopter) and performing communication with a satellite station. Further, the earth station may include an aeronautical earth station that is installed in a mobile body that moves on the ground and performs communication with an aircraft earth station via a satellite station. Note that the relay station device may be a portable mobile radio station that performs communication with a satellite station or an aircraft station.

The size of the coverage of the base station device 40 may be large like a macrocell or may be small like a picocell. It is a matter of course that the size of the coverage of the base station device 40 may be extremely small like a femtocell. Further, the base station device 40 may have a beamforming capability. In this case, the base station device 40 may form a cell or a service area for each beam.

The base station device 40 may be used, operated, and/or managed by various entities. For example, the base station device 40 may be assumed to be used, operated, and/or managed by a mobile network operator (MNO), a mobile virtual network operator (MVNO), a mobile virtual network enabler (MVNE), a neutral host network (NHN) operator, an enterprise, an educational institution (an educational institution, a board of a local government, or the like), a real estate (building, apartment, or the like) administrator, an individual, or the like. It is a matter of course that the subject of the use, operation, and/or management of the base station device 40 is not limited thereto.

The base station device 40 may be installed and/or operated by one business operator, or may be installed and/or operated by one individual. It is a matter of course that the entity who installs/operates the base station device 40 is not limited thereto. For example, the base station device 40 may be jointly installed/operated by a plurality of business operators or a plurality of individuals. Further, the base station device 40 may be a shared facility used by a plurality of business operators or a plurality of individuals. In this case, the installation and/or operation of the facility may be carried out by a third party different from the user.

The base station device 40 operated by a business operator is typically connected to the Internet via a core network. Furthermore, the base station device 40 performs operation management/maintenance by a function called operation, administration & maintenance (OA&M). Note that, in the communication system 2, for example, there may be a network manager that integrally controls the base station device 40 in the network.

[Proxy Device]

The proxy device 50 (proxy system) is a device that performs communication with the communication control device 60 as a proxy (representative) of one or more communication devices (for example, the base station device 40). The proxy device 50 is also a type of communication device.

The proxy device 50 may be a domain proxy (DP) defined in Non Patent Literature 2 or the like. Here, the DP refers to an entity that performs communication with the SAS instead of each of a plurality of CBSDs or a network including a plurality of CBSDs. Note that the proxy device 50 is not limited to the DP defined in Non Patent Literature 2 as long as it has a function of performing communication with the communication control device 60 as a proxy (representative) of one or more communication devices. The network manager that integrally controls the base station device 40 in the network may be regarded as the proxy device 50.

Note that the proxy system may include one device or a plurality of devices. The communication between the proxy device 50 and the base station device 40 may be wired communication or wireless communication. Similarly, the communication between the proxy device 50 and the communication control device 60 may be wired communication or wireless communication.

Note that the communication device that the proxy device 50 substitutes (represents) is not limited to the base station device 40, and may be, for example, the terminal device 30. In the following description, one or more communication devices (for example, one or more base station devices 40) that the proxy device 50 substitutes (represents) may be referred to as subordinate communication devices (for example, a subordinate base station device 40).

[Communication Control Device]

The communication control device 60 is a device that manages the base station device 40. For example, the communication control device 60 is a device that controls wireless communication of the base station device 40. For example, the communication control device 60 is a device that determines a communication parameter (also referred to as an operational parameter) to be used by the base station device 40 and gives permission or an instruction to the base station device 40.

At this time, the communication control device 60 may be a network manager that integrally controls wireless devices in the network. Taking ETSI EN 303 387 or IEEE 802.19.1-2014 as an example, the communication control device 60 may be a control device such as a spectrum manager/coexistence manager that performs a radio wave interference control between wireless devices. Furthermore, for example, a registered location secure server (RLSS) defined in IEEE 802.11-2016 can also serve as the communication control device 60. Furthermore, in a frequency sharing environment, a database (a database server, a device, or a system) such as a geolocation database (GLDB) or a spectrum access system (SAS) can also serve as the communication control device 60.

Note that in a case where the communication system 2 is a cellular communication system, the communication control device 60 may be a device configuring a core network. A core network CN is, for example, evolved packet core (EPC) or 5G core network (5GC). In a case where the core network is the EPC, the communication control device 60 may be, for example, a device having a function as a mobility management entity (MME). Furthermore, in a case where the core network is the 5GC, the communication control device 60 may be, for example, a device having a function as an access and mobility management function (AMF) or a session management function (SMF). Note that even in a case where the communication system 2 is a cellular communication system, the communication control device 60 does not necessarily have to be a device configuring the core network. For example, the communication control device 60 may be a device having a function as a radio network controller (RNC).

Note that the communication control device 60 may have a function of a gateway. For example, in a case where the core network is the EPC, the communication control device 60 may be a device having a function as a serving gateway (S-GW) or a packet data network gateway (P-GW). Further, in a case where the core network is the 5GC, the communication control device 60 may be a device having a function as a user plane function (UPF). Note that the communication control device 60 does not necessarily have to be a device configuring the core network. For example, it is assumed that the core network is a core network of W-CDMA or cdma2000. At this time, the communication control device 60 may be a device that functions as the radio network controller (RNC).

Basically, a control target of the communication control device 60 is the base station device 40, but the communication control device 60 may also control the terminal device 30 subordinate to the base station device 40. Furthermore, the communication control device 60 may control a plurality of secondary systems. In this case, the communication system 2 can be regarded as a system including a plurality of secondary systems.

Figure 5:
FIG. 5 is a diagram illustrating a model in which communication control devices are arranged in a distributed manner.

Furthermore, a plurality of communication control devices 60 may be present in one communication system 2. FIG. 5 is a diagram illustrating a model in which the communication control devices 60 are arranged in a distributed manner. In this case, the plurality of communication control devices 60 (in the example of FIG. 5, a communication control device 603 and a communication control device 604) exchange information of the base station devices 40 to be managed with each other, and perform allocation of necessary frequencies and calculation for an interference control.

Figure 6:
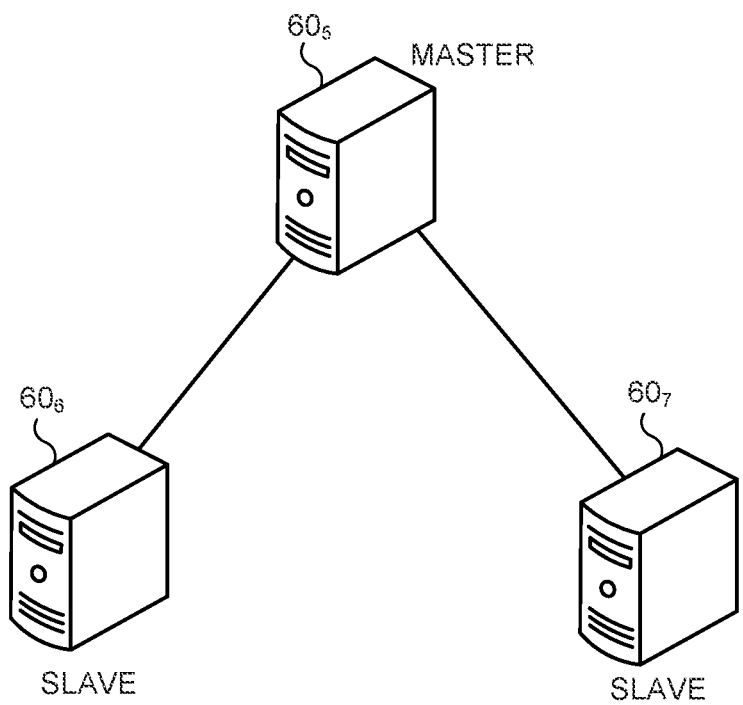
FIG. 6 is a diagram illustrating a model in which one communication control device centrally controls a plurality of communication control devices.

Furthermore, the communication control device 60 may be a master-slave device. FIG. 6 is a diagram illustrating a model (so-called master-slave model) in which one communication control device centrally controls a plurality of communication control devices. In the example of FIG. 6, a communication control device 606 is a master communication control device, and communication control devices 606 and 607 are slave communication control devices. In such a system, the master communication control device can control a plurality of slave communication control devices to intensively make a decision. In addition, the master communication control device can also perform delegation, discarding, and the like of a decision-making authority on each slave communication control device for the purpose of load distribution (load balancing) and the like.

Note that the communication control device 60 can also acquire necessary information from entities other than the base station device 40, the terminal device 30, and the proxy device 50 for its role. Specifically, the communication control device 60 can acquire information necessary for protection, such as position information of the primary system, from a database (regulatory database) managed and operated by a national or regional radio wave administration agency, for example. Examples of the regulatory database include a universal licensing system (ULS) operated by the Federal Communications Commissions of the United States. Other examples of the information necessary for protection may include an out-of-band emission (OOBE) limit, an adjacent channel leakage ratio (ACLR), adjacent channel selectivity, a fading margin, a protection ratio (PR), and/or the like. For these examples, it is desirable to use numerical values in a case where these numerical values are fixedly given in legislation.

Furthermore, as another example, it can be assumed that the communication control device 60 acquires radio wave sensing information from a radio wave sensing system installed and operated for the purpose of radio wave sensing in the primary system. As a specific example, the communication control device 60 can acquire radio wave sensing information of the primary system from a radio wave sensing system such as environmental sensing capability (ESC) in the CBRS of the United States. Furthermore, in a case where the communication device or the terminal has a sensing function, the communication control device 60 may acquire radio wave sensing information of the primary system from the communication device or the terminal.

Hereinafter, a configuration of each device included in the communication system 1000 will be specifically described.

2-2. Configuration of Radio Wave Use Device

Figure 7:
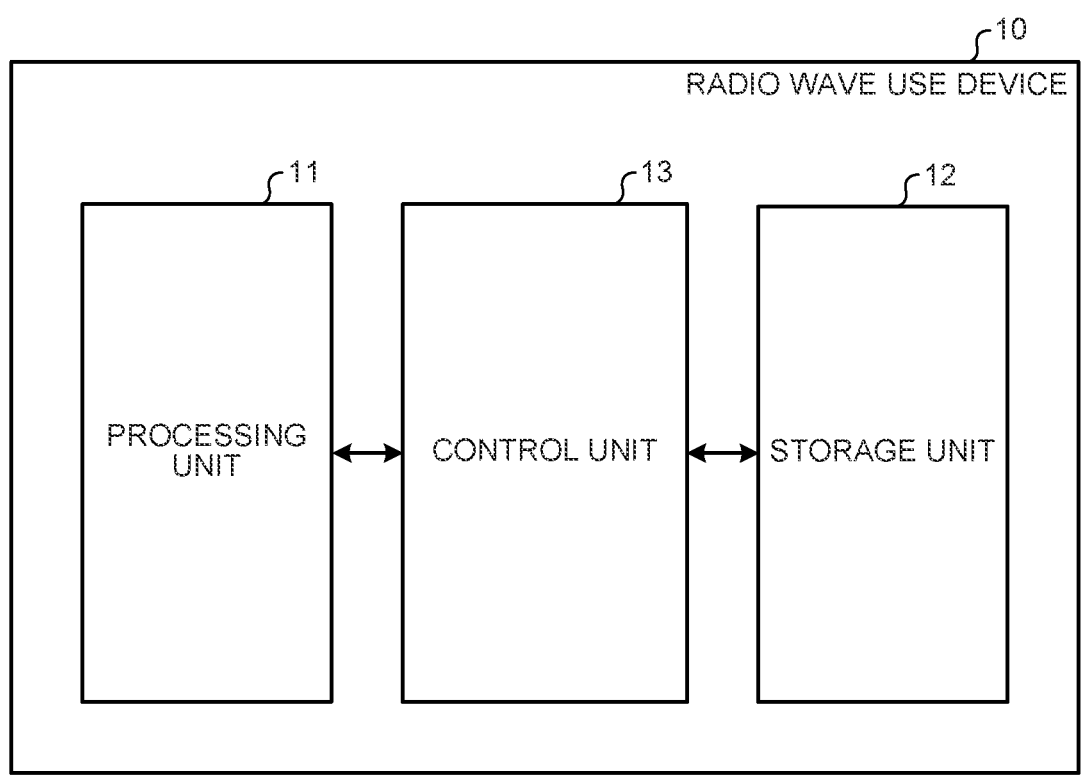
FIG. 7 is a diagram illustrating an example of a configuration of a radio wave use device according to an embodiment of the present disclosure.

First, a configuration of the radio wave use device 10 will be described. FIG. 7 is a diagram illustrating an example of the configuration of the radio wave use device 10 according to an embodiment of the present disclosure. The radio wave use device 10 primarily uses a predetermined frequency band. For example, the radio wave use device 10 is a communication device (wireless system) that performs wireless communication with another wireless communication device. In this case, the radio wave use device 10 can be regarded as a type of communication device. Note that the radio wave use device 10 may be a radio wave emission device or a reflected wave reception device. The radio wave use device 10 is a type of information processing device.

The radio wave use device 10 includes a processing unit 11, a storage unit 12, and a control unit 13. Note that the configuration illustrated in FIG. 7 is a functional configuration, and a hardware configuration may be different from this. Further, the functions of the radio wave use device 10 may be distributed to and implemented in a plurality of physically separated components.

The processing unit 11 is a processing unit for using radio waves in a predetermined frequency band. For example, the processing unit 11 is a signal processing unit that performs various processing for outputting and receiving radio waves in a predetermined frequency band. In a case where the radio wave use device 10 is a wireless communication device, the processing unit 11 may be a wireless communication interface that performs wireless communication with another communication device. Here, another communication device include not only a communication device that performs cellular communication or the like but also a transmission device that transmits broadcast waves such as television broadcasting waves and a reception device that receives broadcast waves.

The storage unit 12 is a data readable/writable storage device such as a dynamic random access memory (DRAM), a static random access memory (SRAM), a flash memory, or a hard disk. The storage unit 12 functions as a storage means of the radio wave use device 10.

The control unit 13 is a controller that controls each unit of the radio wave use device 10. The control unit 13 is implemented by, for example, a processor such as a central processing unit (CPU) or a micro processing unit (MPU). For example, the control unit 13 is implemented in a manner in which the processor executes various programs stored in the storage device inside the radio wave use device 10 by using a random access memory (RAM) or the like as a work area. Note that the control unit 13 may be implemented by an integrated circuit such as an application specific integrated circuit (ASIC) or a field programmable gate array (FPGA). The CPU, the MPU, the ASIC, and the FPGA can all be regarded as the controller.

Note that the radio wave use device 10 may have a function as the management device 20. In this case, the control unit 13 may have each functional block included in the control unit of the management device 20.

<2-3. Configuration of Management Device>

Figure 8:
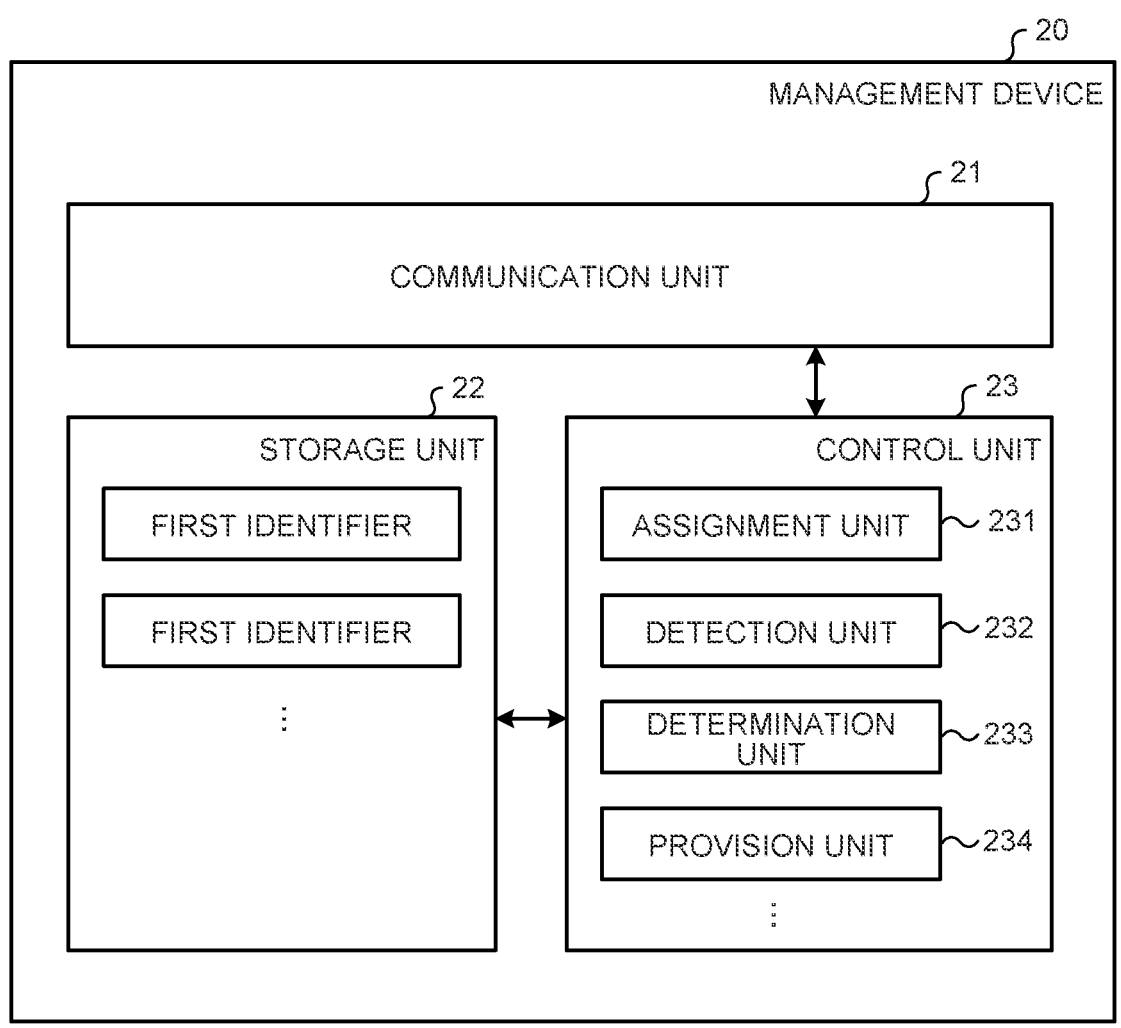
FIG. 8 is a diagram illustrating an example of a configuration of a management device according to an embodiment of the present disclosure.

Next, a configuration of the management device 20 will be described. FIG. 8 is a diagram illustrating an example of the configuration of the management device 20 according to an embodiment of the present disclosure. The management device 20 is a device that manages the radio wave use device 10. The management device 20 may be a device that manages radio wave output of the radio wave use device 10, or may be a device that manages information such as an installation mode and a management entity of the radio wave use device 10. The management device 20 is a type of information processing device.

The management device 20 includes a communication unit 21, a storage unit 22, and a control unit 23. Note that the configuration illustrated in FIG. 7 is a functional configuration, and a hardware configuration may be different from this. Further, the functions of the management device 20 may be distributed to and implemented in a plurality of physically separated components.

The communication unit 21 is a communication interface for performing communication with another device. The communication unit 21 may be a network interface or may be a device connection interface. For example, the communication unit 21 may be a local area network (LAN) interface such as a network interface card (NIC), or may be a universal serial bus (USB) interface including a USB host controller, a USB port, and the like. Further, the communication unit 21 may be a wired interface or a wireless interface. The communication unit 21 functions as a communication means of the management device 20. The communication unit 21 performs communication with the radio wave use device 10 under the control of the control unit 23.

The storage unit 22 is a storage device, from which data can be read and in which data can be written, such as a DRAM, an SRAM, a flash memory, or a hard disk. The storage unit 22 functions as a storage means of the management device 20. The storage unit 22 stores a first identifier and the like. The first identifier will be described later.

The control unit 23 is a controller that controls each unit of the management device 20. The control unit 23 is implemented by, for example, a processor such as a CPU or MPU. For example, the control unit 23 is implemented in a manner in which the processor executes various programs stored in the storage device inside the management device 20 by using a RAM or the like as a work area. Note that the control unit 23 may be implemented by an integrated circuit such as an ASIC or FPGA. The CPU, the MPU, the ASIC, and the FPGA can all be regarded as the controller.

As illustrated in FIG. 8, the control unit 23 includes an assignment unit 231, a detection unit 232, a determination unit 233, and a provision unit 234. The respective blocks (the assignment unit 231, the provision unit 234, and the like) included in the control unit 23 are functional blocks each indicating the functions of the control unit 23. These functional blocks may be software blocks or hardware blocks. For example, each of the above-described functional blocks may be one software module implemented by software (including a microprogram) or may be one circuit block on a semiconductor chip (die). It is a matter of course that each functional block may be one processor or one integrated circuit. A method of configuring the functional block is arbitrary. Note that the control unit 23 may be configured with a functional unit different from the above-described functional block.

As described above, the radio wave use device 10 can be regarded as the management device 20. In this case, the term "management device 20" appearing in the following description can be rephrased as the "radio wave use device 10" as appropriate. The terms "control unit 23", "assignment unit 231", "detection unit 232", "determination unit 233", and "provision unit 234" appearing in the following description can also be rephrased as the "control unit 13" as appropriate.

<2-4. Configuration of Terminal Device>

Figure 9:
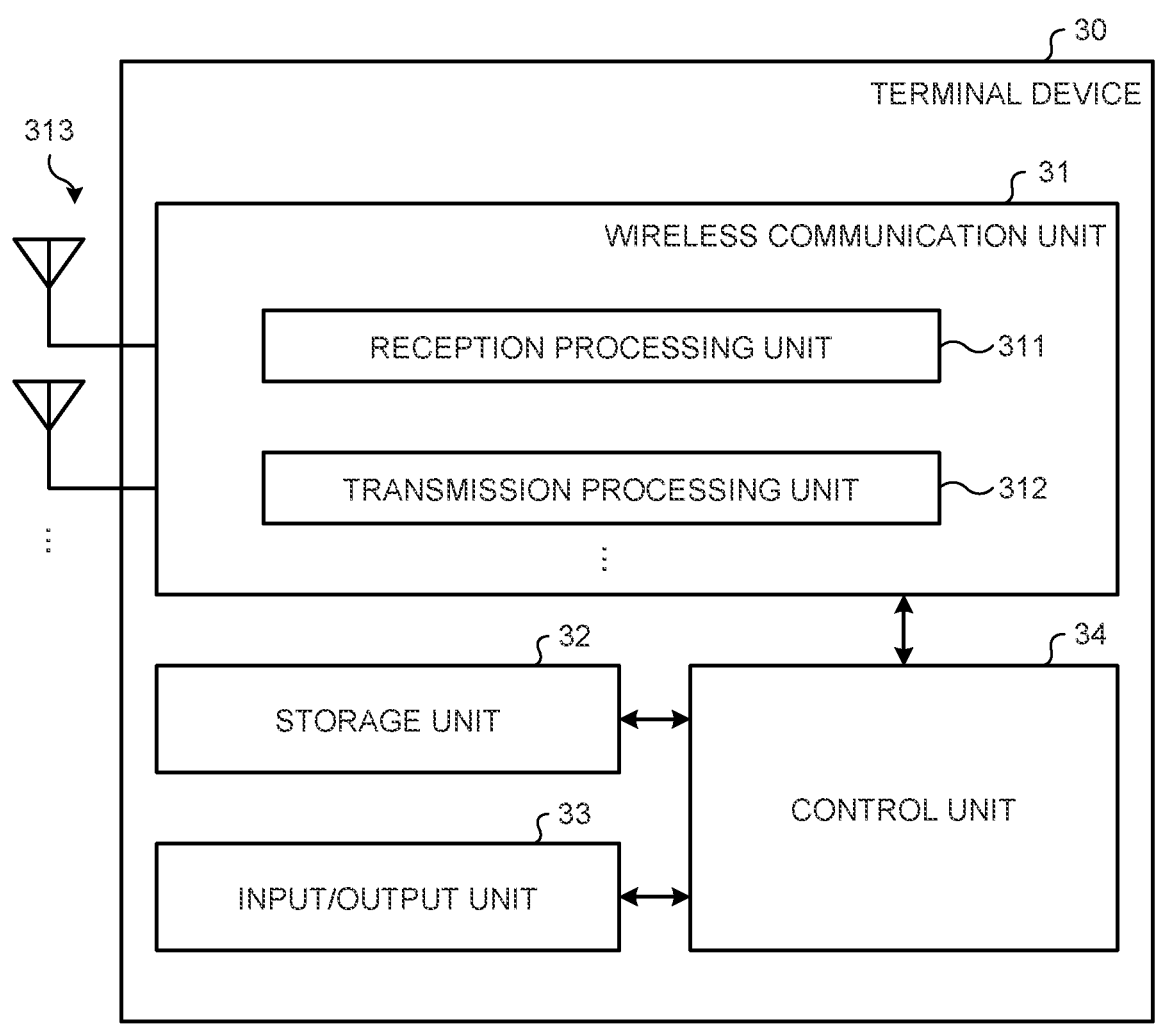
FIG. 9 is a diagram illustrating an example of a configuration of a terminal device according to an embodiment of the present disclosure.

Next, the configuration of the terminal device 30 will be described. FIG. 9 is a diagram illustrating an example of the configuration of the terminal device 30 according to an embodiment of the present disclosure. The terminal device 30 is a communication device (wireless system) that performs wireless communication with the base station device 40 and/or the communication control device 60. The terminal device 30 is a type of information processing device.

The terminal device 30 includes a wireless communication unit 31, a storage unit 32, an input/output unit 33, and a control unit 34. Note that the configuration illustrated in FIG. 9 is a functional configuration, and a hardware configuration may be different from this. Further, the functions of the terminal device 30 may be distributed to and implemented in a plurality of physically separated components.

The wireless communication unit 31 is a wireless communication interface that performs wireless communication with other communication devices (for example, the base station device 40 and another terminal device 30). The wireless communication unit 31 is operated under the control of the control unit 34. The wireless communication unit 31 supports one or more radio access schemes. For example, the wireless communication unit 31 supports both NR and LTE. The wireless communication unit 31 may support another radio access scheme such as W-CDMA or cdma2000.

The wireless communication unit 31 includes a reception processing unit 311, a transmission processing unit 312, and an antenna 313. The wireless communication unit 31 may include a plurality of reception processing units 311, a plurality of transmission processing units 312, and a plurality of antennas 313. Note that, in a case where the wireless communication unit 31 supports a plurality of radio access schemes, each unit of the wireless communication unit 31 can be individually configured for each radio access scheme. For example, the reception processing unit 311 and the transmission processing unit 312 may be individually configured for each of LTE and NR. The configurations of the reception processing unit 311 and the transmission processing unit 312 are similar to those of a reception processing unit 411 and a transmission processing unit 412 of the base station device 40.

The storage unit 32 is a storage device, from which data can be read and in which data can be written, such as a DRAM, an SRAM, a flash memory, or a hard disk. The storage unit 32 functions as a storage means of the terminal device 30.

The input/output unit 33 is a user interface for exchanging information with the user. For example, the input/output unit 33 is an operation device for the user to perform various operations, such as a keyboard, a mouse, an operation key, or a touch panel. Alternatively, the input/output unit 33 is a display device such as a liquid crystal display or an organic electroluminescence (EL) display. The input/output unit 33 may be an audio device such as a speaker or a buzzer. Further, the input/output unit 33 may be a lighting device such as a light emitting diode (LED) lamp. The input/output unit 33 functions as an input/output means (input means, output means, operation means, or notification means) of the terminal device 30.

The control unit 34 is a controller that controls each unit of the terminal device 30. The control unit 34 is implemented by, for example, a processor such as a CPU or MPU. For example, the control unit 34 is implemented in a manner in which the processor executes various programs stored in the storage device inside the terminal device 30 by using a RAM or the like as a work area. Note that the control unit 34 may be implemented by an integrated circuit such as an ASIC or FPGA. The CPU, the MPU, the ASIC, and the FPGA can all be regarded as the controller. Note that the control unit 34 may have each functional block included in the control unit of the base station device 40.

<2-5. Configuration of Base Station Device>

Figure 10:
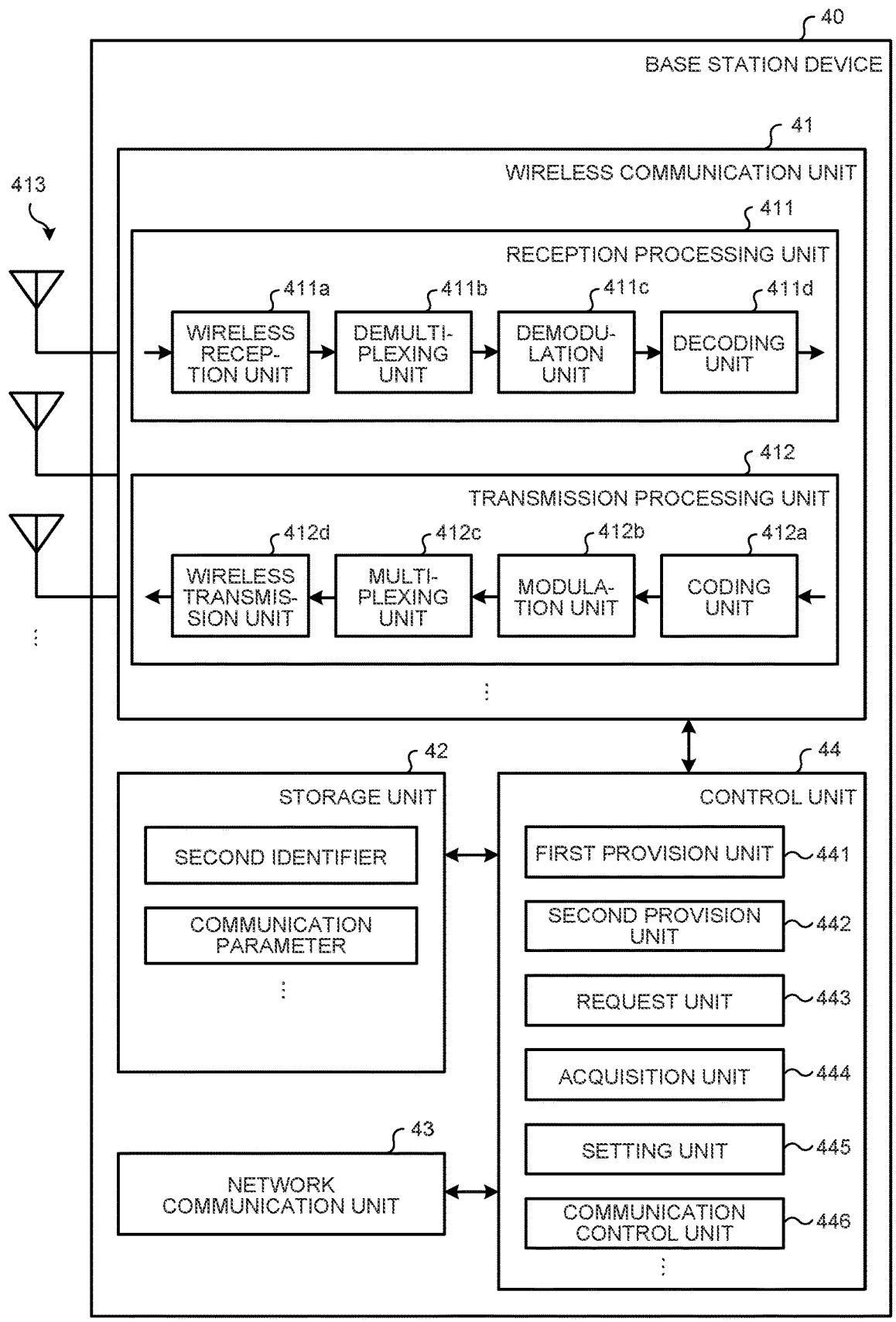
FIG. 10 is a diagram illustrating an example of a configuration of a base station device according to an embodiment of the present disclosure.

Next, the configuration of the base station device 40 will be described. FIG. 10 is a diagram illustrating an example of the configuration of the base station device 40 according to an embodiment of the present disclosure. The base station device 40 is a communication device (radio system) that performs wireless communication with the terminal device 30 under the control of the communication control device 60. The base station device 40 is a type of information processing device.

The base station device 40 includes a wireless communication unit 41, a storage unit 42, a network communication unit 43, and a control unit 44. Note that the configuration illustrated in FIG. 10 is a functional configuration, and a hardware configuration may be different from this. Further, the functions of the base station device 40 may be distributed to and implemented in a plurality of physically separated devices.

The wireless communication unit 41 is a wireless communication interface that performs wireless communication with other communication devices (for example, the terminal device 30, the communication control device 60, the proxy device 50, and another base station device 40). The wireless communication unit 41 is operated under the control of the control unit 44. The wireless communication unit 41 may support a plurality of radio access schemes. For example, the wireless communication unit 41 may support both NR and LTE. The wireless communication unit 41 may support another cellular communication scheme such as W-CDMA or cdma2000. Further, the wireless communication unit 41 may support a wireless LAN communication scheme in addition to the cellular communication scheme. It is a matter of course that the wireless communication unit 41 may only support one radio access scheme.

The wireless communication unit 41 includes a reception processing unit 411, a transmission processing unit 412, and an antenna 413. The wireless communication unit 41 may include a plurality of reception processing units 411, a plurality of transmission processing units 412, and a plurality of antennas 413. Note that, in a case where the wireless communication unit 41 supports a plurality of radio access schemes, each unit of the wireless communication unit 41 can be individually configured for each radio access scheme. For example, in a case where the base station device 40 supports NR and LTE, the reception processing unit 411 and the transmission processing unit 412 may be individually configured for each of NR and LTE.

The reception processing unit 411 processes an uplink signal received via the antenna 413. The reception processing unit 411 includes a wireless reception unit 411a, a demultiplexing unit 411b, a demodulation unit 411c, and a decoding unit 411d.

The wireless reception unit 411a performs, on the uplink signal, down-conversion, removal of an unnecessary frequency component, a control of an amplification level, quadrature demodulation, conversion into a digital signal, removal of a guard interval, extraction of a frequency domain signal by fast Fourier transform, and the like. For example, it is assumed that the radio access scheme of the base station device 40 is a cellular communication scheme such as LTE. At this time, the demultiplexing unit 411b separates an uplink channel such as a physical uplink shared channel (PUSCH) or physical uplink control channel (PUCCH) and an uplink reference signal from a signal output from the wireless reception unit 411a. The demodulation unit 411c performs demodulation of a received signal for a modulation symbol of the uplink channel by using a modulation scheme such as binary phase shift keying (BPSK) or quadrature phase shift keying (QPSK). The modulation scheme used by the demodulation unit 411c may be 16-quadrature amplitude modulation (QAM), 64-QAM, or 256-QAM. The decoding unit 411d performs decoding processing on a coded bit of the demodulated uplink channel. Decoded uplink data and uplink control information are output to the control unit 44.

The transmission processing unit 412 performs transmission processing of downlink control information and downlink data. The transmission processing unit 412 includes a coding unit 412a, a modulation unit 412b, a multiplexing unit 412c, and a wireless transmission unit 412d.

The coding unit 412a codes the downlink control information and the downlink data input from the control unit 44 by using a coding method such as block coding, convolutional coding, or turbo coding. The modulation unit 412b modulates the coded bit output from the coding unit 412a by a predetermined modulation scheme such as BPSK, QPSK, 16-QAM, 64-QAM, or 256-QAM. The multiplexing unit 412c multiplexes a modulation symbol of each channel and a downlink reference signal, and maps them to a predetermined resource element. The wireless transmission unit 412d performs various kinds of signal processing on a signal from the multiplexing unit 412c. For example, the wireless transmission unit 412d performs processing such as conversion into the time domain by fast Fourier transform, addition of a guard interval, generation of a baseband digital signal, conversion into an analog signal, quadrature modulation, up-conversion, removal of extra frequency components, or power amplification. A signal generated by the transmission processing unit 412 is transmitted from the antenna 413.

The storage unit 42 is a storage device, from which data can be read and in which data can be written, such as a DRAM, an SRAM, a flash memory, or a hard disk. The storage unit 42 functions as a storage means of the base station device 40. The storage unit 42 stores desired transmission power information, an operational parameter, held resource information, and the like.

The desired transmission power information is information on transmission power for which the base station device 40 requests the communication control device 60 as information on transmission power necessary for transmitting radio waves.

The operational parameter is information (for example, setting information) regarding a radio wave transmission operation of the base station device 40. For example, the operational parameter is information on a maximum value (allowable maximum transmission power) of transmission power allowed for the base station device 40. It is a matter of course that the operational parameter is not limited to the information on the allowable maximum transmission power.

The held resource information is information regarding holding of a wireless resource of the base station device 40. For example, the held resource information is information on a wireless resource that can be currently used by the base station device 40. For example, the held resource information is information on the amount in which the base station device 40 holds the interference margin allocated from the communication control device 60. The information on the holding amount may be information on a resource block unit as described later. That is, the held resource information may be information (for example, the amount in which resource blocks are held) regarding a resource block held by the base station device 40.

The network communication unit 43 is a communication interface for performing communication with other devices (for example, the communication control device 60, the proxy device 50, and another base station device 40). For example, the network communication unit 43 is a local area network (LAN) interface such as a network interface card (NIC). The network communication unit 43 may be a universal serial bus (USB) interface including a USB host controller, a USB port, and the like. Further, the network communication unit 43 may be a wired interface or a wireless interface. The network communication unit 43 functions as a network communication means of the base station device 40. The network communication unit 43 performs communication with another device under the control of the control unit 44.

The control unit 44 is a controller that controls each unit of the base station device 40. The control unit 44 is implemented by, for example, a processor such as a central processing unit (CPU) or a micro processing unit (MPU). For example, the control unit 44 is implemented in a manner in which the processor executes various programs stored in the storage device inside the base station device 40 by using a random access memory (RAM) or the like as a work area. Note that the control unit 44 may be implemented by an integrated circuit such as an application specific integrated circuit (ASIC) or a field programmable gate array (FPGA). The CPU, the MPU, the ASIC, and the FPGA can all be regarded as the controller.

As illustrated in FIG. 10, the control unit 44 includes a first provision unit 441, a second provision unit 442, a request unit 443, an acquisition unit 444, a setting unit 445, and a communication control unit 446. The respective blocks (the first provision unit 441, the communication control unit 446, and the like) included in the control unit 44 are functional blocks each indicating the functions of the control unit 44. These functional blocks may be software blocks or hardware blocks. For example, each of the above-described functional blocks may be one software module implemented by software (including a microprogram) or may be one circuit block on a semiconductor chip (die). It is a matter of course that each functional block may be one processor or one integrated circuit. A method of configuring the functional block is arbitrary. Note that the control unit 44 may be configured with a functional unit different from the above-described functional block.

As described above, the control unit 34 of the terminal device 30 may have each functional block included in the control unit 44 of the base station device 40. In this case, the term "base station device 40" appearing in the following description can be rephrased as the "terminal device 30" as appropriate. In addition, the terms "control unit 44", "first provision unit 441", "second provision unit 442", "request unit 443", "acquisition unit 444", "setting unit 445", and "communication control unit 446" appearing in the following description can also be rephrased as the "control unit 13" as appropriate.

<2-6. Configuration of Proxy Device>

Figure 11:
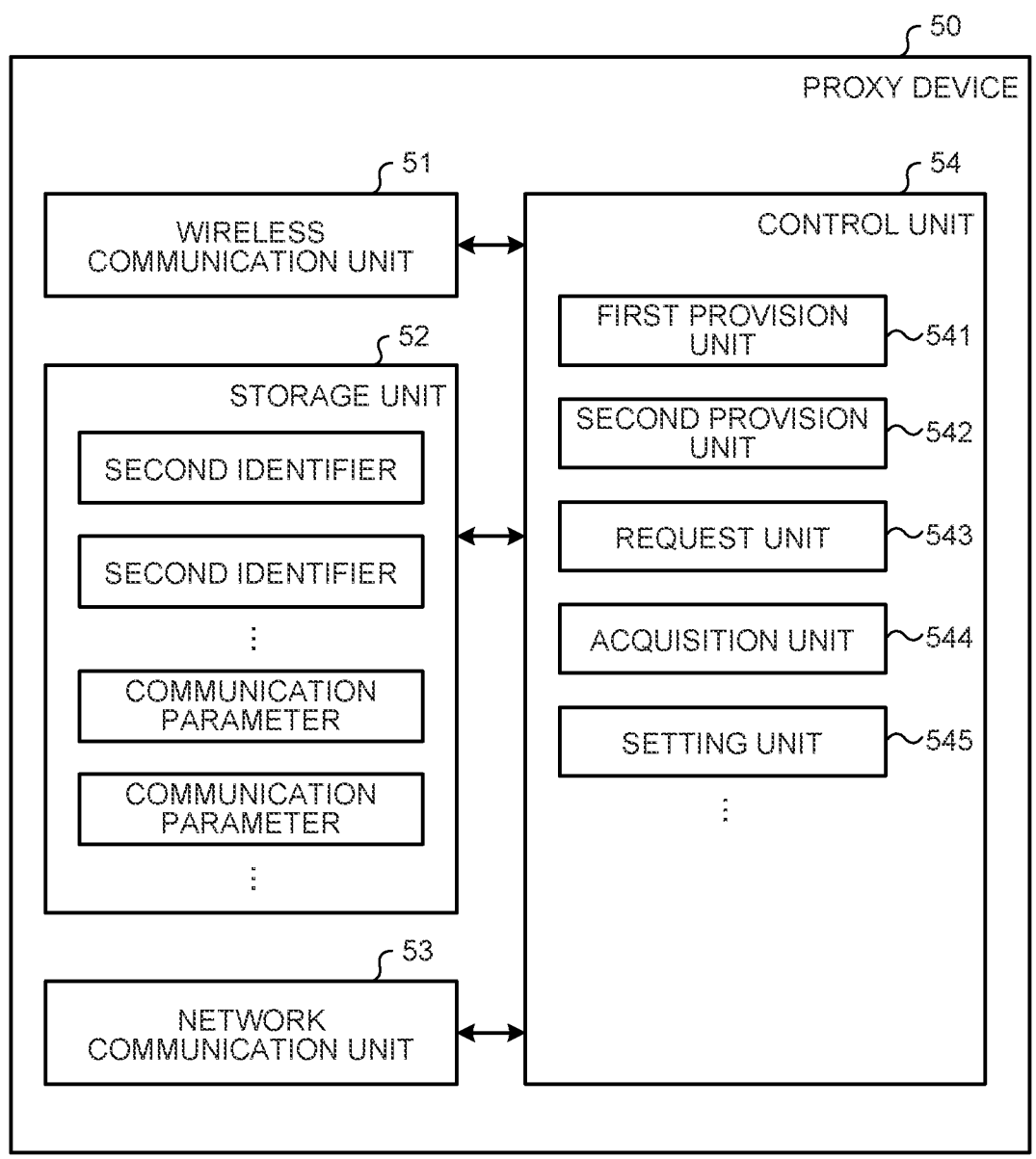
FIG. 11 is a diagram illustrating an example of a configuration of a proxy device according to an embodiment of the present disclosure.

Next, a configuration of the proxy device 50 will be described. FIG. 11 is a diagram illustrating an example of the configuration of the proxy device 50 according to an embodiment of the present disclosure. The proxy device 50 is a communication device that performs communication with the base station device 40 and the communication control device 60. The proxy device 50 is a type of information processing device.

The proxy device 50 includes a wireless communication unit 51, a storage unit 52, a network communication unit 53, and a control unit 54. Note that the configuration illustrated in FIG. 11 is a functional configuration, and a hardware configuration may be different from this. Further, the functions of the proxy device 50 may be distributed to and implemented in a plurality of physically separated components.

The wireless communication unit 51 is a wireless communication interface that performs wireless communication with other communication devices (for example, the base station device 40, the terminal device 30, the communication control device 60, and another proxy device 50). The wireless communication unit 51 is operated under the control of the control unit 54. The wireless communication unit 51 supports one or more radio access schemes. For example, the wireless communication unit 51 supports both NR and LTE. The wireless communication unit 51 may support another radio access scheme such as W-CDMA or cdma2000. The configuration of the wireless communication unit 51 is similar to that of the wireless communication unit 41 of the base station device 40.

The storage unit 52 is a storage device, from which data can be read and in which data can be written, such as a DRAM, an SRAM, a flash memory, or a hard disk. The storage unit 52 functions as a storage means of the proxy device 50. The storage unit 52 may store desired transmission power information, an operational parameter, held resource information, and the like of each subordinate base station device 40.

The network communication unit 53 is a communication interface for performing communication with other devices (for example, the base station device 40, the communication control device 60, and another proxy device 50). For example, the network communication unit 53 is a LAN interface such as an NIC. The network communication unit 53 may be a USB interface including a USB host controller, a USB port, and the like. Further, the network communication unit 53 may be a wired interface or a wireless interface. The network communication unit 53 functions as a network communication means of the proxy device 50. The network communication unit 53 performs communication with another device under the control of the control unit 54.

The control unit 54 is a controller that controls each unit of the proxy device 50. The control unit 54 is implemented by, for example, a processor such as a CPU or MPU. For example, the control unit 54 is implemented in a manner in which the processor executes various programs stored in the storage device inside the proxy device 50 by using a RAM or the like as a work area. Note that the control unit 54 may be implemented by an integrated circuit such as an ASIC or FPGA. The CPU, the MPU, the ASIC, and the FPGA can all be regarded as the controller.

As illustrated in FIG. 11, the control unit 54 includes a first provision unit 541, a second provision unit 542, a request unit 543, an acquisition unit 544, and a setting unit 545. The respective blocks (the first provision unit 541, the setting unit 545, and the like) included in the control unit 54 are functional blocks each indicating the functions of the control unit 54. These functional blocks may be software blocks or hardware blocks. For example, each of the above-described functional blocks may be one software module implemented by software (including a microprogram) or may be one circuit block on a semiconductor chip (die). It is a matter of course that each functional block may be one processor or one integrated circuit. A method of configuring the functional block is arbitrary. Note that the control unit 54 may be configured with a functional unit different from the above-described functional block. The operation of the respective blocks included in the control unit 54 will be described later.

The operation of the respective blocks (the first provision unit 541, the setting unit 545, and the like) included in the control unit 54 may be the same as the operation of the respective blocks (the first provision unit 441, the setting unit 445, and the like) included in the control unit 54 of the base station device 40. In this case, the term "proxy device 50" appearing in the following description can be rephrased as the "base station device 40" as appropriate. Similarly, the terms "control unit 54", "first provision unit 541", "second provision unit 542", "request unit 543", "acquisition unit 544", and "setting unit 545" appearing in the following description can be rephrased as the "control unit 44", the "first provision unit 441", the "second provision unit 442", the "request unit 443", the "acquisition unit 444", and the "setting unit 445".

<2-7. Configuration of Communication Control Device>

The communication control device 60 is a device that controls wireless communication of the base station device 40. The communication control device 60 may control wireless communication of the terminal device 30 via the base station device 40 or in a direct manner. The communication control device 60 is a type of information processing device.

Figure 12:
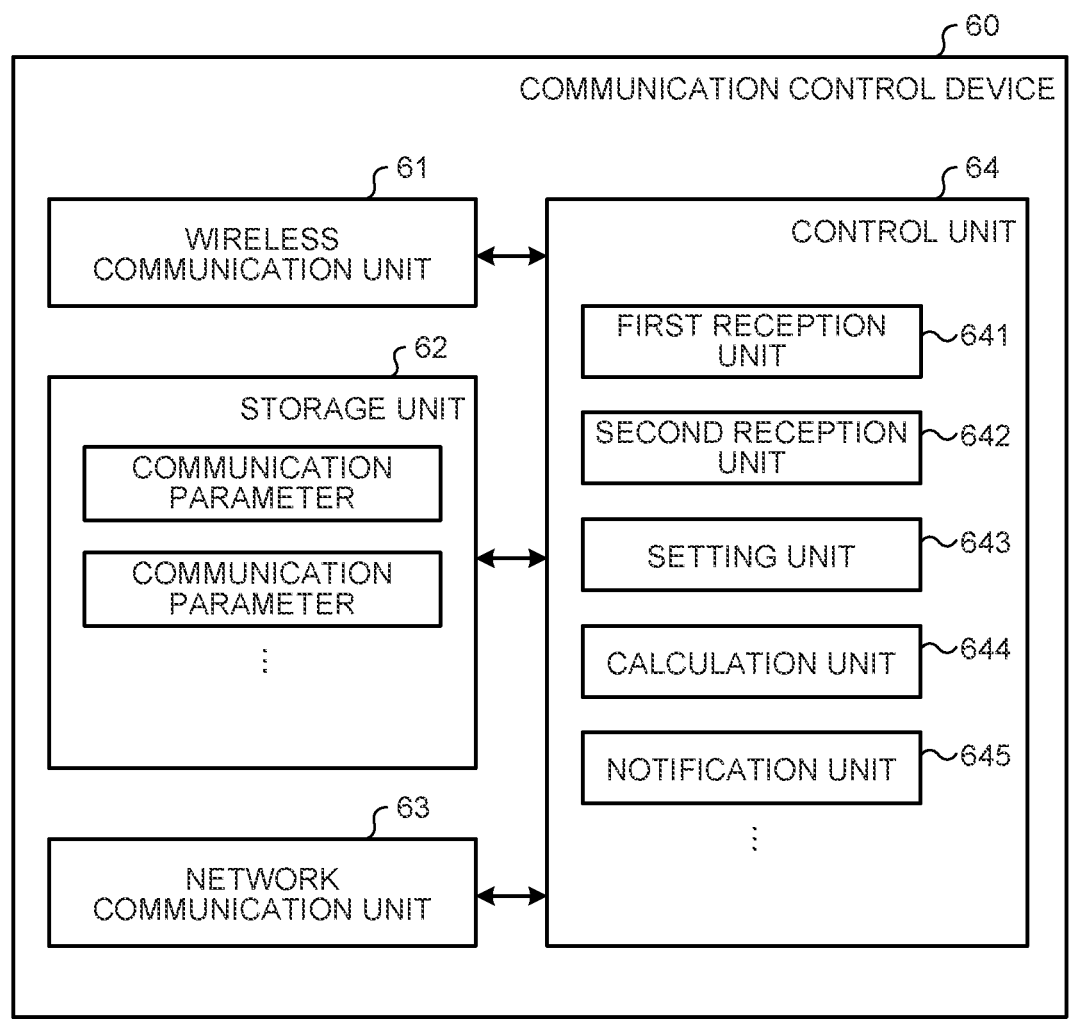
FIG. 12 is a diagram illustrating an example of a configuration of the communication control device according to an embodiment of the present disclosure.

FIG. 12 is a diagram illustrating an example of a configuration of the communication control device 60 according to an embodiment of the present disclosure. The communication control device 60 includes a wireless communication unit 61, a storage unit 62, a network communication unit 63, and a control unit 64. Note that the configuration illustrated in FIG. 12 is a functional configuration, and a hardware configuration may be different from this. Further, the functions of the communication control device 60 may be distributed to and implemented in a plurality of physically separated components. For example, the communication control device 60 may include a plurality of server devices.

The wireless communication unit 61 is a wireless communication interface that performs wireless communication with other communication devices (for example, the base station device 40, the terminal device 30, the proxy device 50, and another communication control device 60). The wireless communication unit 61 is operated under the control of the control unit 64. The wireless communication unit 61 supports one or more radio access schemes. For example, the wireless communication unit 61 supports both NR and LTE. The wireless communication unit 61 may support another radio access scheme such as W-CDMA or cdma2000. The configuration of the wireless communication unit 61 is similar to that of the wireless communication unit 41 of the base station device 40.

The storage unit 62 is a storage device, from which data can be read and in which data can be written, such as a DRAM, an SRAM, a flash memory, or a hard disk. The storage unit 62 functions as a storage means of the base station device 40. The storage unit 62 stores an operational parameter of each of the plurality of base station devices 40 included in the communication system 2. Note that the storage unit 62 may store held resource information of each of the plurality of base station devices 40 included in the communication system 2. As described above, the held resource information is information regarding holding of a wireless resource of the base station device 40.

The network communication unit 63 is a communication interface for performing communication with other devices (for example, the base station device 40, the proxy device 50, and another communication control device 60). The network communication unit 63 may be a network interface or may be a device connection interface. For example, the network communication unit 63 may be a local area network (LAN) interface such as a network interface card (NIC). Further, the network communication unit 63 may be a universal serial bus (USB) interface including a USB host controller, a USB port, and the like. Further, the network communication unit 63 may be a wired interface or a wireless interface. The network communication unit 63 functions as a communication means of the communication control device 60. The network communication unit 63 performs communication with the base station device 40, the terminal device 30, and the proxy device 50 under the control of the control unit 64.

The control unit 64 is a controller that controls each unit of the communication control device 60. The control unit 64 is implemented by, for example, a processor such as a CPU or MPU. For example, the control unit 64 is implemented in a manner in which the processor executes various programs stored in the storage device inside the communication control device 60 by using a RAM or the like as a work area. Note that the control unit 64 may be implemented by an integrated circuit such as an ASIC or FPGA. The CPU, the MPU, the ASIC, and the FPGA can all be regarded as the controller.

As illustrated in FIG. 12, the control unit 64 includes a first reception unit 641, a second reception unit 642, a setting unit 643, a calculation unit 644, and a notification unit 645. The respective blocks (the first reception unit 641, the notification unit 645, and the like) included in the control unit 64 are functional blocks each indicating the functions of the control unit 64. These functional blocks may be software blocks or hardware blocks. For example, each of the above-described functional blocks may be one software module implemented by software (including a microprogram) or may be one circuit block on a semiconductor chip (die). It is a matter of course that each functional block may be one processor or one integrated circuit. A method of configuring the functional block is arbitrary. Note that the control unit 64 may be configured with a functional unit different from the above-described functional block. The operation of the respective blocks included in the control unit 64 will be described later.

3. Interference Model

Figure 13:
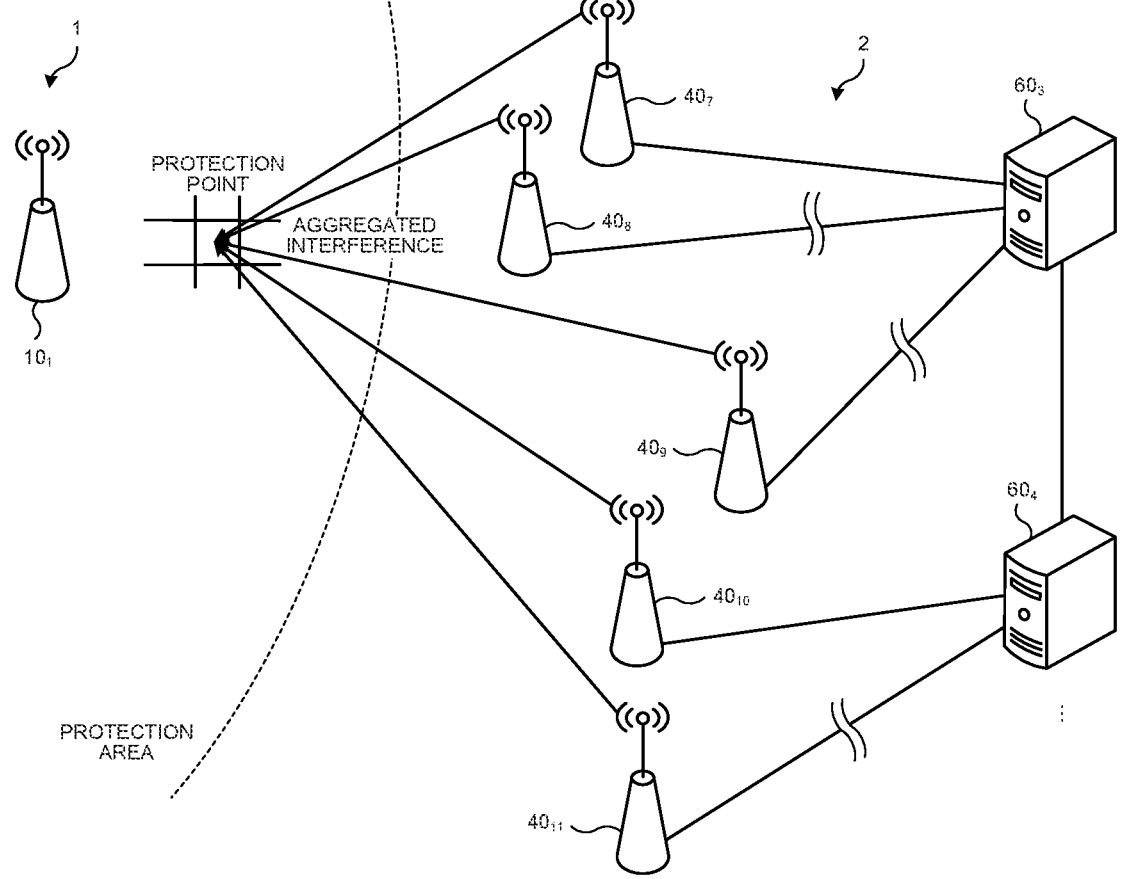
FIG. 13 is an explanatory diagram illustrating an example of an interference model assumed in an embodiment of the present disclosure.

Next, an interference model assumed in the present embodiment will be described. FIG. 13 is an explanatory diagram illustrating an example of the interference model assumed in an embodiment of the present disclosure. Note that the base station device 40 appearing in the following description can be rephrased as a word indicating another communication device having the wireless communication function.

The interference model illustrated in FIG. 13 is applied, for example, when the primary system has a service area. In the example of FIG. 13, the communication system 1 (primary system) is a wireless communication system having a service area. This service area is, for example, a protection area of the communication system 1. A plurality of interference calculation reference points (hereinafter, referred to as protection points) are set in the protection area. The protection point is set by, for example, an operator of the communication system 1 or a public organization that manages radio waves (hereinafter, referred to as a manager). For example, the manager may divide the protection area into a lattice shape and set the center of a predetermined lattice as the protection point. A method of determining the protection point is arbitrary. The interference margin of each protection point is set by the manager or the like. FIG. 13 illustrates interference given to the protection point by a plurality of base station devices 40 included in the communication system 2 (secondary system). The communication control device 60 of the communication system 2 controls transmission power of the plurality of base station devices 40 so that aggregated interference at each protection point does not exceed the set interference margin.

Figure 14:
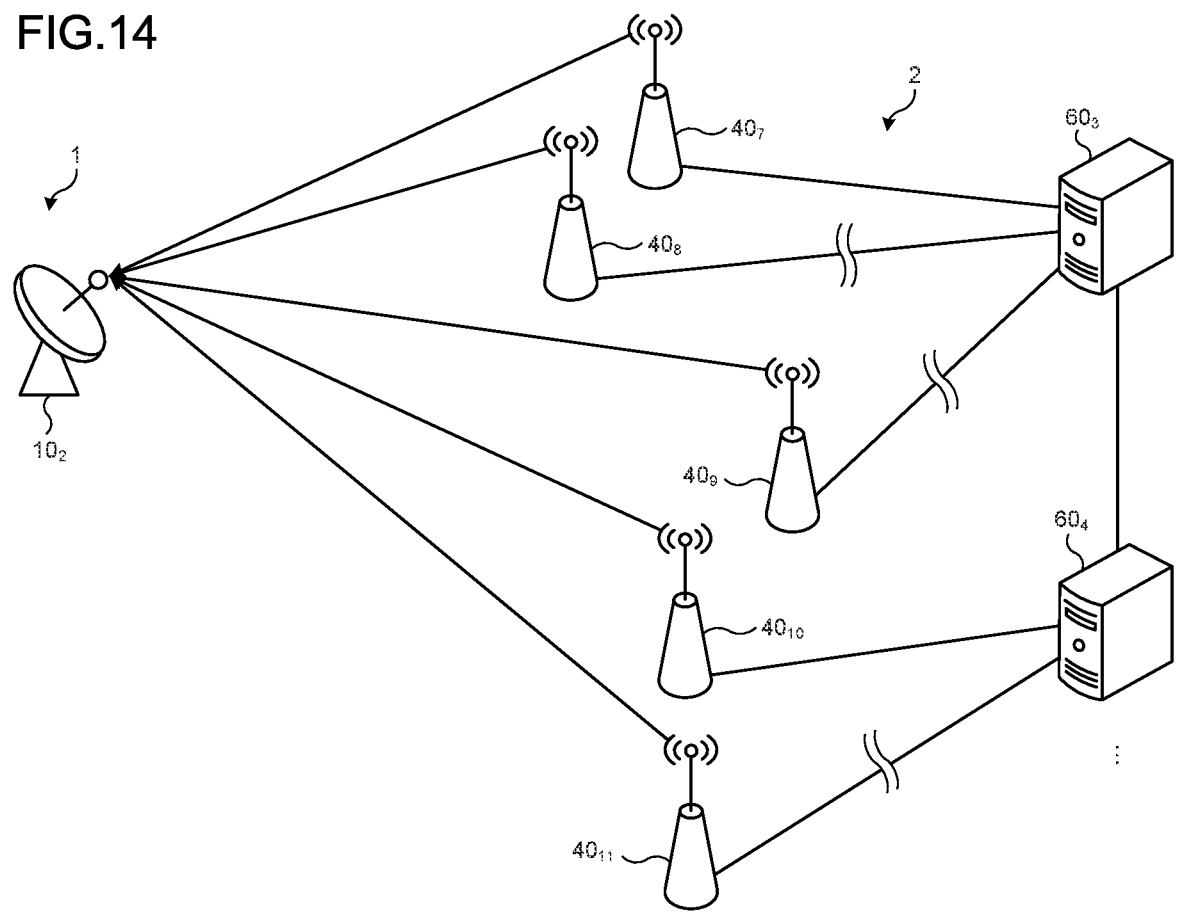
FIG. 14 is an explanatory diagram illustrating another example of the interference model assumed in the embodiment of the present disclosure.

FIG. 14 is an explanatory diagram illustrating another example of the interference model assumed in the embodiment of the present disclosure. The interference model illustrated in FIG. 14 is applied, for example, in a case where the primary system performs only reception. In the example of FIG. 14, the communication system 1 (primary system) includes a receiving antenna as the radio wave use device 10$_2$. The radio wave use device 10$_2$ is, for example, a receiving antenna of a satellite ground station. The communication control device 60 of the communication system 2 sets the position of the receiving antenna as the protection point, and controls the transmission power of the plurality of base station devices 40 so that the aggregated interference at the point does not exceed the interference margin.

4. Primary System Protection Method

Next, a primary system protection method will be described. As described above, the primary system protection method can be classified into, for example, the following two types.
 (1) Simultaneous interference margin distribution type
 (2) Sequential interference margin distribution type Note that, as an example of the simultaneous interference margin distribution type primary system protection method, for example, there is a method disclosed in Non Patent Literature 3 (for example, a maximum allowable EIRP calculation method). In addition, as an example of the sequential interference margin distribution type primary system protection method, there is sequential distribution processing (iterative allocation process (IAP)) disclosed in Non Patent Literature 6, for example.

Hereinafter, the "simultaneous interference margin distribution type" primary system protection method and the "sequential interference margin distribution type" primary system protection method will be described. Note that the base station device 40 appearing in the following description can be rephrased as a word indicating another communication device having the wireless communication function.
<4-1. Simultaneous Interference Margin Distribution Type>

Figure 15:
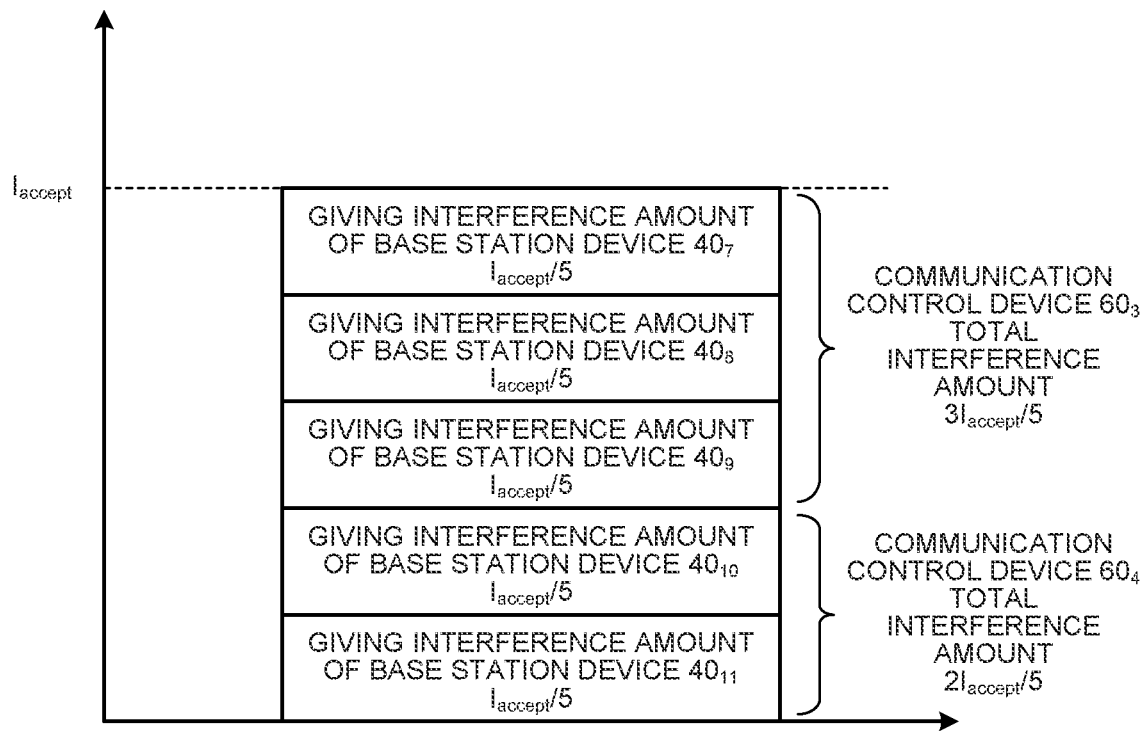
FIG. 15 is an explanatory diagram for describing a simultaneous interference margin distribution type primary system protection method.

First, the simultaneous interference margin distribution type primary system protection method will be described. FIG. 15 is an explanatory diagram for describing the simultaneous interference margin distribution type primary system protection method. As described above, in the simultaneous interference margin distribution type, the communication control device 60 calculates allowable maximum transmission power of the secondary system by using a "value uniquely obtained by a positional relationship between a protection reference point of the primary system and the secondary system" as a reference value. In the example of FIG. 15, an allowable interference threshold value of the primary system is $I_{accept}$. This threshold value may be an actual threshold value, or may be a value set by considering a certain margin (for example, a protection ratio) based on the actual threshold value in consideration of a calculation error and an interference variation.

In the simultaneous interference margin distribution type primary system protection method, an interference control means determining transmission power (EIRP, conductive power+antenna gain, or the like) of the wireless device so as not to exceed the allowable interference threshold value. At this time, in a case where there are a large number of base station devices 40 and the transmission power of each base station device 40 does not exceed the allowable interference threshold value, interference power received in the communication system 1 (primary system) may exceed the allowable interference threshold value. Therefore, the interference margin (allowable interference amount) is "distributed" on the basis of the number of base station devices 40 registered in the communication control device 60.

For example, in the example of FIG. 15, the total number of base station devices 40 is five. Therefore, the allowable interference amount of $I_{accept}/5$ is distributed to each of them. Since the base station device 40 cannot recognize the distribution amount by itself, the base station device 40 recognizes the allocation amount through the communication control device or acquires transmission power determined on the basis of the distribution amount. Since the communication control device cannot recognize the number of wireless devices managed by other communication control devices, the communication control device can recognize the total number by exchanging information, and can distribute the allowable interference amount. For example, the allowable interference amount of $3I_{accept}/5$ is allocated in the communication control device 60$_1$.

Figure 16:
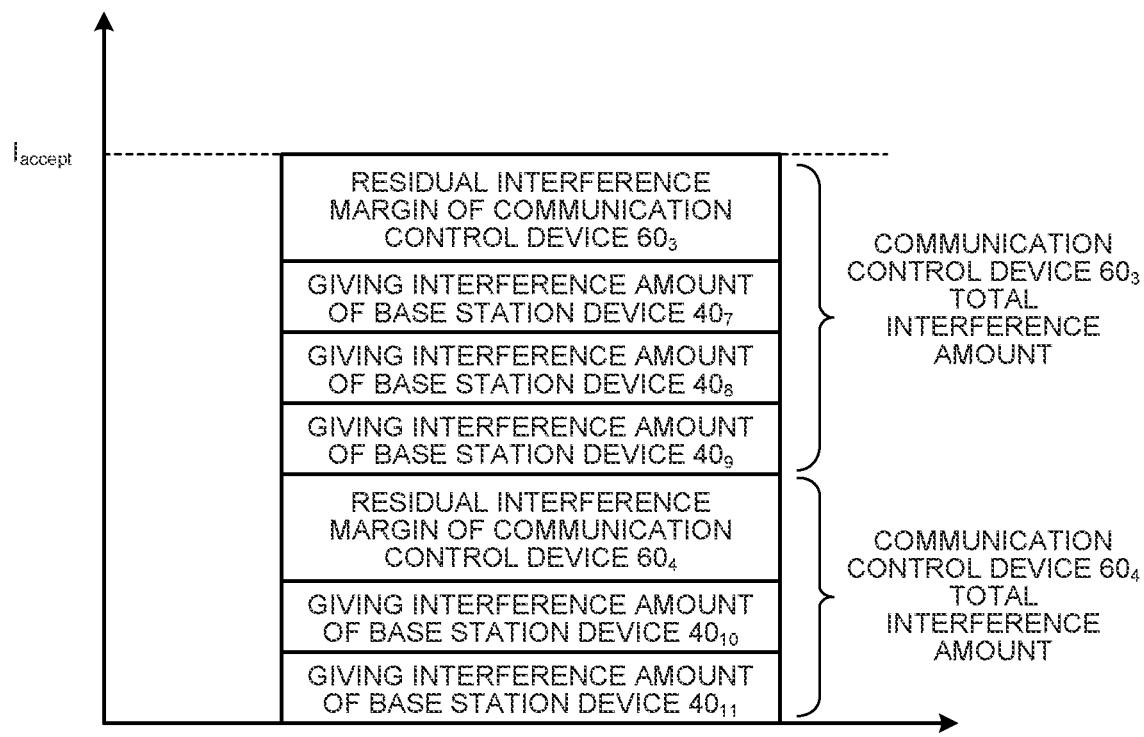
FIG. 16 is a diagram illustrating a state in which a residual interference margin occurs.

Note that, in this method, the interference margin that is not used by the base station device 40 can be a residual interference margin. FIG. 16 is a diagram illustrating a state in which the residual interference margin occurs. FIG. 16 illustrates a total interference amount set in each of two communication control devices 60 (communication control device 60$_3$ and 60$_4$). In addition, FIG. 16 illustrates the amount of interference (giving interference amount) given to a predetermined protection point of the communication system 1 by a plurality of base station devices 40 (base station devices 40$_7$ to 40$_{11}$) under the management of the two communication control devices 60. An interference amount obtained by subtracting the interference amount of the base station device 40 from the total interference amount of each of the two communication control devices 60 is the residual interference margin. In the following description, an excessive interference amount is referred to as the residual interference margin. The residual interference margin can be rephrased as a residual interference amount.
<4-2. Sequential Interference Margin Distribution Type>

Figure 17:
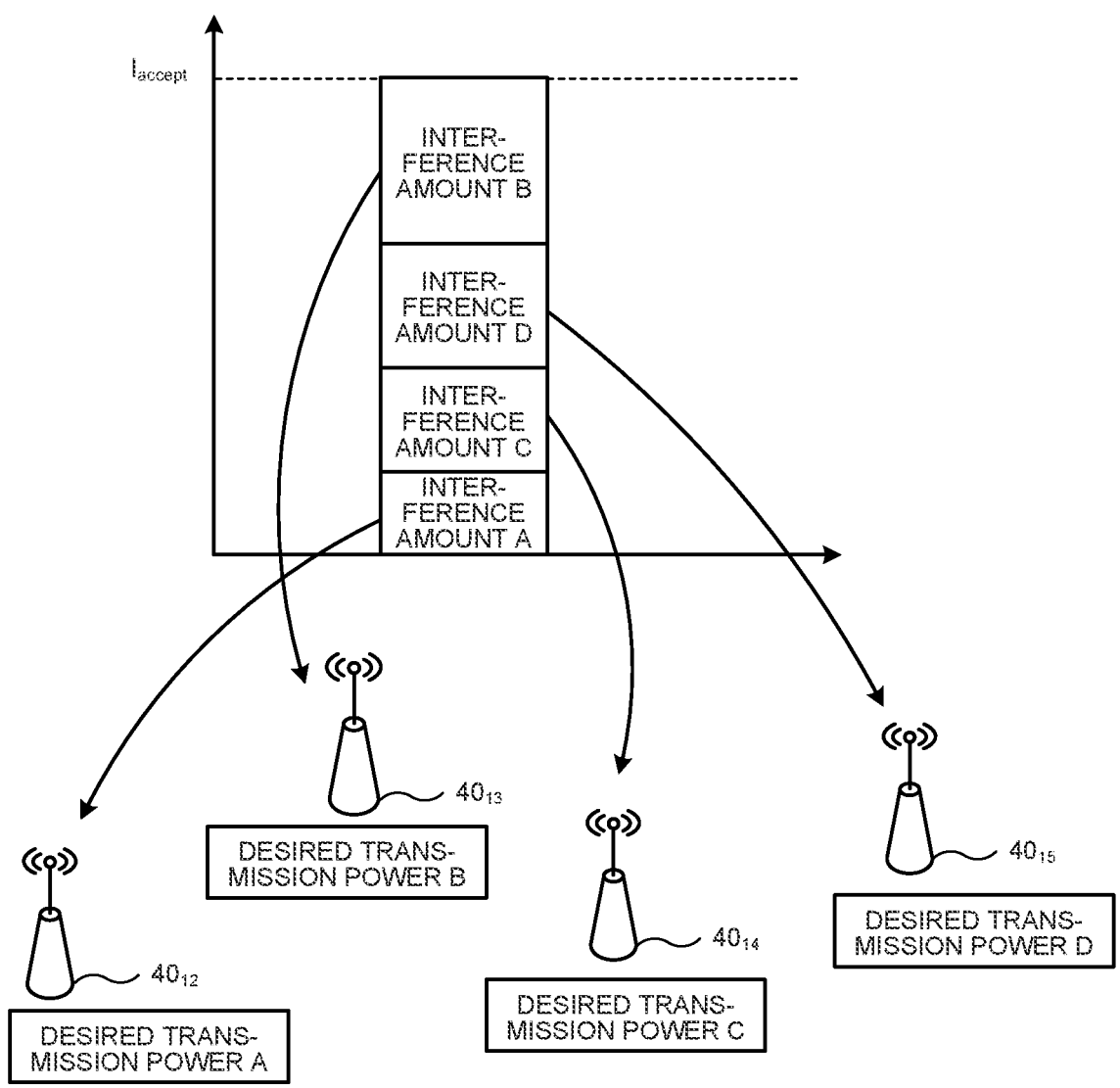
FIG. 17 is an explanatory diagram for describing a sequential interference margin distribution type primary system protection method.

Next, the sequential interference margin distribution type primary system protection method will be described. As described above, in the sequential interference margin distribution type, the communication control device 60 calculates the allowable maximum transmission power of the secondary system by using a "desired transmission power of the secondary system" as a reference value. FIG. 17 is an explanatory diagram for describing the sequential interference margin distribution type primary system protection method. In the sequential interference margin distribution type, for example, each of the plurality of base station devices 40 stores desired transmission power information in the storage unit 42. The desired transmission power information is information on transmission power for which the base station device 40 requests the communication control device 60 as information on transmission power necessary for transmitting radio waves. In the example of FIG. 17, base station devices 40$_{12}$ to 40$_{15}$ holds desired transmission power information A to D, respectively. The communication control device 60 allocates interference amounts A to D to the base station devices 40$_{12}$ to 40$_{15}$ on the basis of the desired transmission power information A to D, respectively.

5. Description of Various Procedures

Next, various procedures that may occur between the entities of the communication system 2 will be described. Note that the base station device 40 appearing in the following description can be rephrased as a word indicating another communication device having the wireless communication function.

<5-1. Registration Procedure>

The registration procedure is a procedure for registering a device parameter related to the base station device 40 in the communication control device 60. Typically, the registration procedure is started when one or more communication systems including the base station device 40 or the plurality of base station devices 40 notify the communication control device 60 of a registration request including the device parameter. The registration request may be transmitted by a communication system (for example, a proxy system such as the proxy device 50) that substitutes (represents) one or more base station devices 40.

In the following description, it is assumed that the communication system that substitutes (represents) the plurality of base station devices 40 is the proxy device 50, but the term "proxy device 50" appearing in the following description can be rephrased as a term indicating a communication system that substitutes (represents) another communication device, such as a proxy system.

[Details of Required Parameter]

The device parameter refers to, for example, the following information.

Information specific to a communication device
  Position information
  Antenna information
  Wireless interface information
  Legal information
  Installer information In implementation, information other than these may be treated as the device parameter.

The information specific to the communication device is information that can specify the base station device 40, information regarding hardware of the base station device 40, and the like. For example, a serial number, a product model number, and the like may be included.

The information that can specify the base station device 40 indicates communication device user information, a communication device serial number, and the like. For example, a user ID, a call sign, and the like can be assumed as the communication device user information. The user ID may be independently generated by a communication device user or may be issued in advance by the communication control device 60.

The information regarding the hardware of the base station device 40 may include, for example, transmission power class information, manufacturer information, and the like. For example, in FCC C.F.R Part 96, two types of classes, Category A and Category B, are defined as the transmission power class information, and any one of the types of information can be included. Further, in 3GPP TS 36.104 and TS 38.104, some classes of an eNodeB and a gNodeB are defined, and these can also be used.

Information regarding software of the base station device 40 can include, for example, version information, a build number, and the like of an execution program in which processing necessary for interaction with the communication control device 60 is described. In addition, version information, a build number, and the like of software for operation as the base station device 40 may also be included.

The position information is typically information that can specify the geographical position of the base station device 40. For example, the position information is coordinate information acquired by a positioning function represented by a global positioning system (GPS), Beidou, a quasi-zenith satellite system (QZSS), Galileo, or an assisted global positioning system (A-GPS). Typically, information regarding a latitude, a longitude, an altitude, and a positioning error can be included. Alternatively, for example, the position information may be position information registered in an information management device managed by a national regulatory authority (NRA) or its agency. Alternatively, for example, the position information may be coordinates of an X axis, a Y axis, and a Z axis with a specific geographical position as an origin. In addition, an identifier indicating outdoor/indoor can be provided together with such coordinate information.

Further, the position information may be information indicating a region in which the base station device 40 is located. For example, information defined by the government, such as a postal code and an address, may be used. Furthermore, for example, the region may be indicated by a set of three or more geographic coordinates. The information indicating the region may be provided together with the coordinate information.

Furthermore, in a case where the base station device 40 is located indoors, information indicating a floor of a building may be added to the position information. For example, the number of stories, an identifier indicating aboveground/underground, or the like may be added. Furthermore, for example, information indicating a further closed space inside the building, such as a room number and a room name in the building, may be added.

Typically, the positioning function is desirably provided by the base station device 40. However, it is not always possible to acquire the position information satisfying the required accuracy depending on the performance of the positioning function or the installation position. Therefore, the positioning function may be used by an installer. In such a case, it is desirable that the position information measured by the installer is written in the base station device 40.

The antenna information is typically information indicating performance, a configuration, and the like of the antenna included in the base station device 40. Typically, information such as an antenna installation height, a tilt angle (downtilt), a horizontal orientation (azimuth), a boresight, an antenna peak gain, and an antenna model may be included.

The antenna information can also include information regarding a formable beam. For example, information such as a beam width, a beam pattern, and an analog/digital beamforming capability can be included.

In addition, the antenna information can also include information regarding performance and a configuration of multiple input multiple output (MIMO) communication. For example, information such as the number of antenna elements and the maximum number of spatial streams can be included. In addition, codebook information to be used, weight matrix information (a unitary matrix obtained by singular value decomposition (SVD), eigen value decomposition (EVD), block diagonalization (BD), or the like, a zero-forcing (ZF) matrix, or a minimum mean square error (MMSE) matrix), and the like can be included. In addition, in a case of including maximum likelihood detection (MLD) or the like that requires nonlinear calculation, information indicating the MLD or the like may be included.

The antenna information may include the zenith of direction (departure) (ZoD). The ZoD is a kind of a radio wave arrival angle. The ZoD may be estimated by a base station device 40 from radio waves radiated from the antenna of another base station device 40. In this case, the base station device 40 may be a terminal device that is operated as a base station or an access point, a device that performs D2D communication, a moving relay base station, or the like. The ZoD can be estimated by radio wave arrival direction estimation technology such as multiple signal classification (MUSIC) or estimation of signal propagation via rotation invariance techniques (ESPRIT). The ZoD can be used as measurement information by the communication control device 60.

The wireless interface information is typically information indicating wireless interface technology provided in the base station device 40. For example, identifier information indicating standard technology such as technology used in GSM (registered trademark), CDMA2000, UMTS, E-UTRA, 5G NR, or a further next generation cellular system, derivative technology based on LTE, such as MulteFire or LTE-Unlicensed (LTE-U), a metropolitan area network (MAN) such as WiMAX or WiMAX 2+, or a wireless LAN based on IEEE 802.11 is included. In addition, a version number or a release number of a technical specification that defines them may also be added. It is not necessarily the standard technology, and information indicating proprietary radio technology may be included.

The wireless interface information can also include frequency band information supported by the base station device 40. For example, it can be expressed by one or more combinations of an upper limit frequency and a lower limit frequency, one or more combinations of a center frequency and a bandwidth, or one or more 3GPP operating band numbers.

The frequency band information supported by the base station device 40 can further include capability information of carrier aggregation (CA) or channel bonding. For example, combinable band information or the like can be included. Furthermore, for the carrier aggregation, information regarding a band desired to be used as a primary component carrier (PCC) or a secondary component carrier (SCC) can also be included. Further, the number of CC that can be aggregated at the same time can be included.

The frequency band information supported by the base station device 40 may also include information indicating radio wave usage priority such as PAL and GAA.

The wireless interface information can also include modulation scheme information supported by the base station device 40. For example, as a representative example, information indicating a primary modulation scheme such as frequency shift keying (FSK), n-value phase shift keying (n is 2, 4, 8, or the like), or n-value quadrature amplitude modulation (QAM) (n is 4, 16, 64, 256, or the like), or information indicating a secondary modulation scheme such as orthogonal frequency division multiplexing (OFDM), DFT spread OFDM (DFT-s-OFDM), or filter bank multi carrier (FBMC) can be included.

The wireless interface information can also include information regarding an error correction code. For example, capabilities and coding rate information to be applied such as a turbo code, a low density parity check (LDPC) code, and a polar code can be included.

The modulation scheme information and the information regarding the error correction code can also be expressed by a modulation and coding scheme (MCS) index as another aspect.

In addition, the wireless interface information can also include information indicating a function specific to each radio technology supported by the base station device 40. For example, as a representative example, there is transmission mode (TM) information defined in LTE. In addition, those having two or more modes with respect to a specific function can be included in the wireless interface information as in the TM described above. In addition, in the technical specification, even when there are no two or more modes, in a case where the base station device 40 supports a function that is not essential in the specification, information indicating the function can also be included.

The wireless interface information can also include radio access technology (RAT) information supported by the base station device 40. For example, information indicating an orthogonal multiple access (OMA) scheme such as time division multiple access (TDMA), frequency division multiple access (FDMA), or orthogonal frequency division multiple access (OFDMA), a non-orthogonal multiple access (NOMA) scheme such as power division multiple access (PDMA) (a technique implemented by a combination of superposition coding (SPC) and successive interference canceller (SIC) is a representative example), code division multiple access (CDMA), sparse code multiple access (SCMA), interleaver division multiple access (IDMA), or spatial division multiple access (SDMA), or an opportunistic access scheme such as carrier sense multiple access/collision avoidance (CSMA/CA) or carrier sense multiple access/collision detection (CSMA/CD) can be included.

In addition, the wireless interface information can also include information regarding a duplex mode supported by the base station device 40. For example, frequency division duplexing (FDD), time division duplexing (TDD), or full duplexing (FD) can be included as a representative example. In a case where the TDD is included as the wireless interface information, TDD frame configuration information used/supported by the base station device 40 can be added. Furthermore, information regarding the duplex mode can be included for each frequency band indicated by the frequency band information.

The wireless interface information can also include information on a transmission diversity method supported by the base station device 40. For example, space time coding (STC) or the like may be included.

The wireless interface information can also include guard band information. For example, information regarding a standard guard band size can be included. Alternatively, for example, information regarding a guard band size desired by the base station device 40 may be included.

The legal information is typically information regarding regulations that the base station device 40 must comply with, which are defined by a radio wave administration agency in each country and region or equivalent agencies, authentication information acquired by the base station device 40, or the like. Typically, the information regarding the regulations can include, for example, information regarding an upper limit value of out-of-band radiation, information regarding a blocking characteristic of a receiver, and the like. Typically, the authentication information can include, for example, type approval information (an FCC ID, a technical standard conformance certificate, or the like), law/regulation information (for example, an FCC regulation number, an ETSI harmonized standard number, or the like) serving as a standard for authentication acquisition, and the like.

Among the legal information, for information regarding numerical values, those defined in the specification of the wireless interface technology may be substituted. For example, the upper limit value of the out-of-band radiation may be derived and used by using an adjacent channel leakage ratio (ACLR) instead of the information regarding the upper limit value of the out-of-band radiation. In addition, the ACLR itself may be used as necessary. Further, adjacent channel selectivity (ACS) may be used instead of the blocking characteristic. In addition, these may be used in combination, or an adjacent channel interference ratio (ACIR) may be used.

The installer information can include information that can specify a person who has installed the base station device (installer), unique information associated with the installer, and the like. For example, Non Patent Literature 2 discloses a certified professional installer registration ID (CPIR-ID) and a CPI name as the information that can specify the installer. In addition, for example, a mailing/contact address, an e-mail address, a telephone number, a public key identifier (PKI), and the like are disclosed as the unique information associated with the installer. The information is not limited thereto, and other information regarding the installer may be included as necessary.

[Supplementary Description of Required Parameter]

In the registration procedure, in some embodiments, it is assumed that not only the device parameter related to the base station device 40 but also the device parameter related to the terminal device 30 is required to be registered in the communication control device 60. In such a case, the term "communication device" in the above description (Details of Required Parameter) may be replaced with the term "terminal device" or an equivalent term. In addition, a parameter specific to the "terminal device" that is not described above (Details of Required Parameter) may also be treated as the required parameter in the registration procedure. For example, a user equipment (UE) category specified in 3GPP can be cited.

[Details of Registration Processing]

Figure 18:
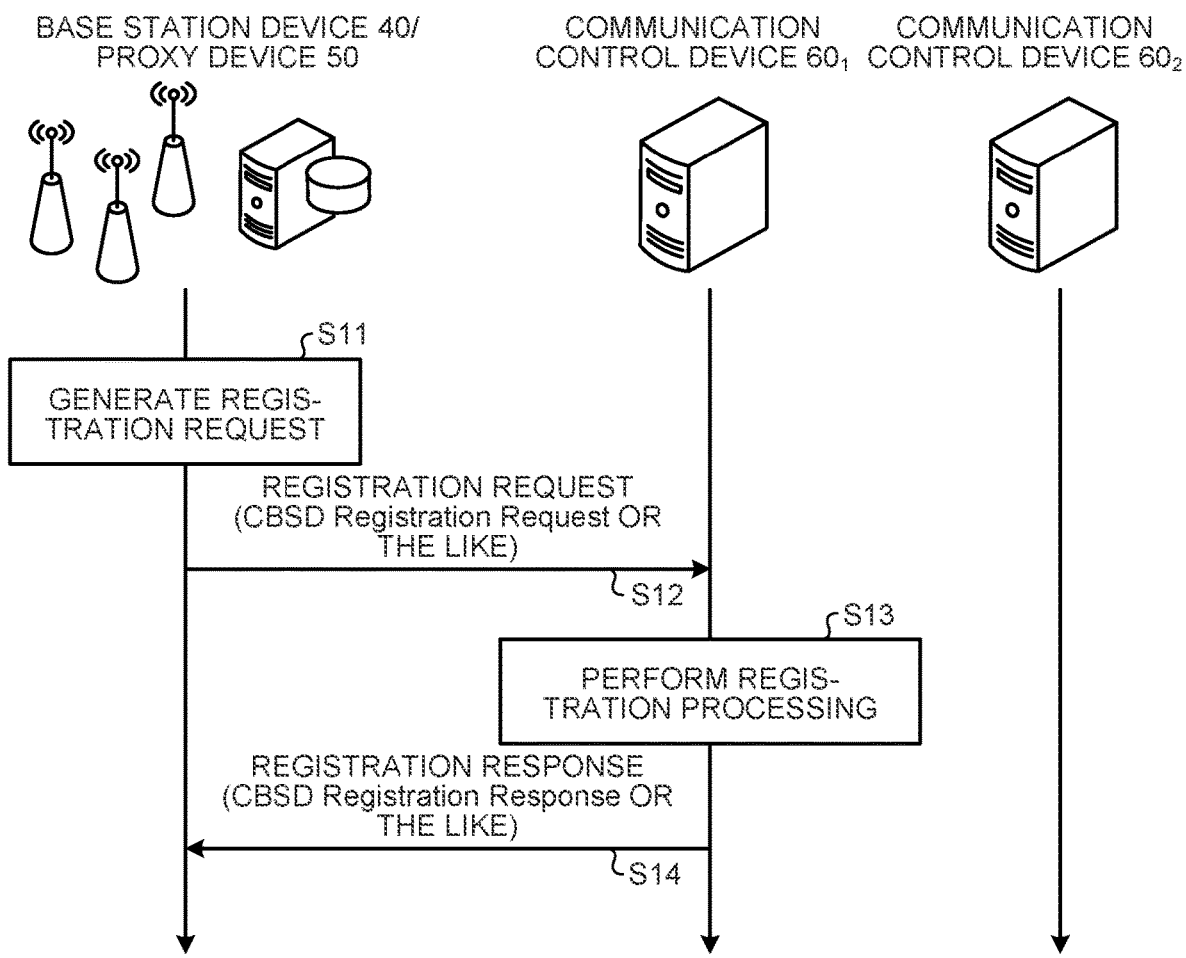
FIG. 18 is a sequence diagram for describing a registration procedure.

FIG. 18 is a sequence diagram for describing the registration procedure. One or more communication systems including the base station device 40 or the plurality of base station devices 40 generate a registration request message by using the device parameter (Step S11), and notifies the communication control device 60 of the registration request message (Step S12). The proxy device 50 may generate and/or notify of the message.

Here, in a case where the device parameter includes the installer information, falsification prevention processing or the like may be performed on the registration request by using this information. In addition, a part of or the entirety of the information included in the registration request may be subjected to encryption processing. Specifically, for example, processing in which a public key specific to the installer is shared in advance between the installer and the communication control device 60, and the installer encrypts information using a secret key can be performed. Examples of a target of the encryption include security information such as the position information.

Further, as disclosed in Non Patent Literature 2, for example, the installer may directly write the position information into the communication control device 60.

After receiving the registration request, the communication control device 60 performs the registration processing for the base station device 40 (Step S13), and makes a registration response according to the processing result (Step S14). In a case where there is no shortage or abnormality in information necessary for the registration, the communication control device 60 records the information in the storage unit 42 and notifies normal completion. Otherwise, the communication control device 60 notifies of a registration failure. In a case where the registration is normally completed, the communication control device 60 may assign an ID to each communication device and notify the communication device of the ID information by enclosing the ID information at the time of making a response. In a case where the registration fails, typically, one or more communication systems including the base station device 40 or the plurality of base station devices 40, or an operator (for example, a mobile communication carrier or individual) or installer thereof corrects the registration request or the like and tries the registration procedure until the registration is normally completed.

Note that the registration procedure may be performed a plurality of times. Specifically, for example, the registration procedure can be re-performed in a case where the position information is changed beyond a predetermined reference value due to movement/accuracy improvement or the like. The predetermined reference value is typically defined by a legal system. For example, in 47 C.F.R Part 15, a Mode II personal/portable white space device is required to access the database again when the position information is changed by 100 meters or more.

<5-2. Available Frequency Information Inquiry Procedure (Available Spectrum Query Procedure)>

The available frequency information inquiry procedure is a procedure in which the base station device 40 or the proxy device 50 inquires the communication control device 60 about information regarding an available frequency. Typically, the procedure is started when the base station device 40 or the proxy device 50 notifies the communication control device 60 of an inquiry request including information that can specify the base station device 40 (or the base station device 40 subordinate to the proxy device 50).

(1) Example 1

Here, typically, the available frequency information is information indicating a frequency that does not give fatal interference to the primary system at the position of the base station device 40 (or the base station device 40 subordinate to the proxy device 50) and can be secondarily used in a safe manner. For example, in a case where the base station device 40 is installed in a secondary-use-prohibited area such as an exclusion zone in order to protect the primary system using a frequency channel F1, the base station device 40 is not notified that the frequency channel F1 is an available channel.

(2) Example 2

In addition, for example, in a case where it is determined that fatal interference is given to the primary system even outside the secondary-use-prohibited area, the corresponding frequency channel is not notified as an available channel in some cases.

(3) Example 3

In the available frequency information, there can also be a frequency channel that is not notified as being available even when satisfying the primary system protection requirements of Example 2. Specifically, for example, in order to avoid interference that may occur between the base station devices 40 in advance, a frequency channel that is being used by another base station device 40 present in the vicinity of the base station device 40 (or the base station device 40 subordinate to the proxy device 50) is not notified as an available channel in some cases.

(4) Example 4

Even in a case corresponding to these cases (Example 2 and Example 3), the same frequency as that of the primary system or neighboring base station device 40 can be notified as an available channel. In such a case, typically, maximum allowable transmission power information is included in the available frequency information. The allowable maximum transmission power is typically expressed by equivalent isotropic radiated power (EIRP). The allowable maximum transmission power is not necessarily limited thereto, and may be provided by, for example, a combination of antenna power and an antenna gain. A feeder loss may also be included. Furthermore, the antenna gain may be set to an allowable peak gain for each spatial direction.

[Details of Required Parameter]

As the information that can specify the base station device 40, for example, the information specific to the communication device registered in the registration procedure, the ID information described above (Details of Registration Processing), and the like can be assumed.

The inquiry request can also include inquiry requirement information. The inquiry requirement information can include, for example, information indicating a frequency band whose availability is desired to be known. Further, for example, the transmission power information can also be included. For example, the base station device 40 or the proxy device 50 may include the transmission power information in a case where it is desired to know only information on a frequency at which the desired transmission power can be used. The inquiry requirement information does not necessarily need to be included.

The inquiry request can also include a measurement report. The measurement report includes a result of measurement performed by the base station device 40 and/or the terminal device 30. For example, not only raw data but also processed information can be included. For example, standardized metrics represented by reference signal received power (RSRP), reference signal strength indicator (RSSI), and reference signal received quality (RSRQ) can be used.

[Details of Available Frequency Evaluation Processing]

Figure 19:
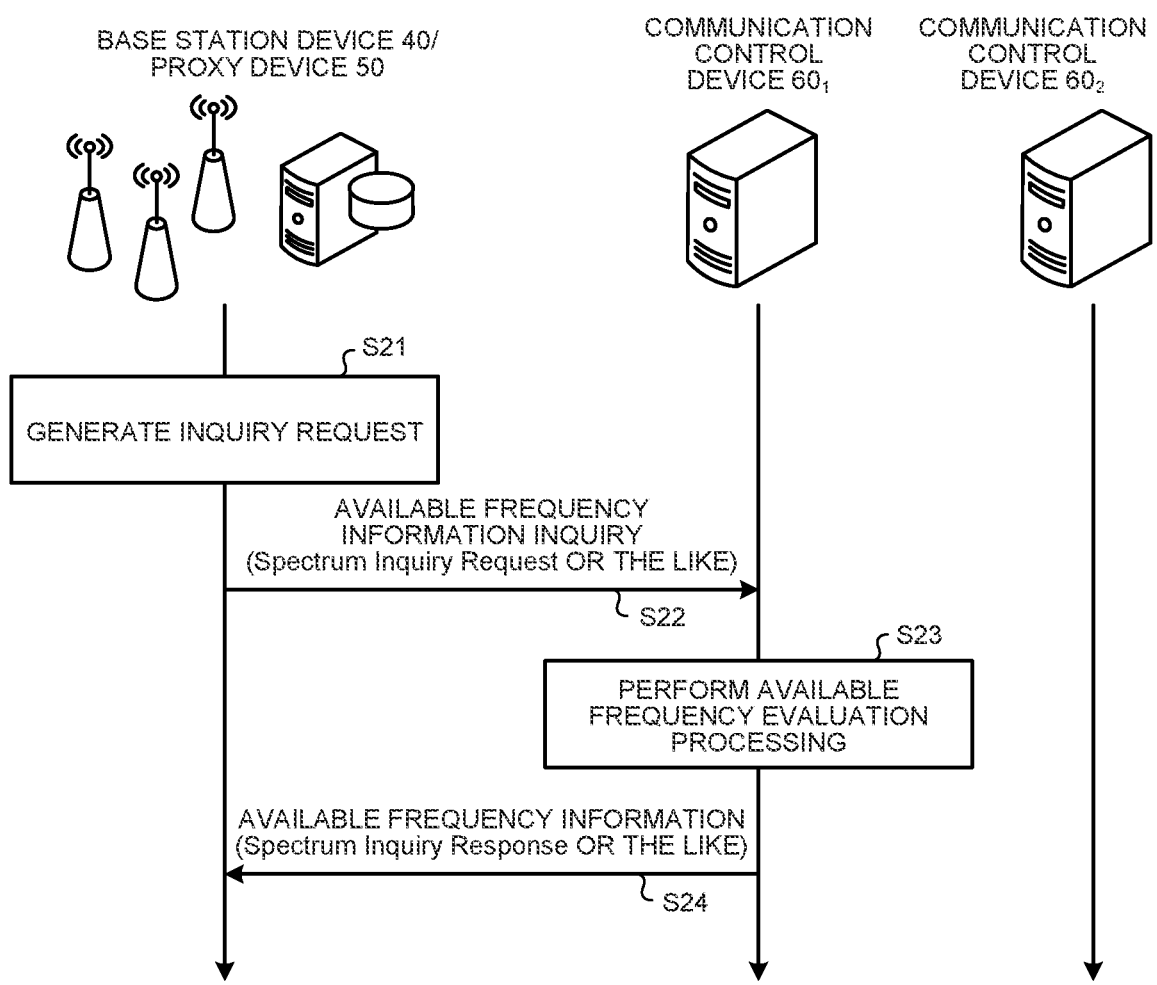
FIG. 19 is a sequence diagram for describing an available frequency information inquiry procedure.

FIG. 19 is a sequence diagram for describing the available frequency information inquiry procedure. The base station device 40 or the proxy device 50 generates the inquiry request including the information that can specify the base station device 40 (or the base station device 40 subordinate to the proxy device 50) (Step S21), and notifies the communication control device 60 of the inquiry request (Step S22).

After receiving the inquiry request, the communication control device 60 evaluates the available frequency on the basis of the inquiry requirement information (Step S23). For example, as described in Examples 1 to 3 described above, the available frequency can be evaluated in consideration of the primary system, the secondary-use-prohibited area thereof, and the existence of the neighboring base station device 40.

As described in Example 4 above, the communication control device 60 may derive the allowable maximum transmission power information. Typically, allowable interference power information in the primary system or a protection zone thereof, calculation reference point information of an interference power level experienced by the primary system, and registration information of the base station device 40 can be calculated by using a propagation loss estimation model. Specifically, as an example, the calculation is performed by using the following equation.

$$P_{MaxTx(dBm)} = I_{Th(dBm)} + PL(d)_{(dB)} \tag{1}$$

Here, $P_{MaxTx(dBm)}$ is the allowable maximum transmission power, $I_{Th(dBm)}$ is the allowable interference power, d is a distance between the reference point and the base station device 40, and $PL(b)_{(dB)}$ is a propagation loss at the distance d. Although the antenna gain in a transceiver is not explicitly indicated in the equation, the antenna gain may be included according to a method of expressing the allowable maximum transmission power (EIRP, conducted power, or the like) or a referring point of reception power (antenna input point, antenna output point, or the like). Further, a safety margin or the like for compensating for variation due to fading may be included. In addition, a feeder loss and the like may be considered as necessary.

In addition, the above equation is described on the basis of the assumption that the single base station device 40 is an interference source. For example, in a case where it is necessary to consider aggregated interference from a plurality of base station devices 40 at the same time, a correction value may be added. Specifically, for example, the correction value can be determined on the basis of three types (fixed/predetermined, flexible, and flexible minimized) of interference margin methods disclosed in Non Patent Literature 3.

Note that, although the above equation is expressed using logarithms, it is a matter of course that the equation may be converted into a true number and used in implementation. In addition, all parameters in logarithmic notation described in the present embodiment may be appropriately converted into true numbers and used.

(1) Method 1

Furthermore, as described in the section of (Details of Required Parameter) above, in a case where the transmission power information is included in the inquiry requirement information, the available frequency can be evaluated by a method different from the above-described method. Specifically, for example, in a case where it is assumed that desired transmission power indicated by the transmission power information is used, when an estimated giving interference amount is less than the allowable interference power in the primary system or the protection zone thereof, it is determined that the frequency channel is available, and the base station device 40 (or the proxy device 50) is notified of the frequency channel.

(2) Method 2

Although an example in which the band use condition is calculated on the basis of the other system-related information has been described, the present disclosure is not limited to such an example. For example, similarly to an area of a radio environment map (REM), in a case where an area/space in which the base station device 40 can use a shared band is determined in advance, the available frequency information may be derived on the basis of only the position-related information and the height-related information. Furthermore, for example, even in a case where a lookup table for associating the position and height with the available frequency information is prepared, the available frequency information may be derived on the basis of only the position-related information and the height-related information.

The evaluation of the available frequency does not necessarily need to be performed after the inquiry request is received. For example, after the normal completion of the above-described registration procedure, the communication control device 60 may independently perform the evaluation without the inquiry request. In such a case, the communication control device 60 may create the REM or lookup table exemplified in Method 2 or an information table similar thereto.

In any method, the radio wave usage priority such as the PAL or GAA may also be evaluated. For example, in a case where the registered device parameter or the inquiry requirement includes information regarding the radio wave usage priority, it may be determined whether or not the frequency is available on the basis of the priority, and the notification may be made. Furthermore, for example, as disclosed in Non Patent Literature 2, in a case where information (in Non Patent Literature 2, referred to as a Cluser List) regarding the base station device 40 that uses a frequency with high priority (for example, the PAL) is registered in the communication control device 60 by the user in advance, the evaluation may be performed on the basis of the information.

After the evaluation of the available frequency is completed, the communication control device 60 notifies the base station device 40 (or the proxy device 50) of the evaluation result (Step S24). The base station device 40 may select a desired communication parameter by using the evaluation result received from the communication control device 60.

<5-3. Frequency Use Permission Procedure (Spectrum Grant Procedure)>

A frequency use permission procedure is a procedure for the base station device 40 to receive secondary use permission for a frequency from the communication control device 60. Typically, after the normal completion of the registration procedure, one or more communication systems including the base station device 40 or the plurality of base station devices 40 start the procedure by notifying the communication control device 60 of a frequency use permission request including information that can specify the base station device 40. This notification may be performed by the proxy device 50. Note that "after the normal completion of the registration procedure" also means that the available frequency information inquiry procedure does not necessarily need to be performed.

In the present invention, it is assumed that at least the following two types of frequency use permission request methods can be used.

Designation method
Flexible method

The designation method is a request method in which the base station device 40 designates, as desired communication parameters, at least a frequency band and maximum transmission power desired to be used, and requests the communication control device 60 to permit operation based on the desired communication parameters. The parameters are not necessarily limited to these parameters, and parameters specific to the wireless interface technology (such as the modulation scheme or the duplex mode) may be designated.

In addition, information indicating the radio wave usage priority such as the PAL and GAA may be included.

The flexible method is a request method in which the base station device 40 designates only a requirement related to the communication parameter, and requests the communication control device 60 to designate a communication parameter that can be secondarily used while satisfying the requirement. The requirement related to the communication parameter can include a bandwidth or desired maximum transmission power or desired minimum transmission power. The parameters are not necessarily limited to these parameters, and parameters specific to the wireless interface technology (such as the modulation scheme or the duplex mode) may be designated. Specifically, for example, one or more TDD frame configurations may be selected in advance and notified.

In any method, the measurement report may be included. The measurement report includes a result of measurement performed by the base station device 40 and/or the terminal device 30. For example, not only raw data but also processed information can be included. For example, standardized metrics represented by reference signal received power (RSRP), reference signal strength indicator (RSSI), and reference signal received quality (RSRQ) can be used.

[Details of Frequency Use Permission Processing]

Figure 20:
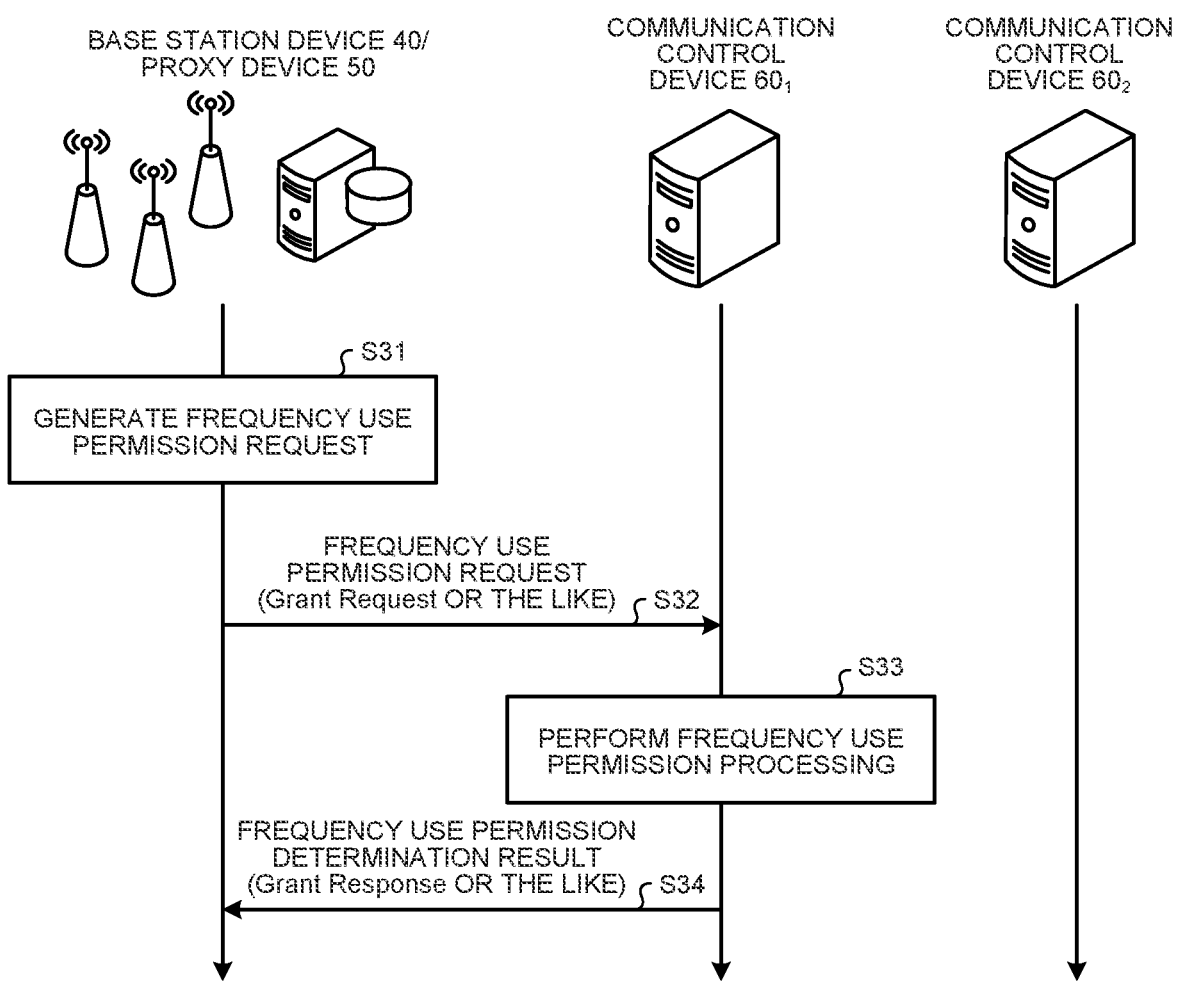
FIG. 20 is a sequence diagram for describing a frequency use permission procedure.

FIG. 20 is a sequence diagram for describing the frequency use permission procedure. One or more communication systems including the base station device 40 or the plurality of base station devices 40 generates the frequency use permission request including the information that can specify the base station device 40 (Step S31), and notifies the communication control device 60 of the frequency use permission request (Step S32). The proxy device 50 may perform the generation and/or notification of the request.

After acquiring the frequency use permission request, the communication control device 60 performs frequency use permission processing on the basis of the frequency use permission request method (Step S33). For example, the communication control device 60 can perform the frequency use permission processing in consideration of the primary system, the secondary-use-prohibited area thereof, and the existence of the neighboring base station device 40 by using the methods described in Examples 1 to 3 of <5-2. Available Frequency Information Inquiry Procedure>.

In a case where the flexible method is used, the communication control device 60 may derive the allowable maximum transmission power information by using the method described in Example 4 of <5-2. Available Frequency Information Inquiry Procedure>. Typically, the communication control device 60 calculates the allowable interference power information in the primary system or a protection zone thereof, the calculation reference point information of the interference power level experienced by the primary system, and the registration information of the base station device 40 by using the propagation loss estimation model. For example, the communication control device 60 calculates the allowable maximum transmission power by using the following Equation (2).

$$P_{MaxTx(dBm)} = I_{Th(dBm)} + PL(d)_{(dB)} \tag{2}$$

Here, $P_{MaxTx(dBm)}$ is the allowable maximum transmission power, $I_{Th(dBm)}$ is the allowable interference power, d is a distance between the reference point and the base station device 40, and $PL(d)_{(dB)}$ is a propagation loss at the distance d. Although the antenna gain in the transceiver is not explicitly indicated in the equation, the equation may be modified and used according to the method of expressing the allowable maximum transmission power (EIRP, conducted power, or the like) or the referring point of the reception power (antenna input point, antenna output point, or the like). Further, a safety margin or the like for compensating for variation due to fading may be included. In addition, a feeder loss and the like may be considered as necessary.

In addition, the above equation is described on the basis of the assumption that the single base station device 40 is an interference source. For example, in a case where it is necessary to consider aggregated interference from a plurality of base station devices 40 at the same time, a correction value may be added. Specifically, for example, the correction value can be determined on the basis of three types (fixed/predetermined, flexible, and flexible minimized) of methods disclosed in Non Patent Literature 3.

Various models can be used as the propagation loss estimation model. In a case where the model is designated for each application, it is desirable to use the designated model. For example, in Non Patent Literature 6, a propagation loss model such as the Extended Hata (eHATA) or the irregular terrain model (ITM) is adopted for each application. It is a matter of course that, in the implementation of the present invention, the propagation loss model does not need to be limited thereto.

In a predetermined application, when the model is not designated, the model may be selectively used as necessary. As a specific example, for example, it is possible to selectively use an aggressive model such as a free space loss model when estimating the giving interference power for another base station device 40, and selectively use a conservative model when estimating the coverage of the base station device 40.

Furthermore, in a case where the designation method is used, the frequency use permission processing can be performed using the method described in Method 1 of <5-2. Available Frequency Information Inquiry Procedure>. Specifically, for example, in a case where it is assumed that desired transmission power indicated by the transmission power information is used, when the estimated giving interference amount is less than the allowable interference power in the primary system or the protection zone thereof, it is determined that the use of the frequency channel can be permitted, and the base station device (or the proxy device 50) is notified of the frequency channel.

In any method, the radio wave usage priority such as the PAL or GAA may also be evaluated. For example, in a case where the registered device parameter or the inquiry requirement includes information regarding the radio wave usage priority, it may be determined whether or not the frequency is available on the basis of the priority, and the notification may be made. Furthermore, for example, as disclosed in Non Patent Literature 2, in a case where information (in Non Patent Literature 2, referred to as a Cluser List) regarding the base station device 40 that uses a frequency with high priority (for example, the PAL) is registered in the communication control device 60 by the user in advance, the evaluation may be performed on the basis of the information.

The frequency use permission processing does not necessarily have to be performed when the request is received. For example, after the normal completion of the above-described registration procedure, the communication control device 60 may independently perform the frequency use permission processing without the frequency use permission request. Furthermore, for example, frequency use permission determination processing may be performed at constant intervals. In such a case, the REM or lookup table exemplified in Method 2 of <5-2. Available Frequency Information Inquiry Procedure or an information table similar thereto may be created>.

After the completion of the frequency use permission processing, the communication control device 60 notifies the base station device 40 of the determination result (Step S34).

<5-4. Frequency Use Notification (Spectrum Use Notification/Heartbeat)>

Frequency use notification is a procedure in which the base station device 40 or the proxy device 50 notifies the communication control device 60 of the frequency use based on the communication parameter whose usage is permitted in the frequency use permission procedure. Typically, the procedure is started when the base station device 40 or the proxy device 50 notifies the communication control device 60 of a notification message including information that can specify the base station device 40.

This procedure is desirably performed periodically until the use of the frequency is rejected by the communication control device 60. Once this procedure is normally completed, the base station device 40 may start or continue the radio wave transmission. For example, in a case where a state of grant is Granted, the state of the grant shifts to Authorized due to the success of this procedure. In addition, in a case where the state of the grant is Authorized, the state of the grant shifts to Granted or Idole due to the failure of this procedure.

Here, the grant refers to authorization for radio wave transmission given by the communication control device 60 (for example, the SAS) to the base station device 40 (for example, the CBSD). The grant is described, for example, in Non Patent Literature 2. In Non Patent Literature 2, a signaling protocol between a database (SAS) and a base station (CBSD) for sharing of a frequency of 3550 to 3700 MHz in the United States is standardized. In this standard, the authorization of radio wave transmission given by the SAS to the CBSD is called "grant". Operational parameters allowed by the grant are defined as maximum allowable equivalent isotropic radiated power (EIRP) and a frequency channel. That is, in order to perform radio wave transmission using a plurality of frequency channels, the CBSD needs to acquire a plurality of grants from the SAS.

For the grant, a state indicating a permission state of radio wave transmission is defined. Examples of the state indicating the permission state of the radio wave transmission include a Granted state and an Authorized state. The Granted state indicates a state in which the grant is held but the radio wave transmission is prohibited, and the Authorized state indicates a state in which the radio wave transmission is permitted on the basis of the operational parameter value defined by the grant. These two states shift according to a result of a heartbeat procedure defined in the same standard.

In the following description, the frequency use notification may be referred to as a heartbeat request or simply a heartbeat. In addition, a transmission interval of the heartbeat request may be referred to as a heartbeat interval.

Figure 21:
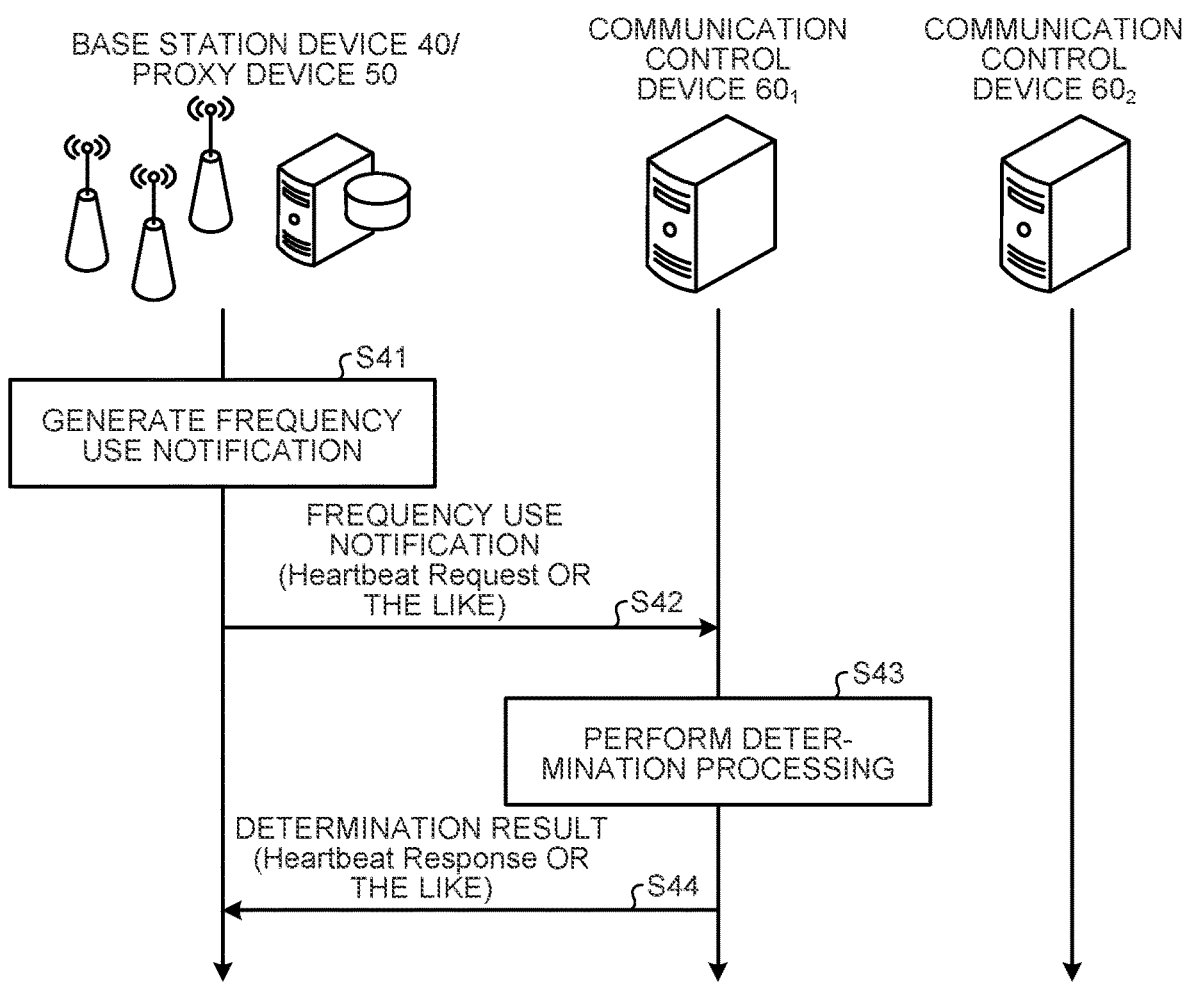
FIG. 21 is a sequence diagram for describing a frequency use notification procedure.

FIG. 21 is a sequence diagram for describing the frequency use notification procedure. One or more communication systems including the base station device 40 or the plurality of base station devices 40 generates the notification message including the information that can specify the base station device 40 (Step S41), and notifies the communication control device 60 of the notification message (Step S42). The proxy device 50 may generate and/or notify of the message.

After receiving the frequency use notification, the communication control device 60 may determine whether or not the start/continuation of the radio wave transmission is allowed (Step S43). Examples of the determination method include confirmation of the frequency use information of the primary system. Specifically, the start/continuation permission or rejection of the radio wave transmission can be determined on the basis of a change in the frequency used by the primary system, a change in the frequency use situation of the primary system in which the radio wave use is not steady (for example, the carrier-based radar), or the like.

Once the determination processing is completed, the communication control device 60 notifies the base station device (or the proxy device 50) of the determination result (Step S44).

In this procedure, a communication parameter reconfiguration command may be given from the communication control device 60 to the base station device 40 (or the proxy device 50). Typically, communication parameter reconfiguration command can be given in response to the frequency use notification. For example, recommended communication parameter information can be provided.

<5-5. Supplementary Description of Various Procedures>

Here, the various procedures do not necessarily need to be individually implemented as described below. For example, two different procedures may be implemented in a manner in which a third procedure with roles of the two different procedures is substituted for the two different procedures. Specifically, for example, the registration request and the available frequency information inquiry request may be integrally notified. Furthermore, for example, the frequency use permission procedure and the frequency use notification may be integrally performed. It is a matter of course that the combination is not limited thereto, and the number of combinations may be three or more. Furthermore, the above procedures may be separately performed.

In addition, in a case where the present embodiment is applied for the purpose of frequency sharing with an incumbent system, it is desirable that appropriate procedures or equivalent procedures are selected and used on the basis of the radio regulation law related to the frequency band in a country or region in which the technology of the present embodiment is implemented. For example, in a case where the registration of the communication device is required for the use of a specific frequency band in a specific country or region, it is desirable to perform the registration procedure.

In addition, the expression "acquiring information" or an expression equivalent thereto in the present embodiment does not necessarily mean that the information is acquired according to the procedure described above. For example, although it is described that the position information of the base station device 40 is used in the available frequency evaluation processing, it is not always necessary to use the information acquired in the registration procedure, and in a case where the position information is included in the available frequency information inquiry procedure request, the position information may be used. In other words, it means that the described parameter may be included in other procedures within the scope described in the present embodiment and within the scope of technical feasibility.

Furthermore, push notification of information that can be included in the response from the communication control device 60 to the base station device 40 (or the proxy device 50) described in the above procedure may be made. As a specific example, push notification of the available frequency information, the recommended communication parameter information, the radio wave transmission continuation rejection notification, and the like may be made.

<5-6. Various Procedures Related to Terminal Device>

Basically, the respective procedures described in <5-1> to <5-4> can be used for the terminal device 30. However, unlike the base station device 40, the terminal device 30 has mobility. That is, the position information is dynamically updated. Depending on the legal system, in a case where the position information is changed by a certain amount or more, re-registration in the communication control device 60 may be required in some cases. Therefore, in an operation mode (see Non Patent Literature 4) defined by the Office of Communication (Ofcom) of the United Kingdom, the following two types of communication parameters are defined.

Specific operational parameters
Generic operational parameters

The specific operational parameters are defined as "operational parameters specific to a specific slave white space device (WSD)" in Non Patent Literature 4. In other words, the specific operational parameters are communication parameters calculated using a device parameter of the slave WSD corresponding to the terminal device 30. As a feature, the specific operational parameters are calculated by a white space database (WSDB) using the position information of the slave WSD.

From such a feature, it is assumed that the specific operational parameters are suitable for the terminal device 30 that has low mobility or is fixedly installed.

The generic operational parameters are defined as "operational parameters that can be used by any slave WSD positioned within the coverage area of a predetermined master WSD (corresponding to the base station device 40)" in Non Patent Literature 4. As a feature, the generic operational parameters are calculated by the WSDB without using the position information of the slave WSD.

From such features, it is assumed that the generic operational parameters are suitable for the terminal device 30 that has high mobility.

The information for the terminal device 30 can be provided from the base station device 40 by unicast/broadcast. For example, a broadcast signal represented by a contact verification signal (CVS) defined in FCC rule Part 15 Subpart H can be used. Alternatively, it may be provided by a broadcast signal specific to a wireless interface. Specifically, it may be provided by, for example, a physical broadcast channel (PBCH) or NR-PBCH used in LTE or 5G NR.

<5-7. Procedure Performed Between Communication Control Devices>

[Information Exchange]

Figure 22:
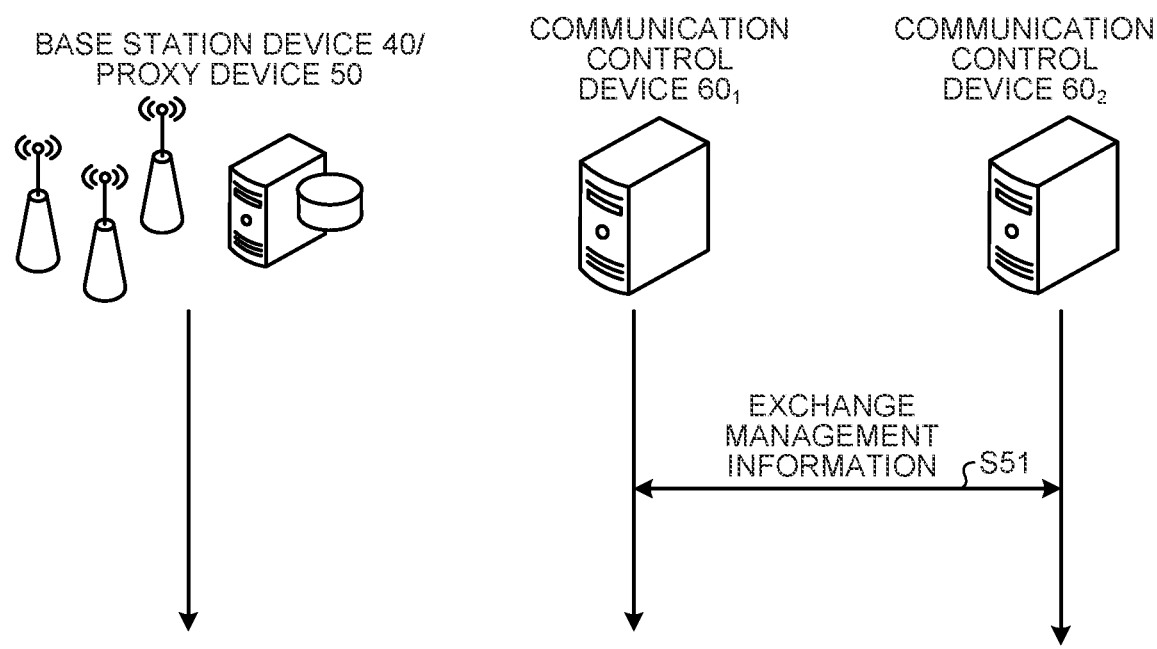
FIG. 22 is a sequence diagram for describing a management information exchange procedure.

The communication control device 60 can exchange management information with another communication control device 60. FIG. 22 is a sequence diagram for describing a management information exchange procedure. In the example of FIG. 22, the communication control device 60$_1$ and the communication control device 60$_2$ exchange information. It is a matter of course that the communication control devices that exchange information is not limited to the two communication control devices, the communication control device 60$_1$ and the communication control device 60$_2$.

In the management information exchange procedure, at least the following information is desirably exchanged.

Communication device registration information
Communication device communication parameter information
Area information The communication device registration information is typically a device parameter of the base station device 40 registered in the communication control device 60 in the registration procedure. Not all the registered information is necessarily exchanged. For example, information that may correspond to personal information does not need to be exchanged. Furthermore, when the communication device registration information is exchanged, encrypted and ambiguous information may be exchanged. For example, information converted into a binary value or information signed using an electronic signature mechanism may be exchanged.

Typically, the communication device communication parameter information is information regarding a communication parameter currently used by the base station device 40. At least information indicating the used frequency and the transmission power is desirably included. Other communication parameters may be included.

The area information is typically information indicating a predetermined geographical area. The information can include area information with various attributes in various manners.

For example, protection area information of the base station device 40 serving as a secondary system with high priority, such as a PAL protection area (PPA) disclosed in Non Patent Literature 5, may be included. The area information in this case can be expressed by, for example, a set of three or more geographical position coordinates. Furthermore, for example, in a case where a plurality of communication control devices 60 can refer to a common external database, the area information can be expressed by an ID indicating the information.

Furthermore, for example, information indicating the coverage of the base station device 40 may be included. The area information in this case can also be expressed by, for example, a set of three or more geographical position coordinates. Alternatively, for example, a circle with the geographical position of the base station device 40 as the origin can be assumed, and the area information can be expressed as information indicating the radius of the circle. Furthermore, for example, in a case where a plurality of communication control devices 60 can refer to a common external database, the area information can be expressed by an ID indicating the information.

Furthermore, as another aspect, information regarding an area section determined in advance by an administration or the like can be included. Specifically, for example, it is possible to indicate a certain area by indicating an address. Furthermore, for example, a license area or the like can be similarly expressed.

Furthermore, as still another aspect, the area information does not necessarily have to express a planar area, and may express a three-dimensional space. For example, the area information may be expressed using a spatial coordinate system. In addition, for example, information indicating a predetermined closed space, such as the number of stories, a floor number, or a room number of a building may be used.

These pieces of information can be exchanged in various manners. An example thereof will be described below.

ID specifying method
Period specifying method
Area specifying method
Dump method The ID specifying method is a method in which information corresponding to an ID given in advance to specify information managed by the communication control device 60 is acquired by using the ID. For example, it is assumed that the communication control device $60_1$ manages a base station device 40 with an ID "AAA". At this time, the communication control device $60_2$ specifies the ID "AAA" and makes an information acquisition request to the communication control device $60_1$. After receiving the request, the communication control device $60_1$ searches for information corresponding to the ID "AAA", and notifies of the registration information and the communication parameter information of the corresponding base station device 40 as a response.

In the period specifying method, a specific period is specified, and information satisfying a predetermined condition can be exchanged during the period.

Examples of the predetermined condition include the update of the information. For example, in a case where the acquisition of the communication device information in the specific period is specified by a request, the registration information of a base station device 40 which is newly registered in the period or the registration information of a base station device 40 of which the communication parameter has been changed, and the communication parameter information can be notified as a response.

Examples of the predetermined condition include whether or not the information is recorded in the communication control device 60. For example, in a case where the acquisition of the communication device information in the specific period is specified by a request, the registration information and the communication parameter information of a base station device 40 recorded in the communication control device 60 in the period can be notified as a response. Furthermore, the latest information in the period can be notified. Alternatively, an update history may be notified for each information.

In the area specifying system, a specific area is specified, and information belonging to the area is exchanged. For example, in a case where the acquisition of the communication device information in the specific area is specified by a request, the registration information and the communication parameter information of a base station device 40 which is installed in the area can be notified as a response.

The dump method is a method of providing all information recorded in the communication control device 60. At least the information regarding the base station device 40 and the area information are desirably provided by the dump method.

The above description of the information exchange between the communication control devices 60 is entirely based on a pull method. That is, information corresponding to a parameter specified in a request is provided as a response, and the information exchange between the communication control devices 60 can be implemented by, for example, an HTTP GET method. However, the information exchange is not limited to the pull method, and information may be actively provided to another communication control device 60 by the push method. The push method can be implemented by, for example, an HTTP POST method.

[Command/Request Procedure]

The communication control devices 60 may give a command and/or make a request with each other. Specifically, as an example, the reconfiguration of the communication parameter of the base station device 40 can be cited. For example, in a case where it is determined that the base station device $40_1$ managed by the communication control device $60_1$ receives a large amount of interference from the base station device $40_4$ managed by the communication control device $60_2$, the communication control device $60_1$ may request the communication control device $60_2$ to change the communication parameter of the base station device $40_4$.

As another example, the reconfiguration of the area information can be cited. For example, in a case where incompletion is found in calculation of the coverage information or the protection area information related to the base station device $40_4$ managed by the communication control device $60_2$, the communication control device $60_1$ may request the communication control device $60_2$ to reconfigure the area information. In addition, the area information reconfiguration request may be made for various reasons.

6. Dynamic Determination of Information Regarding Protection of Primary Use Device (First Embodiment)

Next, an operation of the communication system 1000 according to a first embodiment will be described. The communication system 1000 dynamically determines information regarding protection of the primary use device on the basis of information regarding the primary use device. The communication system 1000 calculates an operational parameter (also referred to as a communication parameter) of the secondary use device on the basis of the information regarding the protection of the primary use device.

Here, the primary use device (first communication device) is a device that primarily uses a predetermined frequency band. For example, the primary use device is the radio wave use device 10. Note that the term "primary use device" appearing in the following description can be rephrased as a term "first wireless system" or "primary system". In this case, the first wireless system or the primary system may include a plurality of communication devices (for example, a plurality of radio wave use devices 10) or may include one communication device (for example, one radio wave use device 10).

The secondary use device (second communication device) is a device that secondarily uses a predetermined frequency band. For example, the secondary use device is the base station device 40 or the terminal device 30. Note that the term "secondary use device" appearing in the following description can be rephrased as a term "second wireless system" or "secondary system". In this case, the second wireless system or the secondary system may include a plurality of communication devices (for example, a plurality of base station devices 40 and/or a plurality of terminal devices 30) or may include one communication device (for example, one base station device 40 or one terminal device 30).

<6-1. System Configuration Used for Description>

Figure 23:
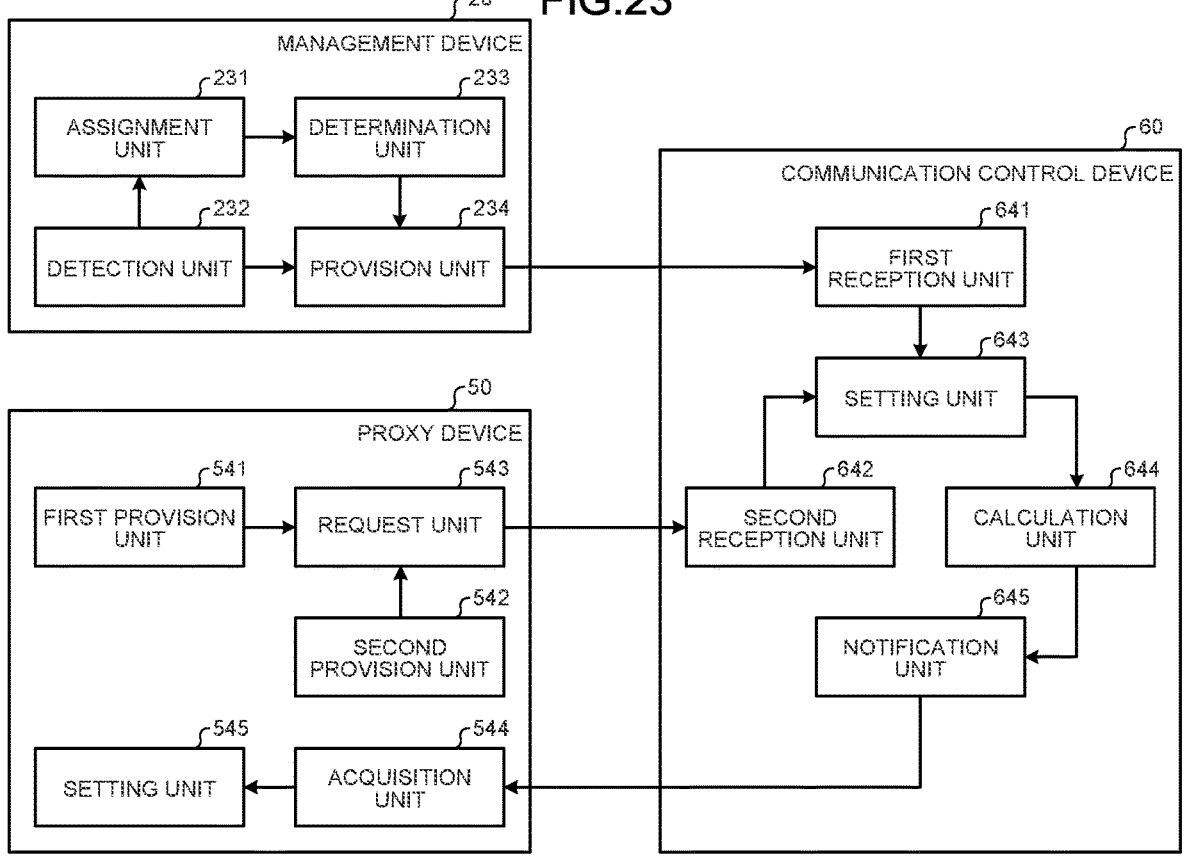
FIG. 23 is a diagram illustrating an example of a functional configuration of a communication system that enables secondary use of a frequency.

FIG. 23 is a diagram illustrating an example of a functional configuration of the communication system 1000 that enables secondary use of a frequency. The communication system 1000 includes the management device 20, the proxy device 50, and the communication control device 60.

Note that the configuration illustrated in FIG. 23 is obtained by simplifying the configuration described in <<2. Configuration of Communication System>> in order to facilitate understanding of the operation of the communication system 1000. That is, the device illustrated in FIG. 23 is obtained by extracting a representative configuration necessary for the description, and can be replaced with another device. For example, the management device 20 can be replaced with another device (for example, the radio wave use device 10) included in the communication system 1 (primary system). Further, the proxy device 50 can be replaced with another device (for example, the terminal device 30 or the base station device 40) included in the communication system 2 (secondary system).

Hereinafter, before describing the operation of the communication system 1000, a functional configuration of each of the management device 20, the proxy device 50, and the communication control device 60 will be described.

[Management Device]

The management device 20 is a device that manages each device (for example, the radio wave use device 10) included in the communication system 1 (primary system). The management device 20 includes the assignment unit 231, the detection unit 232, the determination unit 233, and the provision unit 234.

As described above, the management device 20 illustrated in FIG. 23 can be replaced with another device included in the communication system 1 (primary system). For example, the management device 20 can be replaced with the radio wave use device 10. In this case, the terms "assignment unit 231", "detection unit 232", "determination unit 233", and "provision unit 234" described below can be replaced with terms indicating the functional blocks included in the control unit 13 of the radio wave use device 10.

Hereinafter, the function of each block included in the management device 20 will be described.

The assignment unit 231 assigns the first identifier to each primary use device. The first identifier is information regarding the primary use device. For example, the first identifier is information for classifying the primary use device according to the degree of confidentiality of the primary use device, the degree of importance of communication (for example, the degree of importance of the content of communication), or priority. It is a matter of course that the first identifier is not limited to these examples. The first identifier will be described later.

The detection unit 232 monitors an operation situation and the like of the primary use device. For example, whether or not the primary use device is fixedly installed or is moving is monitored. In addition, the detection unit 232 monitors the degree of confidentiality of the primary use device, the degree of importance of communication, or the priority of communication. Here, in a case where the primary use device is the terminal device, the degree of confidentiality of the primary use device may be set in advance in association with the ID of the terminal. Further, the degree of confidentiality and the ID of the terminal may be associated with each other by a subscription agreement. The degree of confidentiality may be classified into a plurality of levels, for example, five levels.

The assignment unit 231 dynamically assigns the first identifier to each primary use device based on the result of the detection unit 232. Then, the determination unit 233 sets the range of the protection area in addition to (or instead of) the position information of the primary use device on the basis of the assigned first identifier.

For example, in a case where it is desired to conceal the existence itself of the primary use device, it is considered that there is a risk that the position of the primary use device is specified over a long period is high in a state where the primary use device is fixedly installed. Therefore, the assignment unit 231 assigns, as the first identifier, information for identifying whether the primary use device is fixedly installed or movably installed to the primary use device. Then, the determination unit 233 sets the range of the protection area related to the primary use device on the basis of the first identifier.

Note that the assignment unit 231 may reassign the first identifier at a predetermined timing. For example, the assignment unit 231 may reassign the first identifier when the primary use device that has been fixedly installed starts to move. Then, the determination unit 233 may set the range of the protection area related to the primary use device on the basis of the reassigned first identifier. In this case, since the primary use device is moving, it is considered that the risk that the position of the primary use device is specified over a long period is low. Therefore, in this case, the determination unit 233 sets a small range (first range) as the protection area of the primary use device.

Further, the assignment unit 231 may reassign the first identifier when the moving primary use device is fixedly installed. Then, the determination unit 233 may set the range of the protection area related to the primary use device on the basis of the reassigned first identifier. In this case, since the primary use device is fixedly installed, it is considered that the risk that the position of the primary use device is specified over a long period is high. Therefore, the determination unit 233 sets a large range (for example, a range larger than the first range) as the protection area of the primary use device.

As a result, it is possible to reduce a risk that the position of the primary use device is specified or the primary use device is attacked by a third party. In addition, in a state where the risk of attack or disturbance is low, it is possible to increase the area and period in which the secondary use is possible.

In addition, it is possible to assume that there is a primary use device whose movement route is desired to be concealed. In this case, when the primary use device starts to move, the assignment unit 231 reassigns the first identifier (for example, the degree of confidentiality higher than a predetermined threshold) suitable for this situation. Then, the determination unit 233 sets the range of the protection area related to the primary use device on the basis of the reassigned first identifier. For example, the determination unit 233 sets a large range (for example, the range of the protection area larger than the range of the protection area in a case where the degree of confidentiality is lower than a predetermined threshold) as the protection area of the primary use device so that the position of the primary use device can be concealed. As a result, the movement route of the primary use device can be concealed.

Here, for example, the detection unit 232 may determine that the primary use device has shifted to a moving state in a case where a movement distance exceeds an arbitrary threshold value. As a result, it is possible to suppress the frequency of frequent reassignment of the first identifier performed by the assignment unit 231 caused by small movement. In addition, it is possible to suppress an increase in the load of processing such as the setting of the range of the protection area performed by the determination unit 233. In addition, it is possible to reduce the frequency of the update of the information regarding the first identifier and the range of the protection area for the proxy device 50. As a result, the addition resulted from the communication processing with the proxy device 50 can be reduced, and the processing performed by the proxy device 50 can be reduced. That is, by suppressing the frequency of the reassignment and the setting of the range of the protection area to a significant degree, a trade-off between the server load and the improvement in the frequency utilization efficiency can be realized.

In addition, it is assumed that the detection unit 232 detects that a primary use device that has been performing communication whose content is not particularly important has started communication whose content is important in an emergency. In this case, the assignment unit 231 reassigns the first identifier (for example, the degree of importance higher than a predetermined threshold value) suitable for this situation in order to protect the communication of the primary use device. The determination unit 233 sets the range of the protection area related to the primary use device on the basis of the reassigned first identifier. In this case, the communication of the primary use device is communication that requires strong protection. Therefore, the determination unit 233 sets a large protection area range (for example, the range of the protection area larger than the range of the protection area in a case where the degree of importance is lower than the predetermined threshold value) as the protection area of the primary use device. Further, the determination unit 233 may set the amount of the interference margin in addition to (or instead of) the information on the range of the protection area of the primary use device. As a result, it is possible to reduce the risk of occurrence of radio wave interference of the secondary use device with the primary use device, and it is possible to expect dynamic protection of communication with important contents.

In addition, it is assumed that a primary use device that has been performing communication whose content has a low degree of confidentiality (for example, communication whose degree of confidentiality is lower than a predetermined threshold value) has started communication whose content has a high degree of confidentiality (for example, communication whose degree of confidentiality is higher than the predetermined threshold value). In this case, in order to protect the communication of the primary use device, the assignment unit 231 reassigns the first identifier suitable for the degree of confidentiality. The determination unit 233 sets the range of the protection area related to the primary use device on the basis of the reassigned first identifier. In this case, the communication of the primary use device is communication that requires strong protection. Therefore, the determination unit 233 sets a large protection area range (for example, the range of the protection area larger than the range of the protection area in a case where the degree of confidentiality is lower than the predetermined threshold value) as the protection area of the primary use device. As a result, it is possible to reduce the risk of occurrence of radio wave interference of the secondary use device with the primary use device, and it is possible to dynamically protect communication whose content has a high degree of confidentiality, and to reduce the risk of interception of communication by a third party.

The provision unit 234 provides, to the communication control device 60, information regarding the primary use device set by the determination unit 233. Here, the provision unit 234 may update the information regarding the primary use device for the communication control device 60 at a predetermined frequency, for example, every day. Further, the provision unit 234 may update the information regarding the primary use device in accordance with the timing of the reassignment of the first identifier performed by the assignment unit 231, and at this time, the provision unit 234 may perform the update only for a primary use device to which the first identifier has been reassigned.

[Proxy Device]

The proxy device 50 is a representative device of the respective devices (for example, the base station device 40) included in the communication system 2 (secondary system). The proxy device 50 includes the first provision unit 541, the second provision unit 542, the request unit 543, the acquisition unit 544, and the setting unit 545.

As described above, the proxy device 50 illustrated in FIG. 23 can be replaced with another device included in the communication system 2 (secondary system). For example, the proxy device 50 can be replaced with the base station device 40. In this case, the terms "first provision unit 541", "second provision unit 542", "request unit 543", "acquisition unit 544", and "setting unit 545" described below can be rephrased as terms indicating the respective functional blocks (for example, the first provision unit 441, the second provision unit 442, the request unit 443, the acquisition unit 444, and the setting unit 445) included in the control unit 44 of the base station device 40.

Hereinafter, the function of each block included in the proxy device 50 will be described.

The first provision unit 541 provides the second identifier to the request unit 543. The second identifier is, for example, an index for classifying an entity who manages the secondary use device. Here, the secondary use device is a device that secondarily uses a predetermined frequency band, and in the example illustrated in FIG. 4, the secondary use device is, for example, the base station device 40 or the terminal device 30.

The first provision unit 541 provides, to the request unit 543, at least information regarding the secondary use device, the information including the position information and frequency channel information. Here, the information regarding the secondary use device may be capabilities such as a communication scheme supported by the communication function, a frequency band, and maximum transmission output power.

The request unit 543 makes a secondary use permission request (for example, a frequency use permission request such as a grant request) to the communication control device 60. The secondary use permission request includes at least the second identifier, the position information of the secondary use device, and a desired operational parameter. Here, the operational parameter (also referred to as the communication parameter) includes at least information on the maximum transmission power (or the maximum equivalent isotropic radiated power (EIRP)) and the frequency band. However, in a case where the communication control device 60 makes a request for the registration information to the secondary use device, the position information of the secondary use device may be provided to the communication control device 60 in accordance with the registration request or the registration information update processing. That is, the secondary use permission request (for example, the frequency use permission request) does not have to include the position information of the secondary use device. The update of the registration information is activated, for example, when the secondary use device moves by a certain distance.

The acquisition unit 544 acquires secondary use permission information (for example, a grant response) as a response to the secondary use permission request from the request unit 543. Here, the secondary use permission information includes, for example, an identifier of a secondary use device to be permitted, a secondary use determination result, identification information added in a case where the secondary use is permitted, and information regarding a permission period. Furthermore, in a case where the communication control device 60 does not approve the secondary use permission request, the communication control device 60 may provide predetermined information including an available operational parameter as a response to the acquisition unit 544. The request unit 543 can promptly obtain the secondary use permission by making the secondary use permission request including an operational parameter equivalent to the available operational parameter acquired by the acquisition unit 544 again.

The setting unit 545 sets the operational parameter permitted by the communication control device 60 for the secondary use device via the acquisition unit 544. After the setting is completed, the secondary use device can start the secondary use in the desired frequency band.

[Communication Management Device]

The communication control device 60 is a device that manages radio wave transmission of the secondary use device. The communication control device 60 includes the first reception unit 641, the second reception unit 642, the setting unit 643, the calculation unit 644, and the notification unit 645.

The first reception unit 641 acquires information (first information) regarding the primary use device from the management device 20. The information (first information) regarding the primary use device may be the above-described "information regarding the protection of the primary use device". For example, the information regarding the primary use device may be the position information of the primary use device, the range of the protection area, and/or the amount of the interference margin. Further, the information (first information) regarding the primary use device may be the above-described "first identifier".

The second reception unit 642 acquires information (second information) regarding the secondary use device from the proxy device 50. Here, the information regarding the secondary use device is, for example, the identifier of the secondary use device, the second identifier, the position information of the secondary use device, and/or information regarding a desired operational parameter. Note that timings at which the identifier of the secondary use device, the second identifier, the position information of the secondary use device, and the information regarding the desired operational parameter are acquired, respectively, may be the same as or different from each other.

The setting unit 643 stores the information (first information) regarding the primary use device acquired from the management device 20 via the first reception unit 641. Further, the setting unit 643 stores the information (second information) regarding the secondary use device acquired from the proxy device 50 via the second reception unit 642. Then, on the basis of the first information and/or the second information, the "information regarding the protection of the primary use device" used for the calculation of the operational parameter is set. In a case where the first information itself is the information regarding the protection of the primary use device, the setting unit 643 may set the first information as the "information regarding the protection of the primary use device" used for the calculation of the operational parameter.

The calculation unit 644 calculates the influence of the secondary use device (hereinafter, referred to as a target secondary use device) related to the secondary use permission request on an arbitrary primary use device on the basis of the information regarding the primary use device and the information regarding the secondary use device stored in the setting unit 643. Here, the influence on the primary use device is, for example, the interference amount. Furthermore, the calculation unit 644 calculates a secondary use parameter serving as an operational parameter permitted for the target secondary use device in consideration of the range of the protection area related to an arbitrary primary use device or the amount of the interference margin.

The notification unit 645 notifies the secondary use system or the target secondary use device of the secondary use parameter calculated by the calculation unit 644 as a response to the secondary use permission request from the secondary use system (for example, the proxy device 50) or the target secondary use device (for example, the base station device 40 or the terminal device 30).

<6-2. First Identifier>

As described above, the first identifier is used as an index for determining how much the degree of protection from the interference with the primary use device protection or the degree of confidentiality is considered. When the secondary use of the frequency is determined, it is possible to maximize the efficiency in the secondary use of the frequency by minimizing the protection area for the interference with a target primary use entity and minimizing the interference margin. On the other hand, in a case where an entity who primarily uses a frequency is related to public safety or defense, for example, it is considered that communication of the primary use device should be protected to the maximum in accordance with the importance of communication contents. For example, it is assumed that urgent information in emergency is information to be prioritized to the maximum extent. In addition, there may be a case where it is not desired to disclose the accurate position of the primary use device. In that case, it is assumed that it is desired to make the protection area for the interference larger to make it difficult to specify the accurate position of the primary use device. Therefore, in the present embodiment, the degree of protection from the interference with the primary use device and the degree of confidentiality (for example, the degree of confidentiality of the existence of the primary use device itself) of the primary use device can be classified using the first identifier.

FIG. 24 is a diagram illustrating an example of the first identifier. In this example, the degree of protection from the interference with each device that is the target primary use entity and the degree of confidentiality are classified on the basis of the installation mode of the corresponding device. For example, in a case of the information on the primary use device to which "2" is assigned as the first identifier, the provision unit 234 discloses the accurate position of the device to the communication control device 60 such that the communication control device 60 can perform the interference calculation with high accuracy. On the other hand, in a case of the primary use device to which "1" is assigned as the first identifier, the provision unit 234 discloses, for example, range information including the accurate position of the corresponding device to the communication control device 60 such that the communication control device 60 cannot specify the accurate position of the corresponding device. Here, the installation mode of each device that is the target primary use entity may be the degree of confidentiality of each device that is the target primary use entity.

FIG. 25 is a diagram illustrating another example of the first identifier. In this example, the classification of the disclosure of the information regarding each device that is the target primary use entity is performed on the basis of the importance of communication of the corresponding device. For example, in a case of the information on the primary use device to which "high" is assigned as the first identifier, the provision unit 234 discloses, instead of the accurate position of the corresponding device, for example, information on a large range (a range larger than a predetermined area) including the accurate position to the communication control device 60. Further, in a case of the information on the primary use device to which "moderate" is assigned as the first identifier, the provision unit 234 discloses, instead of the accurate position of the corresponding device, for example, information on a small range (a range smaller than the predetermined area) including the accurate position to the communication control device 60. On the other hand, in a case of the information on the primary use device to which "low" is assigned as the first identifier, the accurate position (for example, the pinpoint position that does not have an error) of the corresponding device is disclosed to the communication control device 60. Here, the importance of communication may be read as the priority of communication.

Note that the management device 20 may change the interference amount (allowable interference amount) allowed by the primary use device on the basis of the first identifier. In the following description, the allowable interference amount (interference margin) may be referred to as an interfered margin. For example, it is assumed that the first identifier is the degree of importance of communication. In this case, the management device 20 sets a large margin (for example, an interference margin larger than a predetermined threshold value) as the interfered margin for the primary use device to which "high" is assigned as the first identifier, and sets a small margin (for example, an interference margin smaller than the predetermined threshold value) as the interfered margin for the primary use device to which "low" is assigned as the first identifier.

Note that the first identifier is not limited to the above example. In addition, the first identifier may be one in which the disclosure is classified by combining a plurality of elements. For example, the first identifier may be one in which the disclosure of the information regarding the primary use device is classified on the basis of a combination of the installation mode of the primary use device (or the degree of confidentiality of the primary use device) and the degree of importance (or the priority) of communication of the primary use device.

<6-3. Second Identifier>

As described above, the second identifier is used, for example, as an index for classifying the credibility of an entity (hereinafter, referred to as a secondary use entity) that uses, operates, and/or manages the secondary use device. Here, the credibility may be classified depending on the type of license of the secondary use entity.

For example, it is assumed that the second identifier is provided from the proxy device 50 to the management device 20. Alternatively, it is assumed that the second identifier is provided from the communication control device 60 to the management device 20. In this case, in a case where all of the plurality of secondary use devices that secondarily use the frequency band used by the primary use device are devices that are the secondary usage entities (for example, licensed business operators) with high credibility, the management device 20 discloses information having a high degree of confidentiality to the communication control device 60. For example, the management device 20 discloses, to the communication control device 60, accurate installation position information of all the primary use devices (for example, information on the pinpoint positions that do not have an error) necessary for the communication control device 60 to perform the interference calculation.

On the other hand, in a case where a device that is the secondary use entity (for example, an unlicensed user) with low credibility is included in the plurality of secondary use devices, the management device 20 discloses information having a low degree of confidentiality to the communication control device 60. For example, as the accurate installation position information, the management device 20 discloses, for example, only information on the primary use device that has a low degree of confidentiality (for example, the degree of confidentiality is lower than a predetermined threshold value) to the communication control device 60. At this time, in a case of the installation position information of the primary use device that has a high degree of confidentiality (for example, the degree of confidentiality is higher than the predetermined threshold value), the management device 20 may use, instead of the accurate installation position information, for example, the position information and/or range information (area information) having an error. It is a matter of course that the management device 20 does not have to disclose the installation position information of the primary use device that has a high degree of confidentiality.

FIG. 26 is a diagram illustrating an example of the second identifier. In this example, the credibility of the secondary use entity is classified on the basis of whether or not the secondary use entity is a licensed business operator. For example, in a case where all of the plurality of secondary use devices are devices that are the secondary usage entities to which "1" is assigned as the second identifier, the management device 20 determines that all of the plurality of secondary use devices are devices that are entities with high credibility, and discloses information having a high degree of confidentiality, for example, the accurate position information (for example, the information on the pinpoint position that does not have an error) of each primary use device to the communication control device 60. On the other hand, in a case where a device that is the secondary use entity to which "2" is assigned as the second identifier is included in the plurality of secondary use devices, the management device 20 determines that a device that is an entity with low credibility is included in the plurality of secondary use devices, and discloses, to the communication control device 60, information having a low degree of confidentiality, for example, the range information (for example, information on the range of the protection area set by the determination unit 233) including the accurate position of each primary use device or the position information having an error. Note that the second identifier may be set for each area. For example, the second identifier is set for each prefecture.

Note that the second identifier is not limited to the information on the credibility. FIG. 27 is a diagram illustrating another example of the second identifier. The second identifier may be, for example, service mode information. The service mode information is information indicating a mode of a communication service provided by the secondary use device. For example, the service mode information may be information for specifying which one of a plurality of types including at least one of eMBB, mMTC, or URLLC is the type of the communication service provided by the base station device 40 to the terminal device 30.

Here, the type of the communication service provided by the secondary use device may be determined on the basis of identification information of a network slice newly introduced in 5G, for example, a slice ID. At this time, the slice ID may be single network slice selection assistance information (S-NSSAI). The S-NSSAI includes, for example, a slice/service type (SST). Furthermore, the S-NSSAI may include the SST and a slice differentiator (SD). The slice ID can be regarded as information indicating the type (for example, whether the communication service provided by the base station device 40 is URLLC, eMBB, or mMTC) of the communication service provided by the secondary use device. Note that the type of the communication service may be determined on the basis of preset criteria other than the slice ID. For example, the type of the communication service may be determined on the basis of the capability of the base station device 40.

Note that, in URLLC, a reliability requirement is strict. Therefore, in a case where a device that is the secondary usage entity to which "URLLC" is assigned as the second identifier is included in the plurality of secondary use devices, the management device 20 discloses information having a high degree of confidentiality, for example, the accurate position information (for example, the information on the pinpoint position that does not have an error) of each primary use device to the communication control device 60 such that the communication control device 60 can perform the interference calculation with high accuracy. On the other hand, in a case where a device that is the secondary use entity to which "URLLC" is assigned as the second identifier is included in the plurality of secondary use devices, the management device 20 discloses, to the communication control device 60, information having a low degree of confidentiality, for example, the range information including the accurate position of each primary use device or the position information having an error.

<6-4. Primary Use Device Information Range Determination Processing>

Next, primary use device information range determination processing will be described.

First Example

Figure 28:
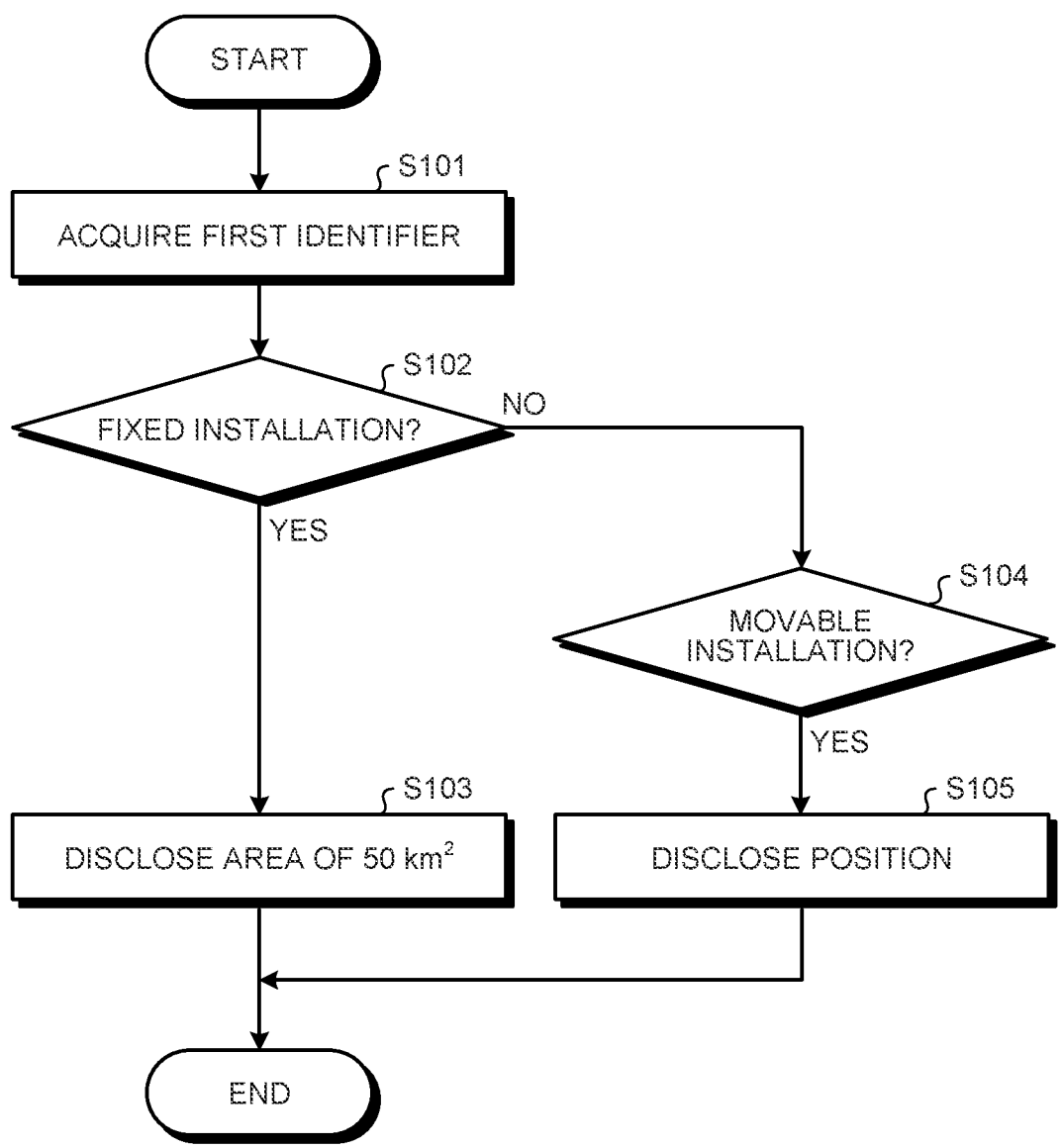
FIG. 28 is a diagram illustrating an example (first example) of primary use device information range determination processing.

FIG. 28 is a diagram illustrating an example (first example) of the primary use device information range determination processing. The processing illustrated in FIG. 28 is performed by the determination unit 233 of the management device 20, for example. This processing is performed in a case where the detection unit 232 detects information of any one of the plurality of primary use devices (hereinafter, referred to as a target primary use device), and the assignment unit 231 allocates the first identifier to the corresponding primary use device on the basis of the detected information. Note that this processing can be applied, for example, in a case where the first identifier is the information illustrated in FIG. 24.

First, the determination unit 233 acquires the first identifier from the assignment unit 231 (Step S101), and then, the determination unit 233 determines whether or not the installation mode of the target primary use device is "fixed installation" on the basis of the first identifier (Step S102).

In a case where the installation mode of the target primary use device is the "fixed installation" (Step S102: Yes), the determination unit 233 determines a wide range as the protection area such that the position of the primary use device is not specified for a long period. For example, the determination unit 233 determines to disclose the first range including the accurate position of the target primary use device to the communication control device 60 without disclosing the accurate position of the target primary use device (Step S103). The first range is, for example, an area of 50 km² including the position of the target primary use device. Then, the determination unit 233 sets the determined first range as the protection area to be notified to the communication control device 60.

In a case where the installation mode of the target primary use device is not the "fixed installation" (Step S102: No), the determination unit 233 determines whether or not the installation mode of the target primary use device is "movable installation" on the basis of the first identifier (Step S104).

In a case where the installation mode of the target primary use device is the "movable installation" (Step S104: Yes), the determination unit 233 determines to notify the communication control device 60 of the accurate position of the target primary use device (Step S105). In this case, the protection area of the target primary use device may be determined by the determination unit 233 or may be determined by the communication control device 60. Then, the determination unit 233 sets the accurate position of the target primary use device as information to be notified to the communication control device 60.

In a case where the installation mode of the target primary use device is neither the "fixed installation" nor the "movable installation", the determination unit 233 appropriately determines the information to be disclosed according to the installation mode.

Second Example

Figure 29:
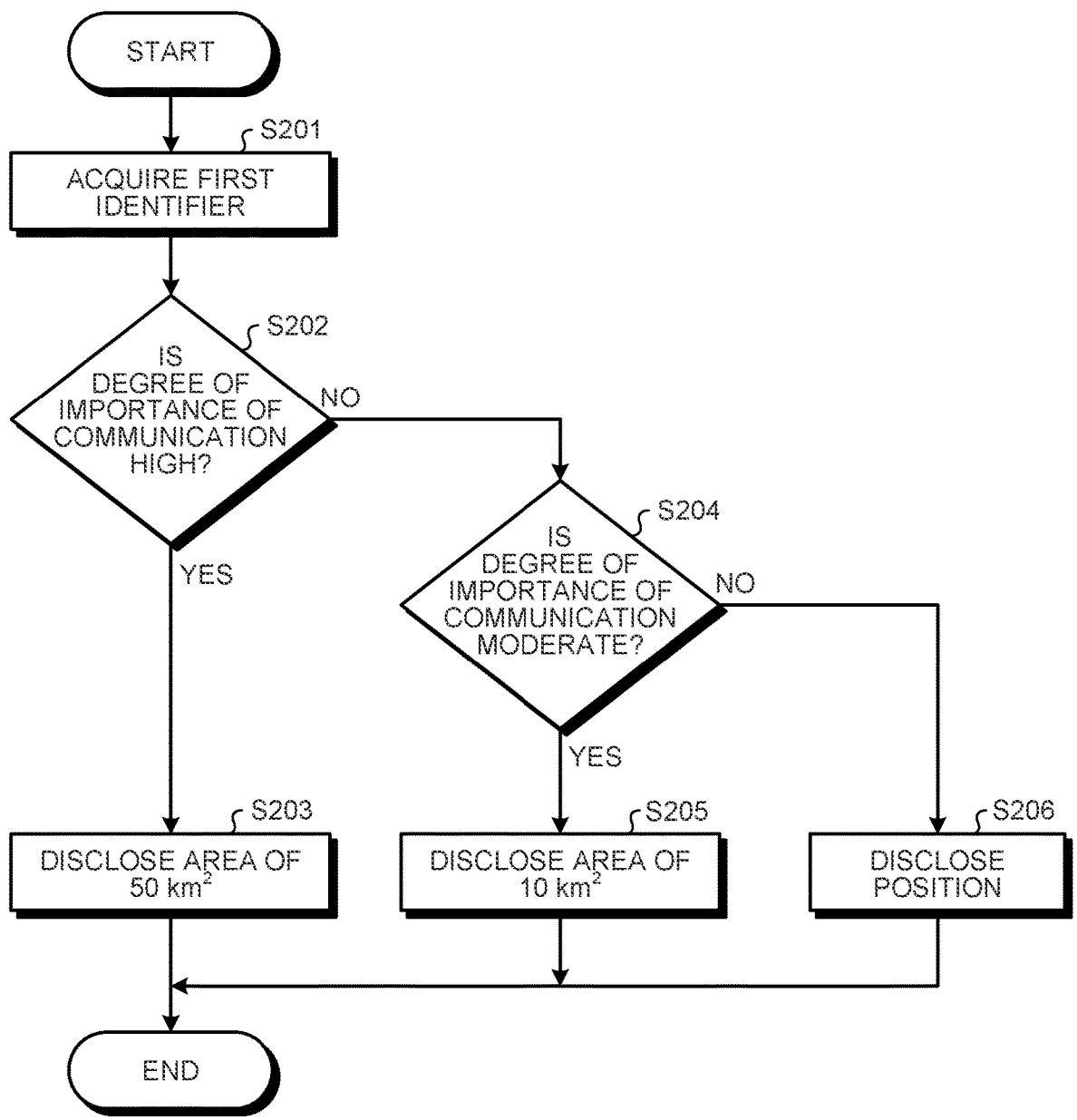
FIG. 29 is a diagram illustrating another example (second example) of the primary use device information range determination processing.

FIG. 29 is a diagram illustrating another example (second example) of the primary use device information range determination processing. The processing illustrated in FIG. 29 is performed by the determination unit 233 of the management device 20, for example. This processing is performed in a case where the detection unit 232 detects information of any one of the plurality of primary use devices (hereinafter, referred to as a target primary use device), and the assignment unit 231 allocates the first identifier to the corresponding primary use device on the basis of the detected information. Note that this processing can be applied, for example, in a case where the first identifier is the information illustrated in FIG. 25.

First, the determination unit 233 acquires the first identifier from the assignment unit 231 (Step S201), and then, the determination unit 233 determines whether or not the degree of importance (or the priority) of communication of the target primary use device is "high" on the basis of the first identifier (Step S202).

In a case where the degree of importance (or the priority) of the communication of the target primary use device is "high" (Step S202: Yes), the determination unit 233 determines a wide range as the protection area such that the position of the primary use device that performs communication is not specified or the communication is not intercepted. For example, the determination unit 233 determines to disclose the first range including the accurate position of the target primary use device to the communication control device 60 without disclosing the accurate position of the target primary use device (Step S203). The first range is, for example, an area of 50 km$^2$ including the position of the target primary use device. Then, the determination unit 233 sets the determined first range as the protection area to be notified to the communication control device 60.

In a case where the degree of importance (or the priority) of the communication of the target primary use device is not "high" (Step S202: No), the determination unit 233 determines whether or not the degree of importance of communication of the target primary use device is "moderate" on the basis of the first identifier (Step S204).

In a case where the degree of importance (or the priority) of the communication of the target primary use device is "moderate" (Step S204: Yes), the determination unit 233 determines a medium range as the protection area. For example, the determination unit 233 determines to disclose a second range including the position of the target primary use device to the communication control device 60 without disclosing the accurate position of the target primary use device (Step S205). The second range is a range smaller than the first range. For example, the second range is an area of 10 km$^2$ including the position of the target primary use device. Then, the determination unit 233 sets the determined second range as the protection area to be notified to the communication control device 60.

In a case where the degree of importance (or the priority) of the communication of the target primary use device is not "moderate" (Step S204: No), that is, in a case where the degree of importance of the communication (or the priority) is "low", the determination unit 233 determines to notify the communication control device 60 of the accurate position of the target primary use device (Step S206). In this case, the protection area of the target primary use device may be determined by the determination unit 233 or may be determined by the communication control device 60. Then, the determination unit 233 sets the accurate position of the target primary use device as information to be notified to the communication control device 60.

Note that, although the determination unit 233 sets the range of 50 km$^2$ as the protection area in Step S203, an infinite area may be set instead of the area of 50 km$^2$. As a result, an operation substantially equivalent to not disclosing the position information of the target primary use device can be implemented.

In addition, the size of the protection area is not limited to the sizes shown in Steps S203, S205, and S206. In addition, the size of the protection area can be dynamically changed according to predetermined criteria. For example, the size of the protection area can be dynamically changed according to a time zone, the degree of importance (or the priority) of communication, the position of the primary use device, the installation mode of the primary use device, the degree of confidentiality of the primary use device, and/or the like.

Third Example

Figure 30:
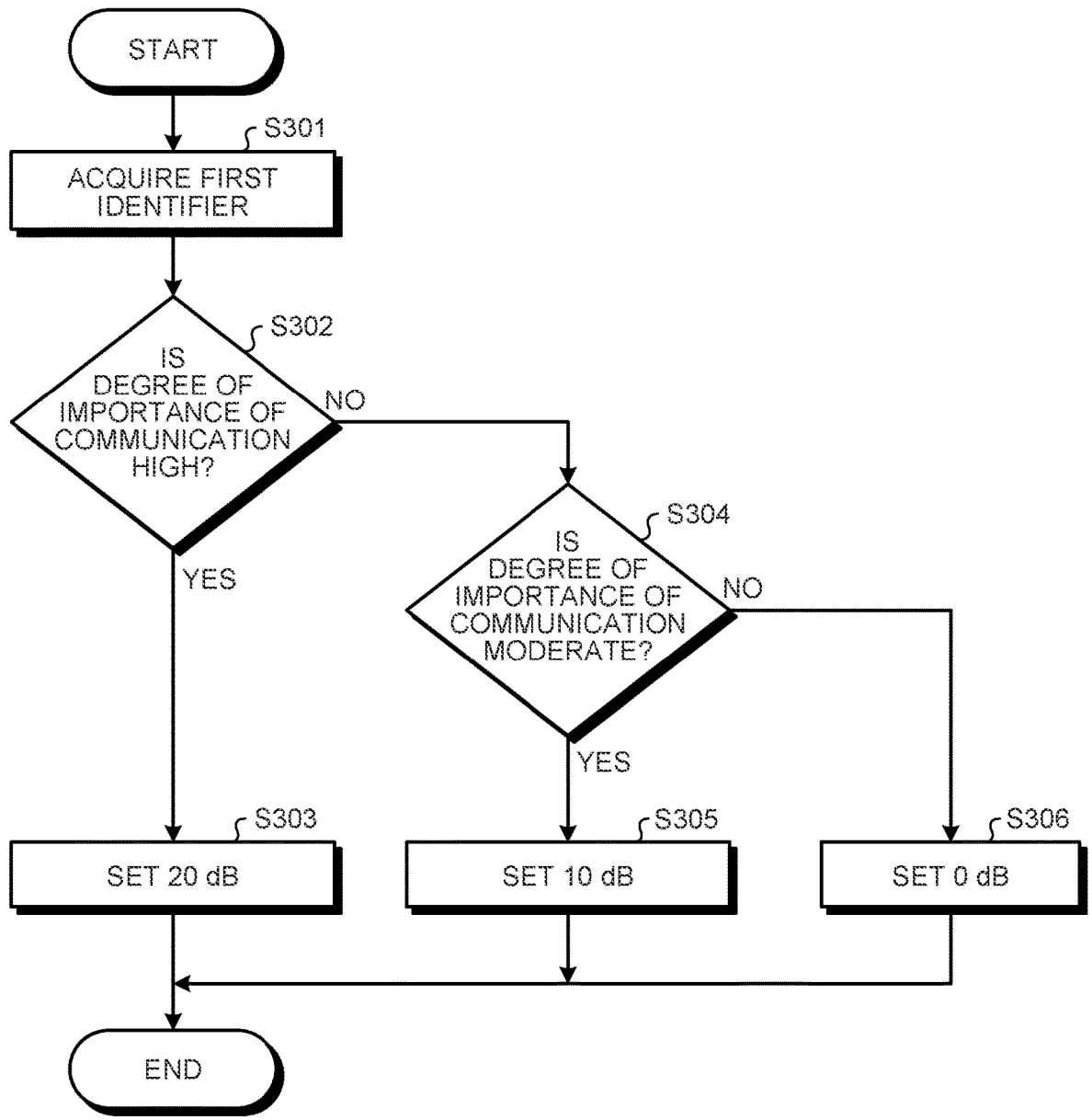
FIG. 30 is a diagram illustrating another example (third example) of the primary use device information range determination processing.

FIG. 30 is a diagram illustrating another example (third example) of the primary use device information range determination processing. The processing illustrated in FIG. 30 is performed by the determination unit 233 of the management device 20, for example. This processing is performed in a case where the detection unit 232 detects information of any one of the plurality of primary use devices (hereinafter, referred to as a target primary use device), and the assignment unit 231 allocates the first identifier to the corresponding primary use device on the basis of the detected information. Note that this processing can be applied, for example, in a case where the first identifier is the information illustrated in FIG. 25.

First, the determination unit 233 acquires the first identifier from the assignment unit 231 (Step S301), and then, the determination unit 233 determines whether or not the degree of importance of communication of the target primary use device is "high" on the basis of the first identifier (Step S302).

In a case where the degree of importance of the communication of the target primary use device is "high" (Step S302: Yes), the determination unit 233 sets a large interfered margin such that the communication is not disturbed. For example, the determination unit 233 sets the first value as the interfered margin of the target primary use device (Step S303). The first value is, for example, 20 dB.

In a case where the degree of importance of the communication of the target primary use device is not "high" (Step S302: No), the determination unit 233 determines whether or not the degree of importance of communication of the target primary use device is "moderate" on the basis of the first identifier (Step S304).

In a case where the degree of importance of the communication of the target primary use device is "moderate" (Step S304: Yes), the determination unit 233 sets a medium interfered margin. For example, the determination unit 233 sets the second value as the interfered margin of the target primary use device (Step S305). The second value is a value smaller than the first value. For example, the second value is 10 dB.

In a case where the degree of importance of the communication of the target primary use device is not "moderate" (Step S304: No), that is, in a case where the degree of importance of the communication is low, the determination unit 233 sets the interfered margin so that the secondary usage can be performed in a wider range. For example, the determination unit 233 sets a third value as the interfered margin of the target primary use device (Step S306). The third value is a value smaller than the second value. For example, the third value is 0 dB.

The interfered margin is a margin considered at the time of setting the transmission power of the device that secondarily uses the frequency, and the level of interference with the primary system can be lowered by setting a larger margin.

Note that the magnitude of the interfered margin is not limited to the magnitudes shown in Steps S303, S305, and S306. In addition, the magnitude of the interfered margin can be dynamically changed according to predetermined criteria. For example, the magnitude of the interfered margin can be dynamically changed according to a time zone, the degree of importance (or the priority) of communication, the position of the primary use device, the installation mode of the primary use device, the degree of confidentiality of the primary use device, and/or the like.

<6-5. Provision of Primary Use Device Information>

After the primary use device information range determination processing is performed, the provision unit 234 provides information on the target primary use device to the communication control device 60. For example, the provision unit 234 provides information (for example, information indicating the position of the primary use device, the range of the protection area, and/or the amount of the interfered margin) regarding the protection of the primary use device set in the primary use device information range determination processing.

<6-6. Secondary Use Parameter Calculation Processing>

Next, secondary use parameter calculation processing performed by the communication control device 60 will be described.

Figure 31:
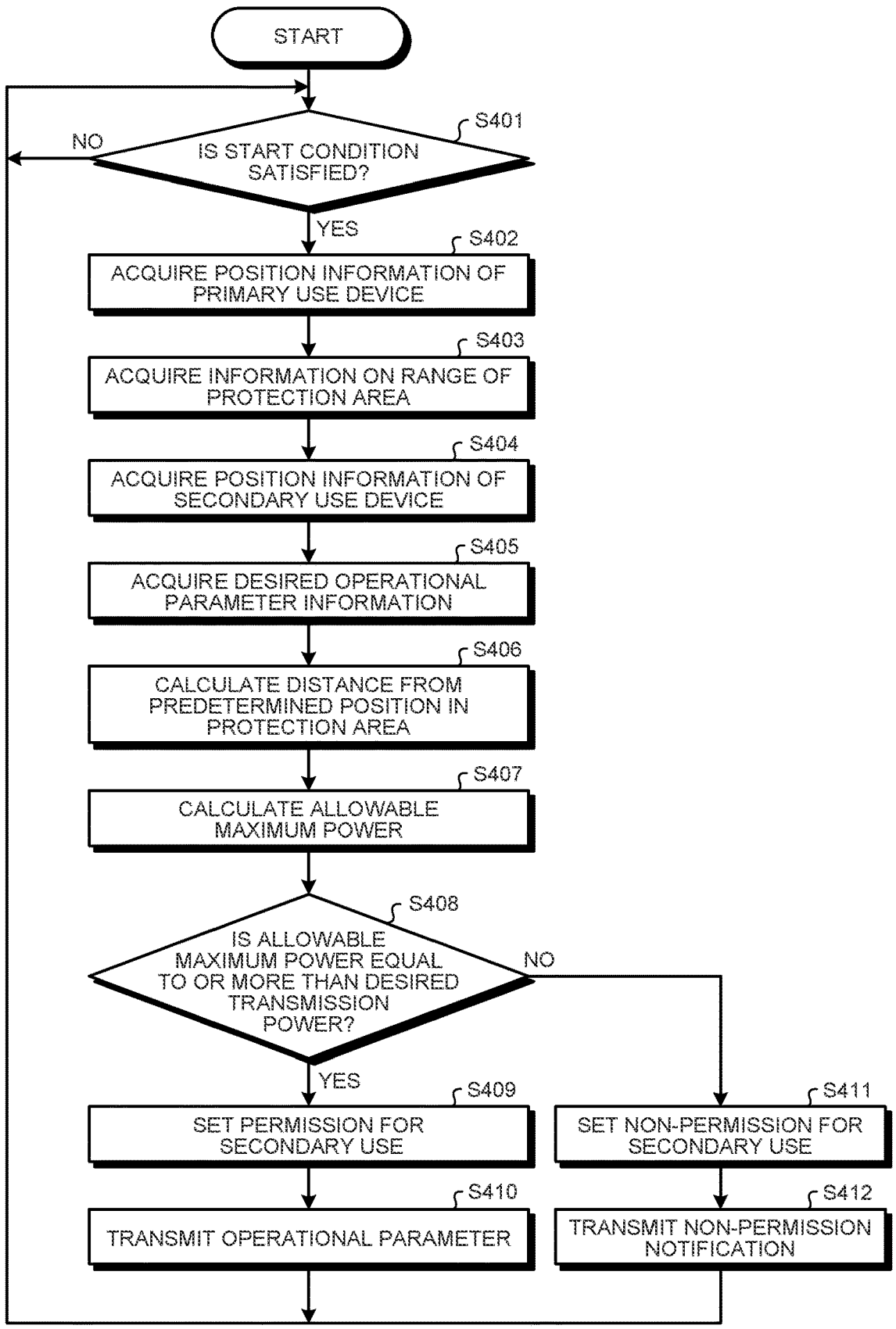
FIG. 31 is a diagram illustrating an example of secondary use parameter calculation processing.

FIG. 31 is a diagram illustrating an example of the secondary use parameter calculation processing. The secondary use parameter calculation processing is performed by the calculation unit 644 and the notification unit 645 of the communication control device 60.

Note that, before the secondary use parameter calculation processing, the first reception unit 641 of the communication control device 60 acquires the information regarding the target primary use device from the management device 20. The information (first information) regarding the target primary use device is, for example, the information regarding the protection of the target primary use device (for example, the radio wave use device 10) (hereinafter, referred to as protection information). The protection information is, for example, information indicating the position of the primary use device, the range of the protection area, and/or the amount of the interfered margin.

Then, the setting unit 643 sets the protection information on the basis of the acquired information. In a case where the acquired information itself is the protection information, the setting unit 643 sets the acquired information as the protection information. Note that, in a case where the first reception unit 641 newly receives the information regarding the target primary use device, the setting unit 643 performs resetting (hereinafter, also referred to as change or update) of the protection information on the basis of the newly received information.

In addition, the second reception unit 642 of the communication control device 60 acquires information regarding the secondary use device from the proxy device 50 (or the secondary use device itself) in accordance with the registration processing of the secondary use device or the secondary use permission request processing. The information regarding the secondary use device is, for example, the identifier of the secondary use device, the second identifier, the position information of the secondary use device, or information regarding a desired operational parameter. Then, the setting unit 643 sets the acquired information as information to be used for the calculation of the operational parameter. Note that, in a case where the second reception unit 642 newly receives the information regarding the primary use device, the setting unit 643 performs resetting (hereinafter, also referred to as change or update) of the newly received information as the information used for the calculation of the operational parameter.

Based on the above, the secondary use parameter calculation processing will be described.

The calculation unit 644 of the communication control device 60 determines whether or not the disclosure condition of the processing is satisfied (Step S401). For example, the calculation unit 644 determines whether or not there is a change in the information regarding the primary use device or whether or not there is the secondary use permission request. In a case where the disclosure condition is not satisfied (Step S401: No), the calculation unit 644 repeats Step S401 until the start condition is satisfied.

In a case where the disclosure condition is satisfied (Step S401: Yes), the calculation unit 644 acquires the protection information of the target primary use device set by the setting unit 643. For example, the calculation unit 644 acquires the position information (Step S402) of the target primary use device as the protection information. Note that, in a case where the position information is not set, the calculation unit 644 does not have to acquire the position information. In addition, the calculation unit 644 acquires information regarding the range of the protection area of the target primary use device as the protection information (Step S403).

In addition, the calculation unit 644 acquires information regarding the target secondary use device set by the setting unit 643. For example, the calculation unit 644 acquires the position information of the target secondary use device as the information regarding the target secondary use device (Step S404). In addition, the calculation unit 644 acquires information on a desired operational parameter of the target secondary use device as the information regarding the target secondary use device (Step S405).

Subsequently, the calculation unit 644 calculates maximum power allowed for the target secondary use device. For example, the calculation unit 644 calculates a distance between the position of the target secondary use device and an arbitrary position in the protection area allocated to the target primary use device (Step S406). Then, the calculation unit 644 calculates allowable maximum power at which the amount of interference given to the target primary use device is equal to or less than an allowable range or less than the allowable range in a frequency band included in the desired operational parameter (Step S407). Note that, in Step S406, the calculation unit 644 may calculate the shortest distance between the position of the target secondary use device and the protection area allocated to the target primary use device.

Next, the calculation unit 644 determines whether or not the calculated allowable maximum power is equal to or more than desired transmission power included in the desired operational parameter (Step S408). Here, the allowable maximum power and the desired transmission power may be power converted into EIRP. In addition, in Step S408, it may be determined whether or not the allowable maximum power of the target secondary use device is equal to or more than significant transmission power (for example, −10 dBm). This significant transmission power may be dynamically set.

In a case where the allowable maximum power is equal to or more than the desired transmission power included in the desired operational parameter (Step S408: Yes), the calculation unit 644 permits the secondary use of the frequency band included in the desired operational parameter (Step S409). Then, the notification unit 645 of the communication control device 60 notifies of the secondary use parameter as a response to the secondary use permission request (Step S410). The secondary use parameter may be the desired operational parameter.

In a case where the allowable maximum power is not equal to or more than the desired transmission power included in the desired operational parameter (Step S408: No), the calculation unit 644 rejects the secondary use of the frequency band included in the desired operational parameter (Step S411). Then, the notification unit 645 notifies of the fact that the secondary use is not permitted as a response to the secondary use permission request (Step S412). Note that the notification unit 645 may notify of an available operational parameter (for example, an operational parameter candidate in another frequency band) in addition to the fact that secondary use is not permitted.

<6-7. Acquisition of Secondary Use Permission>

The acquisition unit 544 of the proxy device 50 acquires the permission for the secondary use and the operational parameter of the target secondary use device from the communication control device 60, as a result of the processing illustrated in FIG. 31. Then, the setting unit 545 sets the operational parameter in the secondary use device (for example, the base station device 40). The permission for the secondary use and the operational parameter of the target secondary use device may be directly acquired by the secondary use device (for example, the base station device 40 or the terminal device 30). The control unit (for example, the communication control unit 446 of the base station device 40 or the control unit 34 of the terminal device 30) of the secondary use device performs radio wave transmission using a frequency band related to the permission for the secondary use on the basis of the operational parameter.

7. Dynamic Determination of Information Regarding Protection of Primary Use Device (Second Embodiment)

Note that, in the example of the configuration of the system that secondarily uses a frequency illustrated in FIG. 23, the assignment unit 231, the detection unit 232, the determination unit 233, and the provision unit 234 are implemented in the management device 20, but the present embodiment is not limited to this configuration.

For example, in a case where the communication control device 60 is operated by an entity with high credibility, for example, a government agency or an agency certified by the government, the functions of some or all of the assignment unit 231, the detection unit 232, the determination unit 233, and the provision unit 234 may be implemented in the communication control device 60.

Hereinafter, an example in which the setting unit 643 of the communication control device 60 has the function of the determination unit 233 will be described. In the second embodiment, it is assumed that the provision unit 234 provides the first identifier as it is to the communication control device 60. The first reception unit 641 of the communication control device 60 acquires the first identifier as the information (first information) regarding the target primary use device.

<7-1. Setting Processing>

Hereinafter, setting processing performed by the setting unit 643 will be described. In the following description, the setting processing will be described with reference to FIGS. 28 to 30.

First Example

Setting processing according to a first example corresponds to the primary use device information range determination processing according to the first example illustrated in FIG. 28. Hereinafter, the setting processing according to the first example will be described with reference to FIG. 28. The setting processing according to the first example is performed by the setting unit 643 of the communication control device 60, for example. This processing is performed in a case where the first reception unit 641 acquires the first identifier. This processing can be applied, for example, in a case where the first identifier is the information illustrated in FIG. 24.

First, the setting unit 643 acquires the first identifier from the first reception unit 641 (Step S101), and then, the setting unit 643 determines whether or not the installation mode of the target primary use device is the "fixed installation" on the basis of the first identifier (Step S102).

In a case where the installation mode of the target primary use device is the "fixed installation" (Step S102: Yes), the setting unit 643 determines a wide range as the protection area such that the position of the primary use device is not specified for a long period. For example, the setting unit 643 determines the first range including the accurate position of the target primary use device as the protection area (Step S103). The first range is, for example, an area of 50 km² including the position of the target primary use device. Then, the setting unit 643 sets the determined first range as the protection information.

In a case where the installation mode of the target primary use device is not the "fixed installation" (Step S102: No), the setting unit 643 determines whether or not the installation mode of the target primary use device is the "movable installation" on the basis of the first identifier (Step S104).

In a case where the installation mode of the target primary use device is the "movable installation" (Step S104: Yes), the setting unit 643 sets the accurate position of the target primary use device as the protection information. In this case, the protection area of the target primary use device may be separately determined by the setting unit 643.

In a case where the installation mode of the target primary use device is neither the "fixed installation" nor the "movable installation", the setting unit 643 appropriately sets the protection information according to the installation mode.

Second Example

Setting processing according to a second example corresponds to the primary use device information range determination processing according to the second example illustrated in FIG. 29. Hereinafter, the setting processing according to the second example will be described with reference to FIG. 29. The setting processing according to the second example is performed by the setting unit 643 of the communication control device 60, for example. This processing is performed in a case where the first reception unit 641 acquires the first identifier. This processing can be applied, for example, in a case where the first identifier is the information illustrated in FIG. 25.

First, the setting unit 643 acquires the first identifier from the first reception unit 641 (Step S201), and then, the setting unit 643 determines whether or not the degree of importance (or the priority) of communication of the target primary use device is "high" on the basis of the first identifier (Step S202).

In a case where the degree of importance (or the priority) of the communication of the target primary use device is "high" (Step S202: Yes), the setting unit 643 determines a wide range as the protection area such that the position of the primary use device that performs communication is not specified or the communication is not intercepted. For example, the setting unit 643 determines the first range including the accurate position of the target primary use device as the protection area (Step S203). The first range is, for example, an area of 50 km² including the position of the target primary use device. Then, the setting unit 643 sets the determined first range as the protection information.

In a case where the degree of importance (or the priority) of the communication of the target primary use device is not "high" (Step S202: No), the setting unit 643 determines whether or not the degree of importance (or the priority) of the communication of the target primary use device is "moderate" on the basis of the first identifier (Step S204).

In a case where the degree of importance of the communication of the target primary use device is "moderate" (Step S204: Yes), the setting unit 643 determines a medium range as the protection area. For example, the setting unit 643 determines to disclose the second range including the position of the target primary use device to the communication control device 60 (Step S205). The second range is a range smaller than the first range. For example, the second range is an area of 10 km² including the position of the target primary use device. Then, the setting unit 643 sets the determined second range as the protection information.

In a case where the degree of importance (or the priority) of the communication of the target primary use device is not "moderate" (Step S204: No), that is, in a case where the degree of importance of the communication (or the priority) is "low", the setting unit 643 sets the accurate position of the target primary use device as the protection information (Step S206). In this case, the protection area of the target primary use device may be separately determined by the setting unit 643.

In addition, the size of the protection area is not limited to the sizes shown in Steps S203, S205, and S206. The protection area may be a finite area or may be an infinite area. In addition, the size of the protection area can be dynamically changed according to predetermined criteria. For example, the size of the protection area can be dynamically changed according to a time zone, the degree of importance (or the priority) of communication, the position of the primary use device, the installation mode of the primary use device, the degree of confidentiality of the primary use device, and/or the like.

Third Example

Setting processing according to a third example corresponds to the primary use device information range determination processing according to the third example illustrated in FIG. 30. Hereinafter, the setting processing according to the third example will be described with reference to FIG. 30. The setting processing according to the third example is performed by the setting unit 643 of the communication control device 60, for example. This processing is performed in a case where the first reception unit 641 acquires the first identifier. This processing can be applied, for example, in a case where the first identifier is the information illustrated in FIG. 25.

First, the setting unit 643 acquires the first identifier from the first reception unit 641 (Step S301), and then, the setting unit 643 determines whether or not the degree of importance of the communication of the target primary use device is "high" on the basis of the first identifier (Step S302).

In a case where the degree of importance of the communication of the target primary use device is "high" (Step S302: Yes), the setting unit 643 sets a large interfered margin such that the communication is not disturbed. For example, the setting unit 643 sets the first value as the interfered margin of the target primary use device (Step S303). The first value is, for example, 20 dB. In this case, the first value is the protection information of the target primary use device.

In a case where the degree of importance of the communication of the target primary use device is not "high" (Step S302: No), the setting unit 643 determines whether or not the degree of importance of communication of the target primary use device is "moderate" on the basis of the first identifier (Step S304).

In a case where the degree of importance of the communication of the target primary use device is "moderate" (Step S304: Yes), the setting unit 643 sets a medium interfered margin. For example, the setting unit 643 sets the second value as the interfered margin of the target primary use device (Step S305). The second value is a value smaller than the first value. For example, the second value is 10 dB. In this case, the second value is the protection information of the target primary use device.

In a case where the degree of importance of the communication of the target primary use device is not "moderate" (Step S304: No), that is, in a case where the degree of importance of the communication is low, the setting unit 643 sets the interfered margin so that the secondary usage can be performed in a wider range. For example, the setting unit 643 sets the third value as the interfered margin of the target primary use device (Step S306). The third value is a value smaller than the second value. For example, the third value is 0 dB. In this case, the third value is the protection information of the target primary use device.

Note that the magnitude of the interfered margin is not limited to the magnitudes shown in Steps S303, S305, and S306. In addition, the magnitude of the interfered margin can be dynamically changed according to predetermined criteria. For example, the magnitude of the interfered margin can be dynamically changed according to a time zone, the degree of importance (or the priority) of communication, the position of the primary use device, the installation mode of the primary use device, the degree of confidentiality of the primary use device, and/or the like.

<7-2. Secondary Use Parameter Calculation Processing>

The calculation unit 644 of the communication control device 60 calculates the operational parameter of the target secondary use device on the basis of the protection information set by the setting unit 643. Then, the notification unit 645 notifies the proxy device 50 (or the secondary use device) of the calculated operational parameter. In addition, the processing performed by the calculation unit 644 and the notification unit 645 may be similar to the processing described in <6-6. Secondary Use Parameter Calculation Processing>.

Note that, in a case where the first reception unit 641 newly receives the first identifier (first information) related to the target primary use device, the setting unit 643 updates the protection information on the basis of the newly received information. Then, in a case where the protection information is updated, the calculation unit 644 updates the operational parameter of the target secondary use device on the basis of the updated protection information.

For example, it is assumed that the protection information includes at least one of the information on the range of the protection area related to the target primary use device and information on the interference margin related to the first communication device. In this case, the setting unit 643 updates at least one of the information on the range of the protection area or the information on the interference margin on the basis of the updated first identifier (first information). Then, the calculation unit 644 updates the operational parameter related to the radio wave transmission of the target secondary use device on the basis of the information updated by the setting unit 643.

8. Modified Example

The above-described embodiments show only examples, and various modifications and applications are possible.

8-1. Modified Example Related to First Information

For example, in the above-described embodiments (the first embodiment and the second embodiment), the first identifier (first information) is information on the installation mode of the primary use device and the degree of importance of the communication of the primary use device. However, the first identifier is not limited to these pieces of information.

Modified Example 1 Related to First Information

For example, the first identifier (first information) may include information regarding movement of the primary use device (hereinafter, referred to as movement information). Here, the movement information may include at least one of a movement distance, a movement direction, a movement speed, or a movement range of the primary use device. The movement information may be any of current, past, and future movement information. Here, the current movement information is, for example, information on the current (for example, real-time) movement of the primary use device, the past movement information is, for example, information on already performed movement of the primary use device (for example, movement information from one hour ago to now), and the future movement information is information on scheduled movement of the primary use device.

Then, the determination unit 233 or the setting unit 643 may set the range of the protection area related to the primary use device on the basis of the movement information of the primary use device. For example, the determination unit 233 or the setting unit 643 sets a large protection area in a case where the movement distance, the movement direction, the movement speed, or the movement range of the primary use device is larger than a predetermined threshold value (that is, in a case where the primary use device has a large activity range), and sets a small protection area in a case where the movement distance, the movement direction, the movement speed, or the movement range of the primary use device is smaller than the predetermined threshold value (that is, in a case where the primary use device has a small activity range).

For example, it is assumed that the movement information is the current movement speed of the primary use device. At this time, the determination unit 233 or the setting unit 643 determines whether or not the primary use device is moving at a speed higher than a predetermined threshold value on the basis of the movement information. In a case where the primary use device is moving at a speed higher than the predetermined threshold value, the determination unit 233 or the setting unit 643 sets a wide range (for example, the first range) as the protection area of the primary use device, and in a case where the primary use device is moving at a speed lower than the predetermined threshold value, the determination unit 233 or the setting unit 643 sets a narrow range (for example, the second range narrower than the first range) as the protection area of the primary use device. The determination unit 233 or the setting unit 643 may change the shape of the protection area according to the movement direction of the primary use device.

As a result, a communication device (communication system) used while moving can also be protected as the primary system. That is, the base of the system that can be the primary system can be expanded. As a result, efficient use of radio resources can be realized. Note that although the protection information is the protection area in this example, the protection information is not limited to the protection area, and may be, for example, the interfered margin.

Modified Example 2 Related to First Information

The first identifier (first information) may include the service mode information of the primary use device. Here, the service mode information is information indicating the mode of the communication service provided by the primary use device. For example, the service mode information may be information for specifying which one of a plurality of types including at least one of eMBB, mMTC, or URLLC is the type of the communication service provided by the radio wave use device 10 (for example, the base station device) to another radio wave use device 10 (for example, the terminal device).

Then, the determination unit 233 or the setting unit 643 may set the range of the protection area related to the primary use device on the basis of the type of the communication service provided by the primary use device. As described above, there are service types with strict reliability requirements, such as URLLC. Therefore, in a case where the primary use device provides a communication service that requires high reliability, the determination unit 233 or the setting unit 643 sets a large protection area, and in a case where the primary use device provides a communication service that does not require high reliability, the determination unit 233 or the setting unit 643 sets a small protection area.

For example, in a case where the type of the communication service provided by the primary use device is URLLC, the determination unit 233 or the setting unit 643 sets a wide range (for example, the first range) as the protection area of the primary use device, and in a case where the type of the communication service provided by the primary use device is not URLLC, the determination unit 233 or the setting unit 643 sets a narrow range (for example, the second range narrower than the first range) as the protection area of the primary use device.

As a result, a communication device (communication system) requiring high reliability can also be protected as the primary system. That is, the base of the system that can be the primary system can be expanded. As a result, efficient use of radio resources can be realized. Note that although the protection information is the protection area in this example, the protection information is not limited to the protection area, and may be, for example, the interfered margin. Note that the service mode information may be the identification information of the network slice described above.

Modified Example 3 Related to First Information

In addition, the first identifier (first information) may include information on the wireless communication scheme used by the primary use device. In this case, the determination unit 233 or the setting unit 643 may set the protection information of the primary use device on the basis of the information of the wireless communication scheme used by the primary use device. For example, in a case where the wireless communication scheme used by the primary use device is a communication scheme using a frequency band having a large propagation loss and low communication stability, such as a millimeter wave band, the determination unit 233 or the setting unit 643 sets the interfered margin having a large value (the first value), and in a case where the wireless communication scheme used by the primary use device is a communication scheme using a frequency band having high stability, such as a frequency band for television broadcasting, the determination unit 233 or the setting unit 643 sets the interfered margin having a small value (the second value smaller than the first value).

As a result, a communication device (communication system) using a communication scheme that is not suitable for the secondary use due to vulnerability to interference or the like can also be protected as the primary system. That is, the base of the system that can be the primary system can be expanded. As a result, efficient use of radio resources can be realized. Note that although the protection information is the interfered margin in this example, the protection information is not limited to the interfered margin, and may be, for example, the protection area.

Modified Example 4 Related to First Information

Further, in the above-described embodiments (the first embodiment and the second embodiment), in a case where the installation mode of the primary use device is the fixed installation, the determination unit 233 or the setting unit 643 sets a wide range (for example, the first range) as the protection area of the primary use device, and in a case where the installation mode of the primary use device is the movable installation, the determination unit 233 or the setting unit 643 sets a narrow range (for example, the second range narrower than the first range) as the protection area of the primary use device. However, the setting of the range of the protection area is not limited to this example.

For example, in a case where the installation mode of the primary use device whose movement route is desired to be concealed is the movable installation, the determination unit 233 or the setting unit 643 may determine a wide range (for example, the first range) as the protection area of the primary use device, and in a case where the installation mode of the primary use device is the fixed installation, the determination unit 233 or the setting unit 643 may set a narrow range (for example, the second range narrower than the first range) as the protection area of the primary use device.

As a result, even when the installation location of the primary use device is changed after the operational parameter is calculated, the communication of the primary use device can be protected. Note that although the protection information is the protection area in this example, the protection information is not limited to the protection area, and may be, for example, the interfered margin.

Other Modified Examples Related to First Information

In addition, the first identifier (first information) may be information indicating the degree of confidentiality of the primary use device. Then, the determination unit 233 or the setting unit 643 may set the protection information of the primary use device on the basis of the first identifier.

For example, in a case where the degree of confidentiality of the primary use device is higher than a predetermined reference value, the determination unit 233 or the setting unit 643 may determine a wide range (for example, the first range) as the protection area of the primary use device, and in a case where the degree of confidentiality of the primary use device is lower than the predetermined reference value, the determination unit 233 or the setting unit 643 may set a narrow range (for example, the second range narrower than the first range) as the protection area of the primary use device.

In addition, there may be a plurality of pieces of first information used for the setting of the protection information of the primary use device. For example, the first information may be the installation mode of the primary use device and information on the degree of importance of the communication performed by the primary use device. Then, the determination unit 233 or the setting unit 643 may determine the protection information of the primary use device by combining the plurality of pieces of first information.

8-2. Modified Example Related to Second Information

In the above-described embodiments (the first embodiment and the second embodiment), the determination unit 233 or the setting unit 643 sets the protection information of the primary use device on the basis of the first identifier (first information). However, the determination unit 233 or the setting unit 643 may set the protection information on the basis of the second identifier (second information).

Modified Example 1 Related to Second Information

At this time, the second identifier (second information) may include information regarding an entity who uses, operates, or manages the secondary use device (hereinafter, referred to as secondary use entity information). In this case, the determination unit 233 or the setting unit 643 may set the protection information of the primary use device on the basis of the secondary use entity information.

Note that the secondary use entity information may be information for determining the credibility of the secondary use entity. In this case, the determination unit 233 or the setting unit 643 may set the protection information of the primary use device on the basis of the credibility of the secondary use entity. For example, in a case where the secondary use entity is a reliable entity, a narrow protection area (or a small interfered margin) is set, and in a case where the secondary use entity is an unreliable entity, a wide protection area (or a large interfered margin) is set.

For example, it is assumed that the secondary use entity information is information for specifying whether or not the secondary use entity is a communication service provider (for example, whether the secondary use entity is a communication service provider or an end user). In this case, the determination unit 233 or the setting unit 643 sets the protection information of the primary use device on the basis of information indicating whether or not the secondary use entity is the communication service provider. For example, in a case where the secondary use entity is the communication service provider, the determination unit 233 or the setting unit 643 sets a narrow range (for example, the second range) as the protection area of the primary use device, and in a case where the secondary use entity is not the communication service provider (for example, in a case where the secondary use entity is the end user), the determination unit 233 or the setting unit 643 sets a wide range (for example, the first range wider than the second range) as the protection area of the primary use device.

Further, it is assumed that the secondary use entity information is information on a license type of the secondary use entity. In this case, the determination unit 233 or the setting unit 643 sets the protection information of the primary use device on the basis of the license type of the secondary use entity. For example, in a case where the secondary use entity is a licensed business operator, the determination unit 233 or the setting unit 643 sets a narrow range (for example, the second range) as the protection area of the primary use device, and in a case where the secondary use entity is an unlicensed business operator, the determination unit 233 or the setting unit 643 sets a wide range (for example, the first range wider than the second range) as the protection area of the primary use device.

Note that, in setting the protection information, the determination unit 233 or the setting unit 643 may use, as a discrimination element, a region to which the license is given, in addition to the information on the license type. For example, in a case where the region to which the license is given covers the installation position of the primary use device, the secondary use entity has very high reliability in the region, and thus the determination unit 233 or the setting unit 643 sets a narrow range (for example, a third range) as the protection area of the primary use device. In addition, in a case where the secondary use entity is the licensed business operator, but the region to which the license is given does not cover the installation position of the primary use device, the determination unit 233 or the setting unit 643 sets a medium range (for example, the second range wider than the first range) as the protection area of the primary use device. In a case where the secondary use entity is the unlicensed business operator, a wide range (for example, the first range wider than the second range) is set as the protection area.

As a result, the protection information can be flexibly set on the basis of the information on the entity who uses, operates, or manages the secondary system (for example, the credibility). As a result, efficient use of radio resources can be realized. Note that although the protection information is the protection area in this example, the protection information is not limited to the protection area, and may be, for example, the interfered margin.

Modified Example 2 Related to Second Information

The second identifier (second information) may include the service mode information of the secondary use device. Here, the service mode information is information indicating the mode of the communication service provided by the secondary use device. For example, the service mode information is information for specifying which one of a plurality of types including at least one of eMBB, mMTC, or URLLC is the type of the communication service provided by the base station device 40 to the terminal device 30.

Then, the determination unit 233 or the setting unit 643 may set the range of the protection area related to the primary use device on the basis of the type of the communication service provided by the secondary use device. As described above, there are service types with strict reliability requirements, such as URLLC. Therefore, in a case where the secondary use device provides a communication service that requires high reliability, the determination unit 233 or the setting unit 643 sets a large value as the interfered margin of the primary use device, and in a case where the secondary use device provides a communication service that does not require high reliability, the determination unit 233 or the setting unit 643 sets a small value as the interfered margin of the primary use device.

For example, in a case where there is a device whose communication service type is URLLC among a plurality of secondary use devices, the determination unit 233 or the setting unit 643 sets a large value (for example, the first value) as the interfered margin of the primary use device. On the other hand, in a case where there is no device whose communication service type is URLLC among the plurality of secondary use devices, the determination unit 233 or the setting unit 643 sets a small value (for example, the second value smaller than the first value) as the interfered margin of the primary use device.

As a result, the protection information can be flexibly set according to the type of the communication service of the secondary system. As a result, efficient use of radio resources can be realized. Note that although the protection information is the interfered margin in this example, the protection information is not limited to the interfered margin, and may be, for example, the protection area. Further, the service mode information may be the identification information of the network slice described above.

Modified Example 3 Related to Second Information

The second identifier (second information) may include information on the wireless communication scheme used by the secondary use device. In this case, the determination unit 233 or the setting unit 643 may set the protection information of the primary use device on the basis of the information of the wireless communication scheme used by the secondary use device.

For example, in a case where the wireless communication scheme used by the secondary use device is a communication scheme that allows communication only in a narrow range, such as short-range communication using a millimeter wave band, the determination unit 233 or the setting unit 643 sets a large value (the first value) as the interfered margin of the primary use device. In addition, in a case where the wireless communication scheme used by the secondary use device is a communication system that allows communication in a wide range, such as cellular communication using a macrocell, the determination unit 233 or the setting unit 643 sets a small value (the second value smaller than the first value) as the interfered margin of the primary use device.

As a result, the protection information can be flexibly set according to the communication scheme of the secondary system. As a result, efficient use of radio resources can be realized. Note that although the protection information is the interfered margin in this example, the protection information is not limited to the interfered margin, and may be, for example, the protection area.

Modified Example 4 Related to Second Information

The second identifier (second information) may include information on the degree of importance or priority of the communication performed by the secondary use device. In this case, the determination unit 233 or the setting unit 643 may set the protection information of the primary use device on the basis of the information on the degree of importance or priority of the communication performed by the secondary use device.

For example, in a case where the degree of importance of the communication performed by the secondary use device is "high", the determination unit 233 or the setting unit 643 sets a narrow range (for example, the third range) or the accurate position (for example, the pinpoint position that does not have an error) of the primary use device as the protection area of the primary use device. In a case where the degree of importance of the communication performed by the secondary use device is "moderate", the determination unit 233 or the setting unit 643 sets a medium range (for example, the second range wider than the third range) as the protection area of the primary use device. In a case where the degree of importance of the communication performed by the secondary use device is "low", the determination unit 233 or the setting unit 643 sets a wide range (for example, the first range wider than the second range) as the protection area of the primary use device.

As a result, the protection information can be flexibly set according to the degree of importance of the communication of the secondary system. As a result, efficient use of radio resources can be realized. Note that although the protection information is the protection area in this example, the protection information is not limited to the protection area, and may be, for example, the interfered margin.

Other Modified Examples Related to Second Information

Note that there may be a plurality of pieces of second information used for the setting of the protection information of the primary use device. For example, the second information may be information on the degree of importance of the communication performed by the secondary use device and information on the credibility of the secondary use entity. Then, the determination unit 233 or the setting unit 643 may determine the protection information of the primary use device by combining the plurality of pieces of second information.

For example, in a case where the degree of importance of the communication can be freely set by the secondary system, it is predicted that everyone sets a high degree of importance, and the number of secondary use devices with a high degree of importance is always excessively large. Therefore, for example, the determination unit 233 or the setting unit 643 filters a plurality of secondary use devices with a "high" degree of importance by using the credibility. For example, the determination unit 233 or the setting unit 643 excludes the secondary use device having "low" credibility from protection information determination consideration devices. Then, in a case where a predetermined number of secondary use devices having "high" credibility exist even after the filtering, the determination unit 233 or the setting unit 643 sets a narrow range (for example, the second range) as the protection area of the primary use device. On the other hand, in a case where the predetermined number of secondary use devices having high credibility do not exist, the determination unit 233 or the setting unit 643 sets a wide range (for example, the first range wider than the second range) as the protection area of the primary use device.

As a result, it is possible to realize more efficient use of radio resources as a whole system. Note that although the protection information is the protection area in this example, the protection information is not limited to the protection area, and may be, for example, the interfered margin.

8-3. Modified Example Related to Setting of Protection Information

In the above-described embodiments (the first embodiment and the second embodiment), the determination unit 233 or the setting unit 643 sets the protection information on the basis of any one of the first identifier (first information) or the second identifier (second information). However, the protection information may be set on the basis of both the first identifier (first information) and the second identifier (second information).

Modified Example 1 Related to Setting of Protection Information

For example, it is assumed that the second identifier includes information regarding an entity who uses, operates, or manages the secondary use device (hereinafter, referred to as the secondary use entity information). In this case, the determination unit 233 or the setting unit 643 may set the protection information of the primary use device on the basis of the first identifier and the secondary use entity information.

(Credibility)

Note that the secondary use entity information may be information for determining the credibility of the secondary use entity. In this case, the determination unit 233 or the setting unit 643 may set the protection information of the primary use device on the basis of the first identifier and the credibility of the secondary use entity.

For example, it is assumed that the first identifier is the degree of importance of the communication of the primary use device. At this time, in a case where the degree of importance of the communication of the primary use device is "high" and the credibility of the secondary use entity is "high", the determination unit 233 or the setting unit 643 sets a medium range (for example, the second range) as the protection area. On the other hand, in a case where the degree of importance of the communication of the primary use device is "high" and the credibility of the secondary usage entity is "low", a wide range (the first range wider than the second range) is set as the protection area. At this time, in a case where the degree of importance of the communication of the primary use device is "low", the determination unit 233 or the setting unit 643 may set a narrow range (for example, the first range narrower than the second range) as the protection area regardless of the credibility of the secondary use entity.

As a result, it is possible to realize more efficient use of radio resources as a whole system. Note that although the protection information is the protection area in this example, the protection information is not limited to the protection area, and may be, for example, the interfered margin.

(Communication Service Provider)

Note that the secondary use entity information may be information for specifying whether or not the secondary use entity is the communication service provider (for example, whether the secondary use entity is the communication service provider or the end user). In this case, the determination unit 233 or the setting unit 643 sets the protection information of the primary use device on the basis of the first identifier and the information indicating whether or not the secondary use entity is the communication service provider.

For example, it is assumed that the first identifier is the installation mode of the primary use device. At this time, in a case where the installation mode of the primary use device is the "fixed installation" and the secondary use entity is the "communication service provider", the determination unit 233 or the setting unit 643 sets a medium range (for example, the second range) as the protection area. On the other hand, in a case where the installation mode of the primary use device is the "fixed installation" and the secondary usage entity is the "end user", a wide range (the first range wider than the second range) is set as the protection area. At this time, in a case where the installation mode of the primary use device is the "movable installation", the determination unit 233 or the setting unit 643 may set a narrow range (for example, the first range narrower than the second range) as the protection area regardless of whether or not the secondary use entity is the service provider.

As a result, it is possible to realize more efficient use of radio resources as a whole system. Note that although the protection information is the protection area in this example, the protection information is not limited to the protection area, and may be, for example, the interfered margin.

(License Type)

Further, it is assumed that the secondary use entity information is information on a license type of the secondary use entity. In this case, the determination unit 233 or the setting unit 643 sets the protection information of the primary use device on the basis of the first identifier and the information on the license type of the secondary use entity.

For example, it is assumed that the first identifier is the degree of importance of the communication of the primary use device. At this time, in a case where the degree of importance of the communication of the primary use device is "high" and the license type of the secondary use entity is the "licensed business operator", the determination unit 233 or the setting unit 643 sets a medium value (for example, the second value) as the interfered margin. On the other hand, in a case where the degree of importance of the communication of the primary use device is "high" and the license type of the secondary use entity is the "unlicensed user", a large value (the first value larger than the second value) is set as the interfered margin. At this time, in a case where the degree of importance of the communication of the primary use device is "low", the determination unit 233 or the setting unit 643 may set a small value (for example, the third value smaller than the second value) as the interfered margin regardless of the license type of the secondary use entity.

As a result, it is possible to realize more efficient use of radio resources as a whole system. Note that although the protection information is the interfered margin in this example, the protection information is not limited to the interfered margin, and may be, for example, the protection area.

Modified Example 2 Related to Setting of Protection Information

The second identifier (second information) may include the service mode information of the secondary use device. In this case, the determination unit 233 or the setting unit 643 sets the protection information of the primary use device on the basis of the first identifier and the type of the communication service provided by the secondary use device.

For example, it is assumed that the first identifier is the degree of importance of the communication of the primary use device. At this time, in a case where the degree of importance of the communication of the primary use device is "high" and the type of the communication service of the secondary use device is "URLLC", the determination unit 233 or the setting unit 643 sets a medium value (for example, the second value) as the interfered margin. On the other hand, in a case where the degree of importance of the communication of the primary use device is "high" and the type of the communication service of the secondary use device is "mMTC" or "eMBB", a large value (the first value larger than the second value) is set as the interfered margin. At this time, in a case where the degree of importance of the communication of the primary use device is "low", the determination unit 233 or the setting unit 643 may set a small value (for example, the third value smaller than the second value) as the interfered margin regardless of the license type of the secondary use entity.

As a result, it is possible to realize more efficient use of radio resources as a whole system. Note that although the protection information is the interfered margin in this example, the protection information is not limited to the interfered margin, and may be, for example, the protection area. Note that the service mode information may be the identification information of the network slice described above.

Modified Example 3 Related to Setting of Protection Information

The second identifier (second information) may include information on the wireless communication scheme of the secondary use device. In this case, the determination unit 233 or the setting unit 643 sets the protection information of the primary use device on the basis of the first identifier and the wireless communication scheme of the secondary use device.

For example, it is assumed that the first identifier is the installation mode of the primary use device. At this time, in a case where the installation mode of the primary use device is the "fixed installation" and the communication scheme of the secondary use device is the short-range communication scheme using a millimeter wave band, the determination unit 233 or the setting unit 643 sets a medium value (for example, the second value) as the interfered margin. On the other hand, in a case where the installation mode of the primary use device is the "fixed installation" and the communication scheme of the secondary use device is the cellular communication scheme using a macrocell, a small value (the third value smaller than the second value) is set as the interfered margin. At this time, in a case where the installation mode of the primary use device is the "movable installation", the determination unit 233 or the setting unit 643 may set a large value (for example, the first value larger than the second value) as the interfered margin regardless of the wireless communication scheme of the secondary use entity.

As a result, it is possible to realize more efficient use of radio resources as a whole system. Note that although the protection information is the interfered margin in this example, the protection information is not limited to the interfered margin, and may be, for example, the protection area.

Modified Example 4 Related to Setting of Protection Information

The second identifier (second information) may include information on the degree of importance or priority of the communication performed by the secondary use device. In this case, the determination unit 233 or the setting unit 643 may set the protection information of the primary use device on the basis of the first identifier and the information on the degree of importance or the priority of the communication performed by the secondary use device.

For example, it is assumed that the first identifier is the degree of importance of the communication of the primary use device. At this time, in a case where the degree of importance of the communication of the primary use device is "high" and the degree of importance (or the priority) of the communication of the secondary use entity is "high", the determination unit 233 or the setting unit 643 sets a medium range (for example, the second range) as the protection area. On the other hand, in a case where the degree of importance of the communication of the primary use device is "high" and the degree of importance (or the priority) of the communication of the secondary use entity is "low", a wide range (the first range wider than the second range) is set as the protection area. At this time, in a case where the degree of importance of the communication of the primary use device is "low", the determination unit 233 or the setting unit 643 may set a narrow range (for example, the accurate position narrower than the second range) as the protection area regardless of the degree of importance (or the priority) of the communication of the secondary use entity.

As a result, the protection information can be flexibly set according to the degree of importance of the communication of the secondary system. As a result, efficient use of radio resources can be realized. Note that although the protection information is the protection area in this example, the protection information is not limited to the protection area, and may be, for example, the interfered margin.

Other Modified Examples Related to Setting of Protection Information

Note that there may be a plurality of pieces of first information and a plurality of pieces of second information used for the setting of the protection information of the primary use device. For example, the first information may be the information on the installation mode of the primary use device and the information on the degree of importance of the communication performed by the primary use device. Further, the second information may be the information on the degree of importance of the communication performed by the secondary use device and the information on the credibility of the secondary use entity. Then, the determination unit 233 or the setting unit 643 may determine the protection information of the primary use device by combining the plurality of pieces of first information and the plurality of pieces of second information.

8-4. Modified Example Related to System Configuration

The communication control device 60 of the present embodiment is not limited to the device described in the above-described embodiments. For example, the communication control device 60 may be a device having a function other than controlling the base station device 40 that secondarily uses a frequency band where frequency sharing is performed. For example, a network manager may have the function of the communication control device 60 of the present embodiment. In this case, the network manager may be, for example, a centralized base band unit (C-BBU) having a network configuration called a centralized radio access network (C-RAN) or a device including the same. Further, a base station (including an access point) may have the function of the network manager. These devices (the network manager and the like) can also be regarded as communication control devices.

Furthermore, in the above-described embodiments, the communication control device 60 is a device belonging to the communication system 2, but does not necessarily have to be a device belonging to the communication system 2. The communication control device 60 may be a device outside the communication system 2. The communication control device 60 may indirectly control the base station device 40 via a device included in the communication system 2 without directly controlling the base station device 40. Further, the number of secondary systems (communication systems 2) may be plural. At this time, the communication control device 60 may manage a plurality of secondary systems. In this case, each secondary system can be regarded as the second wireless system.

Note that, in frequency sharing, an existing system that uses a target band is generally called the primary system, and a secondary user is called the secondary system, but the primary system and the secondary system may be replaced with other terms. A macrocell in a heterogeneous network (HetNET) may be the primary system, and a small cell or relay station may be the secondary system. Further, a base station may be the primary system, and a relay UE or vehicle UE that realizes D2D or vehicle-to-everything (V2X) in a coverage of the base station may be the secondary system. The base station is not limited to a fixed type, but may be a portable type/mobile type.

Furthermore, an interface between respective entities may be a wired interface or a wireless interface. For example, the interface between the respective entities (the communication device, the communication control device, or the terminal device) appearing in the present embodiment may be a wireless interface that does not depend on frequency sharing. Examples of the wireless interface that does not depend on frequency sharing include a wireless interface provided by a mobile communication operator via a licensed band, and wireless LAN communication that uses an existing unlicensed band.

8-5. Other Modified Examples

The control device that controls the radio wave use device 10, the management device 20, the terminal device 30, the base station device 40, the proxy device 50, or the communication control device 60 of the present embodiment may be implemented by a dedicated computer system or may be implemented by a general-purpose computer system.

For example, a program for performing the above-described operations is stored in a computer-readable recording medium such as an optical disk, a semiconductor memory, a magnetic tape, or a flexible disk, and distributed. Then, for example, the control device is configured by installing the program in a computer and performing the above processing. At this time, the control device may be a device (for example, a personal computer) outside the radio wave use device 10, the management device 20, the terminal device 30, the base station device 40, the proxy device 50, or the communication control device 60. Furthermore, the control device may be a device (for example, the control unit 13, the control unit 23, the control unit 34, the control unit 44, the control unit 54, or the control unit 64) inside the radio wave use device 10, the management device 20, the terminal device 30, the base station device 40, the proxy device 50, or the communication control device 60.

Further, the communication program may be stored in a disk device included in a server device on a network such as the Internet, and be downloaded to a computer. Further, the functions described above may be realized by cooperation between an operating system (OS) and application software. In this case, the part other than the OS may be stored in a medium and distributed, or the part other than the OS may be stored in the server device and downloaded to a computer.

Further, among the respective processing described in the above-described embodiments, all or some of the processing described as being automatically performed can be manually performed. Alternatively, all or some of the processing described as being manually performed can be automatically performed by a known method. In addition, the processing procedures, specific names, information including various data and parameters illustrated in the specification and drawings can be arbitrarily changed unless otherwise specified. For example, various information illustrated in each drawing is not limited to the illustrated information.

Further, each illustrated component of each device is functionally conceptual, and does not necessarily have to be configured physically as illustrated in the drawings. That is, the specific modes of distribution/integration of the respective devices are not limited to those illustrated in the drawings. All or some of the devices can be functionally or physically distributed/integrated in any arbitrary unit, depending on various loads or the status of use.

Further, the above-described embodiments can be appropriately combined as long as the processing contents do not contradict each other. Further, the order of each step illustrated in the sequence diagram or the flowchart of the present embodiment can be changed as appropriate.

Furthermore, for example, the present embodiment can be implemented as any component included in the device or system, for example, a processor as a system large scale integration (LSI) or the like, a module using a plurality of processors or the like, a unit using a plurality of modules or the like, a set obtained by further adding other functions to a unit, or the like (that is, some components of the device).

Note that, in the present embodiment, the system means a set of a plurality of components (devices, modules (parts), and the like), and it does not matter whether or not all the components are in the same housing. Therefore, a plurality of devices housed in separate housings and connected via a network and one device in which a plurality of modules are housed in one housing are both systems.

Furthermore, for example, the present embodiment can adopt a configuration of cloud computing in which one function is shared and processed by a plurality of devices in cooperation via a network.

9. Conclusion

As described above, according to an embodiment of the present disclosure, the communication control device 60 receives the first information regarding the primary use device that primarily uses the predetermined frequency band, and sets the information regarding the protection of the primary use device on the basis of the first information. Then, the communication control device 60 calculates the communication parameter related to the radio wave transmission of the secondary use device that secondarily uses the predetermined frequency band on the basis of the set information regarding the protection of the primary use device.

As a result, it is possible to protect, as the primary system, a communication system that is conventionally not suitable for frequency sharing due to a high degree of confidentiality or the like. That is, the base of the system that can be the primary system can be expanded. As a result, efficient use of radio resources can be realized.

Although the respective embodiments of the present disclosure have been described above, the technical scope of the present disclosure is not limited to the above-described embodiments, and various modifications can be made without departing from the scope of the present disclosure. Moreover, components of different embodiments and modified examples may be appropriately combined.

Further, the effects in each embodiment described in the present specification are merely examples. The effects of the present disclosure are not limited thereto, and other effects may be obtained.

Note that the present technology can also have the following configurations.

(1)

An information processing device comprising:
 a first reception unit that receives first information regarding a first communication device that primarily uses a predetermined frequency band;
 a setting unit that sets information regarding protection of the first communication device on a basis of the first information; and
 a calculation unit that calculates a communication parameter related to radio wave transmission of a second communication device that secondarily uses the predetermined frequency band on a basis of the information regarding the protection of the first communication device set by the setting unit.

(2)

The information processing device according to (1), wherein
 in a case where the first reception unit newly receives the first information, the setting unit updates the information regarding the protection of the first communication device on a basis of the new first information, and
 the calculation unit updates the communication parameter related to the radio wave transmission of the second communication device on a basis of the updated information regarding the protection of the first communication device.

(3)

The information processing device according to (2), wherein the information regarding the protection of the first communication device includes at least one of information on a range of a protection area related to the first communication device or information on an interference margin related to the first communication device, the setting unit updates at least one of the information on the range of the protection area or the information on the interference margin on a basis of the new first information, and the calculation unit updates the communication parameter related to the radio wave transmission of the second communication device on a basis of the information updated by the setting unit.

(4)

The information processing device according to (2), wherein the first information includes information on an installation mode of the first communication device.

(5)

The information processing device according to (4), wherein the information regarding the protection of the first communication device includes information on a range of a protection area related to the first communication device, the information on the installation mode includes information for specifying whether the first communication device is fixed installation or movable installation, in a case where the installation mode of the first communication device is the fixed installation, the setting unit sets, as the range of the protection area related to the first communication device, a range of the protection area that is wider than that in a case where the installation mode of the first communication device is the movable installation.

(6)

The information processing device according to (2), wherein the first information includes information on a degree of confidentiality of the first communication device.

(7)

The information processing device according to (6), wherein the information regarding the protection of the first communication device includes information on a range of a protection area related to the first communication device, in a case where the degree of confidentiality of the first communication device is higher than a predetermined reference value, the setting unit sets, as the range of the protection area related to the first communication device, a range of the protection area that is wider than that in a case where the degree of confidentiality of the first communication device is lower than the predetermined reference value.

(8)

The information processing device according to (2), wherein the first information includes information on a degree of importance or priority of communication performed by the first communication device.

(9)

The information processing device according to (8), wherein the information regarding the protection of the first communication device includes information on an interference margin related to the first communication device, and in a case where the degree of importance or priority of the communication performed by the first communication device is higher than a predetermined reference value, the setting unit sets, as the interference margin related to the first communication device, an interference margin that is larger than that in a case where the degree of importance or priority of the communication performed by the first communication device is lower than the predetermined reference value.

(10)

The information processing device according to (2), wherein the first information includes information regarding movement of the first communication device, the information regarding the protection of the first communication device includes information on a range of a protection area related to the first communication device, and the setting unit sets the range of the protection area related to the first communication device on a basis of the information regarding the movement of the first communication device.

(11)

The information processing device according to (10), wherein the information regarding the movement includes at least one information of a movement distance, a movement direction, a movement speed, or a movement range of the first communication device.

(12)

The information processing device according to any one of (1) to (11), further comprising a second reception unit that receives second information regarding the second communication device, wherein the setting unit sets the information regarding the protection of the first communication device on a basis of the first information and the second information, and the calculation unit calculates the communication parameter related to the radio wave transmission of the second communication device on a basis of the information regarding the protection of the first communication device set by the setting unit.

(13)

The information processing device according to (12), wherein the second information includes information regarding an entity who uses, operates, or manages the second communication device, and the setting unit sets the information regarding the protection of the first communication device on a basis of the first information and the information regarding the entity who uses, operates, or manages the second communication device.

(14)

The information processing device according to (13), wherein the second information includes information for determining credibility of the entity, and the setting unit sets the information regarding the protection of the first communication device on a basis of the first information and the credibility specified by the second information.

(15) The information processing device according to (13), wherein
the second information includes information for specifying whether or not the entity is a communication service provider, and
the setting unit sets the information regarding the protection of the first communication device on a basis of the first information and the information indicating whether or not the entity is the communication service provider.

(16) The information processing device according to (13), wherein
the second information includes information on a license type related to wireless communication and held by the entity, and
the setting unit sets the information regarding the protection of the first communication device on a basis of the first information and the information on the license type held by the entity.

(17) The information processing device according to (12), wherein
the second information includes information on a wireless communication scheme of the second communication device, and
the setting unit sets the information regarding the protection of the first communication device on a basis of the first information and the information on the wireless communication scheme of the second communication device.

(18) The information processing device according to (12), wherein
the second information includes information on a degree of importance or priority of communication performed by the second communication device, and
the setting unit sets the information regarding the protection of the first communication device on a basis of the first information and the information on the degree of importance or priority of the communication performed by the second communication device.

(19) An information processing method comprising:
receiving first information regarding a first communication device that primarily uses a predetermined frequency band;
setting information regarding protection of the first communication device on a basis of the first information; and
calculating a communication parameter related to radio wave transmission of a second communication device that secondarily uses the predetermined frequency band on a basis of the set information regarding the protection of the first communication device.

(20) An information processing program for causing a computer to function as:
a first reception unit that receives first information regarding a first communication device that primarily uses a predetermined frequency band;
a setting unit that sets information regarding protection of the first communication device on the basis of the first information; and
a calculation unit that calculates a communication parameter related to radio wave transmission of a second communication device that secondarily uses the predetermined frequency band on the basis of the information regarding the protection of the first communication device set by the setting unit.

(21) A communication device comprising:
an acquisition unit that acquires a communication parameter from an information processing device including a first reception unit that receives first information regarding a first communication device that primarily uses a predetermined frequency band, a setting unit that sets information regarding protection of the first communication device on a basis of the first information, and a calculation unit that calculates the communication parameter related to radio wave transmission of a second communication device that secondarily uses the predetermined frequency band on a basis of the information regarding the protection of the first communication device set by the setting unit; and
a communication control unit that performs radio wave transmission using the predetermined frequency band on a basis of the communication parameter.

(22) A communication method including:
acquiring a communication parameter from an information processing device including a first reception unit that receives first information regarding a first communication device that primarily uses a predetermined frequency band, a setting unit that sets information regarding protection of the first communication device on the basis of the first information, and a calculation unit that calculates the communication parameter related to radio wave transmission of a second communication device that secondarily uses the predetermined frequency band on the basis of the information regarding the protection of the first communication device set by the setting unit; and
performing radio wave transmission using the predetermined frequency band on the basis of the communication parameter.

(23) An information processing program for causing a computer to function as:
an acquisition unit that acquires a communication parameter from an information processing device including a first reception unit that receives first information regarding a first communication device that primarily uses a predetermined frequency band, a setting unit that sets information regarding protection of the first communication device on the basis of the first information, and a calculation unit that calculates the communication parameter related to radio wave transmission of a second communication device that secondarily uses the predetermined frequency band on the basis of the information regarding the protection of the first communication device set by the setting unit; and
a communication control unit that performs radio wave transmission using the predetermined frequency band on the basis of the communication parameter.

REFERENCE SIGNS LIST 1, 2, 1000 COMMUNICATION SYSTEM
10 RADIO WAVE USE DEVICE
20 MANAGEMENT DEVICE
30 TERMINAL DEVICE
40 BASE STATION DEVICE
50 PROXY DEVICE
60 COMMUNICATION CONTROL DEVICE
11 PROCESSING UNIT
12, 22, 32, 42, 52, 62 STORAGE UNIT
13, 23, 34, 44, 54, 64 CONTROL UNIT
21 COMMUNICATION UNIT
31, 41, 51, 61 WIRELESS COMMUNICATION UNIT
33 INPUT/OUTPUT UNIT
43, 53, 63 NETWORK COMMUNICATION UNIT
311, 411 RECEPTION PROCESSING UNIT
312, 412 TRANSMISSION PROCESSING UNIT
231 ASSIGNMENT UNIT
232 DETECTION UNIT
233 DETERMINATION UNIT
234 PROVISION UNIT
441, 541 FIRST PROVISION UNIT
442, 542 SECOND PROVISION UNIT
443, 543 REQUEST UNIT
444, 544 ACQUISITION UNIT
445, 545, 643 SETTING UNIT
446 COMMUNICATION CONTROL UNIT
641 FIRST RECEPTION UNIT
642 SECOND RECEPTION UNIT
644 CALCULATION UNIT
645 NOTIFICATION UNIT

The invention claimed is:

1. An information processing device, comprising:
a central processing unit (CPU) configured to:
receive first information regarding a first communication device, wherein the first communication device primarily uses a specific frequency band,
the first information includes information on an installation mode of the first communication device, and
the information on the installation mode specifies one of fixed installation of the first communication device or movable installation of the first communication device;
set specific information regarding protection of the first communication device based on the first information, wherein
the specific information regarding the protection of the first communication device includes information on a range of a protection area related to the first communication device, and
the information on the range of the protection area related to the first communication device comprises a radius of a circle with a geographical position of the first communication device as an origin;
set, as the range of the protection area related to the first communication device, a first range of the protection area in a case where a degree of confidentiality of the first communication device is higher than a first reference value;
set, as the range of the protection area related to the first communication device, a second range of the protection area in a case where the degree of confidentiality of the first communication device is lower than the first reference value, wherein the first range is wider than the second range; and
calculate, based on the set specific information, a communication parameter related to radio wave transmission of a second communication device, wherein the second communication device secondarily uses the specific frequency band.

2. The information processing device according to claim 1, wherein the CPU is further configured to:
receive new information regarding the first communication device;
update, based on the new information, the specific information regarding the protection of the first communication device; and
update, based on the updated specific information, the communication parameter related to the radio wave transmission of the second communication device.

3. The information processing device according to claim 2, wherein the specific information regarding the protection of the first communication device further includes information on an interference margin related to the first communication device, and
the CPU is further configured to:
update, based on the new information, the information on the interference margin; and update the communication parameter related to the radio wave transmission of the second communication device, wherein the communication parameter is updated based on the updated information on the interference margin.

4. The information processing device according to claim 2, wherein
the CPU is further configured to:
set, as the range of the protection area related to the first communication device, the first range of the protection area in a case where the installation mode is the fixed installation; and
set, as the range of the protection area related to the first communication device, the second range of the protection area in a case where the installation mode is the movable installation.

5. The information processing device according to claim 2, wherein the first information further includes information on the degree of confidentiality of the first communication device.

6. The information processing device according to claim 2, wherein
the first information further includes information on a degree of importance of communication performed by the first communication device or priority of the communication performed by the first communication device.

7. The information processing device according to claim 6, wherein
the specific information regarding the protection of the first communication device includes information on an interference margin related to the first communication device,
the CPU is further configured to:
set, as the interference margin, a first interference margin related to the first communication device in a case where the degree of importance or the priority of the communication performed by the first communication device is higher than a second reference value; and
set, as the interference margin, a second interference margin in a case where the degree of importance or the priority of the communication performed by the first communication device is lower than the second reference value, and the first interference margin is larger than the second interference margin.

8. The information processing device according to claim 2, wherein
the first information further includes information regarding movement of the first communication device, and
the CPU is further configured to set the range of the protection area related to the first communication device based on the information regarding the movement of the first communication device.

9. The information processing device according to claim 8, wherein
the information regarding the movement includes at least one of a movement distance of the first communication device, a movement direction of the first communication device, a movement speed of the first communication device, or a movement range of the first communication device.

10. The information processing device according to claim 1, wherein the CPU is further configured to:
receive second information regarding the second communication device;
set the specific information regarding the protection of the first communication device based on the first information and the second information; and
calculate the communication parameter related to the radio wave transmission of the second communication device, wherein the communication parameter is calculated based on the specific information regarding the protection of the first communication device.

11. The information processing device according to claim 10, wherein
the second information includes information regarding an entity that uses, operates, or manages the second communication device, and
the CPU is further configured to set the specific information regarding the protection of the first communication device based on the first information and the information regarding the entity.

12. The information processing device according to claim 11, wherein
the second information further includes information regarding credibility of the entity, and
the CPU is further configured to set the specific information regarding the protection of the first communication device based on the first information and the credibility of the entity.

13. The information processing device according to claim 11, wherein
the second information further includes information that specifies the entity is a communication service provider, and
the CPU is further configured to set the specific information regarding the protection of the first communication device based on the first information and the information indicating the entity is the communication service provider.

14. The information processing device according to claim 11, wherein
the second information further includes information on a license type of the entity, and
the CPU is further configured to set the specific information regarding the protection of the first communication device based on the first information and the information on the license type.

15. The information processing device according to claim 10, wherein
the second information includes information on a wireless communication scheme of the second communication device, and
the CPU is further configured to set the specific information regarding the protection of the first communication device based on the first information and the information on the wireless communication scheme of the second communication device.

16. The information processing device according to claim 10, wherein
the second information includes information on a degree of importance of communication performed by the second communication device or priority of the communication performed by the second communication device, and
the CPU is further configured to set the specific information regarding the protection of the first communication device based on the first information and the information on the degree of importance or the priority of the communication performed by the second communication device.

17. An information processing method, comprising:
receiving first information regarding a first communication device, wherein the first communication device primarily uses a specific frequency band, the first information includes information on an installation mode of the first communication device, and
the information on the installation mode specifies one of fixed installation of the first communication device or movable installation of the first communication device;
setting specific information regarding protection of the first communication device based on the first information, wherein
the specific information regarding the protection of the first communication device includes information on a range of a protection area related to the first communication device, and
the information on the range of the protection area related to the first communication device comprises a radius of a circle with a geographical position of the first communication device as an origin;
setting, as the range of the protection area related to the first communication device, a first range of the protection area in a case where a degree of confidentiality of the first communication device is higher than a reference value;
setting, as the range of the protection area related to the first communication device, a second range of the protection area in a case where the degree of confidentiality of the first communication device is lower than the reference value, wherein the first range is wider than the second range; and
calculating, based on the set specific information, a communication parameter related to radio wave transmission of a second communication device, wherein the second communication device secondarily uses the specific frequency band.

18. A communication device, comprising:
a central processing unit (CPU) configured to:
acquire a communication parameter from an information processing device, wherein the information processing device includes a processor to:
receive information regarding a first communication device, wherein the first communication device primarily uses a specific frequency band, the information regarding the first communication device includes information on an installation mode of the first communication device, and the information on the installation mode specifies one of fixed installation of the first communication device or movable installation of the first communication device, set specific information regarding protection of the first communication device based on the information regarding the first communication device, wherein the specific information regarding the protection of the first communication device includes information on a range of a protection area related to the first communication device, and the information on the range of the protection area related to the first communication device comprises a radius of a circle with a geographical position of the first communication device as an origin, set, as the range of the protection area related to the first communication device, a first range of the protection area in a case where a degree of confidentiality of the first communication device is higher than a reference value, set, as the range of the protection area related to the first communication device, a second range of the protection area in a case where the degree of confidentiality of the first communication device is lower than the reference value, wherein the first range is wider than the second range, and calculate the communication parameter related to radio wave transmission of a second communication device based on the set specific information, wherein the second communication device secondarily uses the specific frequency band; and perform radio wave transmission using the specific frequency band based on the communication parameter.

* * * * *